US010143010B2

(12) United States Patent
Sakai et al.

(10) Patent No.: US 10,143,010 B2
(45) Date of Patent: Nov. 27, 2018

(54) WIRELESS COMMUNICATION DEVICE AND WIRELESS COMMUNICATION METHOD

(71) Applicant: SONY CORPORATION, Tokyo (JP)

(72) Inventors: Eisuke Sakai, Tokyo (JP); Tomoya Yamaura, Tokyo (JP); Kazuyuki Sakoda, Chiba (JP); Takeshi Itagaki, Saitama (JP)

(73) Assignee: Sony Corporation, Tokyo (JP)

( * ) Notice: Subject to any disclaimer, the term of this patent is extended or adjusted under 35 U.S.C. 154(b) by 24 days.

(21) Appl. No.: 15/315,108

(22) PCT Filed: Jun. 30, 2015

(86) PCT No.: PCT/JP2015/068883
§ 371 (c)(1),
(2) Date: Nov. 30, 2016

(87) PCT Pub. No.: WO2016/002802
PCT Pub. Date: Jan. 7, 2016

(65) Prior Publication Data
US 2017/0347376 A1    Nov. 30, 2017

(30) Foreign Application Priority Data

Jun. 30, 2014 (JP) .................... 2014-134661
May 8, 2015 (WO) ................. PCT/JP2015/063355

(51) Int. Cl.
*H04L 12/413* (2006.01)
*H04W 74/08* (2009.01)
*H04W 72/08* (2009.01)

(52) U.S. Cl.
CPC ....... *H04W 74/0825* (2013.01); *H04W 72/08* (2013.01); *H04W 72/082* (2013.01);
(Continued)

(58) Field of Classification Search
CPC ......... H04W 74/0825; H04W 72/0816; H04W 72/085; H04W 74/0808
(Continued)

(56) References Cited

U.S. PATENT DOCUMENTS 6,157,616 A * 12/2000 Whitehead ............. H04L 47/10
370/252
2007/0060155 A1   3/2007 Kahana et al.
(Continued)

FOREIGN PATENT DOCUMENTS

JP    2007-134905 A    5/2007
JP    2008-538679 A    10/2008

OTHER PUBLICATIONS

Y. Takenaka, et al., "Zettai Wakaru! Network Trouble Kaiketsu Cho Nyumon revised edition," 2$^{nd}$ Edition, Nikkei Business Publications, Inc., Jan. 10, 2013, 17 pages (with partial English translation).
(Continued)

*Primary Examiner* — Faisal Choudhury
(74) *Attorney, Agent, or Firm* — Xsensus LLP

(57) ABSTRACT

[Object] To provide a wireless communication device and a wireless communication method capable of reducing an inequality of transmission opportunities occurring when a carrier sense level is changed.
[Solution] A wireless communication device includes: a wireless communication unit configured to perform wireless communication with another device; and a control unit configured to set a first carrier sense level and control a parameter used by the wireless communication unit to transmit data based on a comparison result between the set first carrier sense level and a second carrier sense level which is a default.

20 Claims, 28 Drawing Sheets

(52) U.S. Cl.
CPC ...... *H04W 74/0808* (2013.01); *H04W 72/085* (2013.01); *H04W 74/0816* (2013.01)

(58) Field of Classification Search
USPC .......................................................... 370/445
See application file for complete search history.

(56) References Cited

U.S. PATENT DOCUMENTS

| | | | |
|---|---|---|---|
| 2008/0008133 A1 | 1/2008 | Zhu et al. | |
| 2008/0112371 A1* | 5/2008 | Joshi | H04L 12/66 370/337 |
| 2012/0033652 A1* | 2/2012 | Ho | H04W 88/06 370/338 |
| 2012/0195296 A1* | 8/2012 | Adachi | H04W 16/14 370/338 |
| 2014/0213241 A1* | 7/2014 | Altintas | H04W 28/18 455/418 |
| 2014/0241270 A1* | 8/2014 | Tohzaka | H04W 74/0808 370/329 |
| 2014/0328192 A1* | 11/2014 | Barriac | H04J 1/14 370/252 |
| 2015/0312804 A1* | 10/2015 | Wang | H04W 28/20 370/329 |

OTHER PUBLICATIONS

International Search Report dated Sep. 1, 2015 in PCT/JP2015/068883 filed Jun. 30, 2015.
Extended European Search Report dated Jan. 22, 2018 in Patent Application No. 15814048.3, 6 pages.

* cited by examiner

WIRELESS COMMUNICATION DEVICE AND WIRELESS COMMUNICATION METHOD

TECHNICAL FIELD

The present disclosure relates to a wireless communication device and a wireless communication method.

BACKGROUND ART

In wireless systems, when a plurality of wireless terminals transmit data using the same radio resources (frequency and time), mutual data may collide, interference may occur, and thus reception of data on reception sides may fail in some cases. For this reason, when there are a plurality of wireless terminals using the same frequency, it is desirable to provide a mechanism enabling one wireless terminal to monopolize the frequency at a certain time slot as much as possible and transmit data so that the data does not collide.

As one of the technologies for providing such a mechanism, there is a technology for avoiding collision using carrier sense. According to the present technology, a wireless terminal enters a reception mode before data transmission to measure reception power at a frequency channel (hereinafter also referred to as a channel) to be used. Then, the wireless terminal avoids data collision by determining a threshold for the measured reception power and suppressing transmission until the wireless terminal confirms empty radio resources. Hereinafter, this threshold is also referred to as a carrier sense level. A technology for setting an appropriate carrier sense level in order to suppress transmission and avoid collision or conversely to avoid excessive suppression of transmission is desirable.

For example, Patent Literature 1 discloses a technology for efficiently performing media access by temporarily changing a carrier sense level.

CITATION LIST

Patent Literature

Patent Literature 1: JP 2007-134905A

SUMMARY OF INVENTION

Technical Problem

In the technology disclosed in the foregoing Patent Literature, however, an inequality of transmission opportunities may occur since a wireless terminal having changed a carrier sense level is more likely to acquire a right to transmit data than a wireless terminal which has not changed the carrier sense level. Accordingly, in the present disclosure, it is desirable to provide a novel and improved wireless communication device and a novel and improved wireless communication method capable of reducing an inequality of transmission opportunities occurring when a carrier sense level is changed.

Solution to Problem

According to the present disclosure, there is provided a wireless communication device including: a wireless communication unit configured to perform wireless communication with another device; and a control unit configured to set a first carrier sense level and control a parameter used by the wireless communication unit to transmit data based on a comparison result between the set first carrier sense level and a second carrier sense level which is a default.

According to the present disclosure, there is provided a wireless communication device including: a wireless communication unit configured to perform wireless communication with other devices; and a control unit configured to generate information for setting a parameter that is used by the other devices to transmit data and that is set based on a comparison result between a second carrier sense level which is a default and a first carrier sense level set in the other devices which are capable of changing a carrier sense level. The wireless communication unit transmits the information for setting the parameter used by the other devices to transmit the data to the other devices.

According to the present disclosure, there is provided a wireless communication method in a wireless communication device performing wireless communication with another device, the method including: setting a first carrier sense level and controlling a parameter used to transmit data based on a comparison result between the set first carrier sense level and a second carrier sense level which is a default.

According to the present disclosure, there is provided a wireless communication method in a wireless communication device performing wireless communication with another device, the method including: generating information for setting a parameter that is used by the other device to transmit data and that is set based on a comparison result between a second carrier sense level which is a default and a first carrier sense level set in the other device which is capable of changing a carrier sense level; and transmitting the information for setting the parameter used by the other device to transmit the data to the other device.

Advantageous Effects of Invention

According to the present disclosure described above, it is possible to reduce an inequality of transmission opportunities occurring when a carrier sense level is changed. Note that the effects described above are not necessarily limitative. With or in the place of the above effects, there may be achieved any one of the effects described in this specification or other effects that may be grasped from this specification.

DESCRIPTION OF EMBODIMENT(S)

Figure 1:
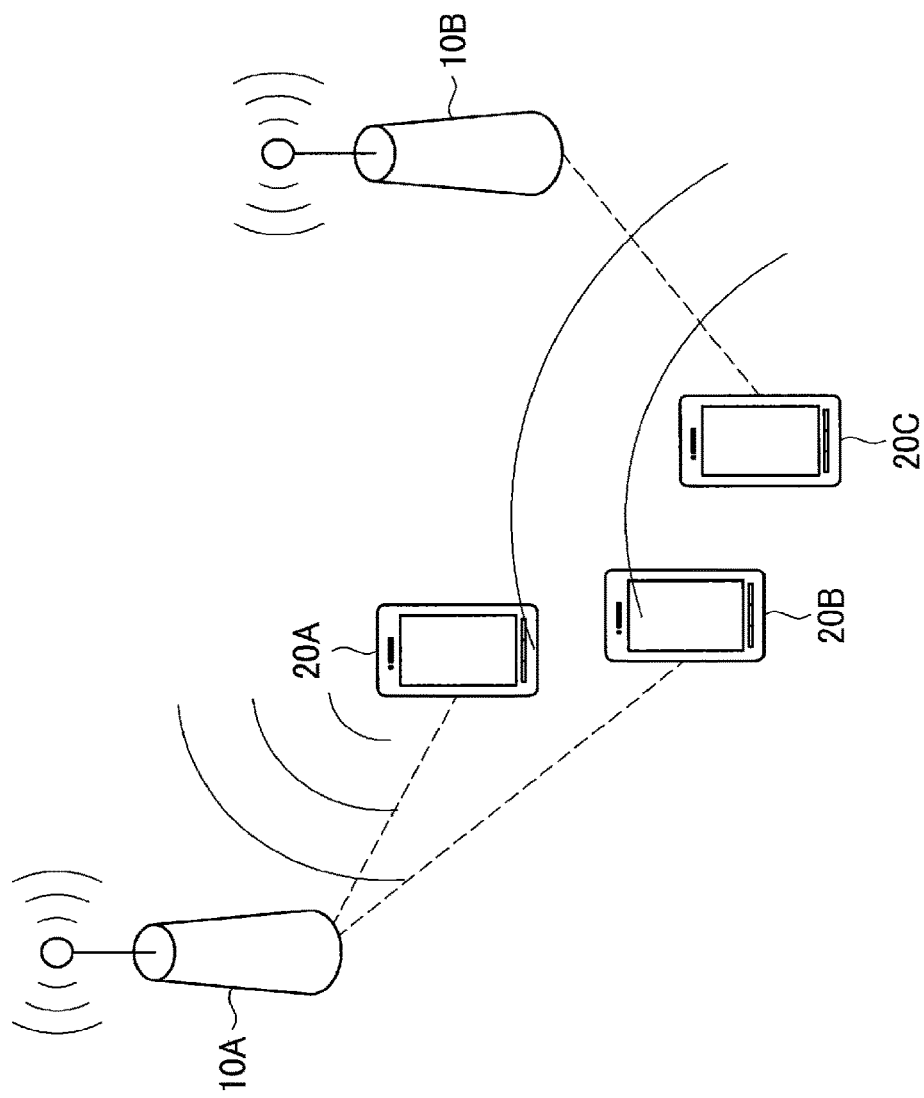
FIG. 1 is an explanatory diagram showing DSC.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Throughout the present specification and the drawings, different alphabetical letters are suffixed to the same reference numerals to distinguish constituent elements having substantially the same functional configurations from each other. For example, a plurality of constituent elements having substantially the same functional configurations are distinguished from each other as necessary, as in base stations 100A, 100B, and 100C. Here, when it is not particularly necessary to distinguish a plurality of constituent elements having substantially the same functional configurations from each other, only the same reference numerals are given. For example, when it is not particularly necessary to distinguish the base stations 100A, 100B, and 100C from each other, the base stations 100A, 100B, and 100C are simply referred to as the base stations 100.

The description will be made in the following order.

1. Introduction
2. First Embodiment
2-1. Overview of communication system
2-2. Example of configuration of base station
2-3. Example of configuration of HE terminal
2-4. Example of configuration of legacy terminal
2-5. DSC use permission process
2-6. Data transmission process
2-7. DSC use decision process
2-8. Process of setting DSC threshold and DSC transmission parameter
3. Second Embodiment
3-1. Example of configuration of HE terminal
3-2. Operation process
4. Third Embodiment
4-1. Example of configuration of base station
4-2. Example of configuration of HE terminal
4-3. DSC use permission process
4-4. Data transmission process
5. Fourth Embodiment
6. Fifth Embodiment
6-1. Example of configuration of base station
6-2. Example of configuration of HE terminal
6-3. Technical characteristics
6-4. Modification examples
7. Sixth Embodiment
7-1. Example of configuration of base station
7-2. Example of configuration of wireless terminal
7-3. Technical characteristics
8. Seventh Embodiment
9. Eighth Embodiment
10. Application examples
11. Conclusion

1. INTRODUCTION

First, a technology and an examination of carrier sense will be described.

(Carrier Sense)

A technology for avoiding collision using carrier sense is referred to as a carrier sense multiple access/collision avoidance (CSMA/CA). In the technology, for example, wireless terminals autonomously acquire a right to transmit data mutually.

Specifically, in order to confirm whether data is transmitted by other wireless terminals, each wireless terminal first waits in a reception mode and measures reception power of a channel to be used. When the reception power measured during the waiting in the reception mode is lower than a carrier sense level, the wireless terminal determines that the channel is in an idle state and data is not transmitted by the other wireless terminals. Conversely, when the reception power measured during the waiting in the reception mode is higher than the carrier sense level, the wireless terminal determines that the channel is a busy state and data is transmitted by the other wireless terminal. Such a mechanism is also referred to as clear channel assessment (CCA).

A wireless terminal performs random time carrier sense, considers that the wireless terminal acquires a transmission right when the channel is idle in the meantime, and performs transmission. Conversely, the wireless terminal performs random time carrier sense and suppresses transmission when the channel is not idle in the meantime. By using such a mechanism in a wireless network, it is possible to reduce collision occurring since a plurality of wireless terminals simultaneously transmit data at the same frequency band. Thus, it is possible to suppress interference.

As described above, carrier sense in which a reception signal power level is monitored is also referred to as physical carrier sense. In the physical carrier sense, transmission from other wireless terminals in a positional relation in which no signal is directly detectable collides in destination wireless terminals in some cases (two terminals in such a positional relation are referred to as hidden terminals). In the physical carrier sense, when wireless transmission is performed with a newly introduced physical layer signal format, it is difficult to avoid collision in some cases. As an example of solutions to such a problem, there is a mechanism in which a wireless terminal which is a transmission source describes a transmission suppression time in content of a wireless packet, a wireless terminal receiving the packet forcibly treats a wireless state as a busy state only for the transmission time after completion of the reception for transmission suppression. Such a mechanism is also referred to as virtual carrier sense.

(DSC)

In a specification related to CSMA/CA, a threshold of reception power (carrier sense level) at which a channel is determined to be idle is a fixed value in some cases. Hereinafter, the threshold of the reception power is also referred to as a CCA threshold.

According to the CCA threshold, transmission which may cause collision can be suppressed. In contrast, transmission may be excessively suppressed in some cases. For example, when an influence of an interference component on a reception side is decided in accordance with a reception power ratio of a desired signal to an interference signal, a wireless terminal may suppress transmission by the carrier sense in some cases although interference is actually small and a partner can receive a signal from the wireless terminal without problem. When such cases occur, there is an adverse influence of deterioration in the throughput of an entire communication system.

As one technology for ameliorating such an adverse influence and improving the throughput of the entire communications system, for example, there is dynamic sensitivity control (DSC) in which a carrier sense level is dynamically changed. This technology is also referred to as dynamic clear channel assessment (DCCA). According to DSC, a wireless terminal can intentionally neglect interference which does not have influence on a signal of the wireless terminal and perform transmission. Therefore, it is possible to improve the throughput of the entire communication system.

(Inequality of Transmission Opportunities Occurring Due to DSC)

A wireless terminal that raises a CCA threshold by DSC can obtain more transmission opportunities. This is because a channel is forcibly considered to be idle in order to perform transmission by raising the CCA threshold even at reception power at which the channel is determined to be busy when DSC is not used. However, in contrast, it is difficult for a wireless terminal having no DSC function to dynamically raise a CCA threshold. Therefore, there is a higher possibility of a channel being determined to be busy and transmission being suppressed than the wireless terminal raising the CCA threshold using DSC. Accordingly, an inequality of transmission opportunities may occur between a wireless terminal using DSC and a wireless terminal using no DSC.

This point will be described in detail with reference to FIG. 1. FIG. 1 is an explanatory diagram showing DSC. In FIG. 1, arc lines indicate propagation of radio waves. As shown in FIG. 1, wireless terminals 20A and 20B are wirelessly connected to a base station 10A, and a wireless terminal 20C is wirelessly connected to a base station 10B. Here, it is assumed that the wireless terminals 20A and 20B are closely located and radio waves transmitted from the wireless terminal 20C arrive at the same reception power. It is assumed that the wireless terminal 20A uses DSC and the CCA threshold is set to −60 dBm. In contrast, it is assumed that the wireless terminal 20B uses no DSC, the CCA threshold is less than that of the wireless terminal 20A and is set to −82 dBm.

In such an environment, it is assumed that the wireless terminals 20A and 20B attempt to transmit data at a moment at which the wireless terminal 20C transmits data. The wireless terminals 20A and 20B performs the carrier sense to confirm whether a channel is idle. At this time, it is assumed that radio waves arrive at the wireless terminals 20A and 20B from the wireless terminal 20C at reception power of −75 dBm. In this case, since the radio waves from the wireless terminal 20C have the CCA threshold or less, the wireless terminal 20A determines that the channel is idle and attempts to transmit radio waves. In contrast, since the radio waves from the wireless terminal 20C have the CCA threshold or more, the wireless terminal 20B determines that the channel is busy and performs no transmission.

In this example, the wireless terminal 20A can transmit data irrespective of the fact that the wireless terminal 20C transmits data, but the wireless terminal 20B suppress the transmission while the wireless terminal 20C transmits data. In this way, an inequality of transmission opportunities occurs between the wireless terminal using DSC and the wireless terminal using no DSC.

Accordingly, from the viewpoint of the foregoing circumstance, a communication system according to an embodiment of the present disclosure has been devised. A communication system according to each embodiment of the present disclosure provides a mechanism for suppressing data transmission by a wireless terminal using DSC to prevent a possibility that a terminal using DSC acquires a transmission right from excessively increasing. Accordingly, a communication system according to each embodiment can correct an inequality of transmission opportunities while increasing a throughput of the entire system.

2. FIRST EMBODIMENT

2-1. Overview of Communication System

Figure 2:
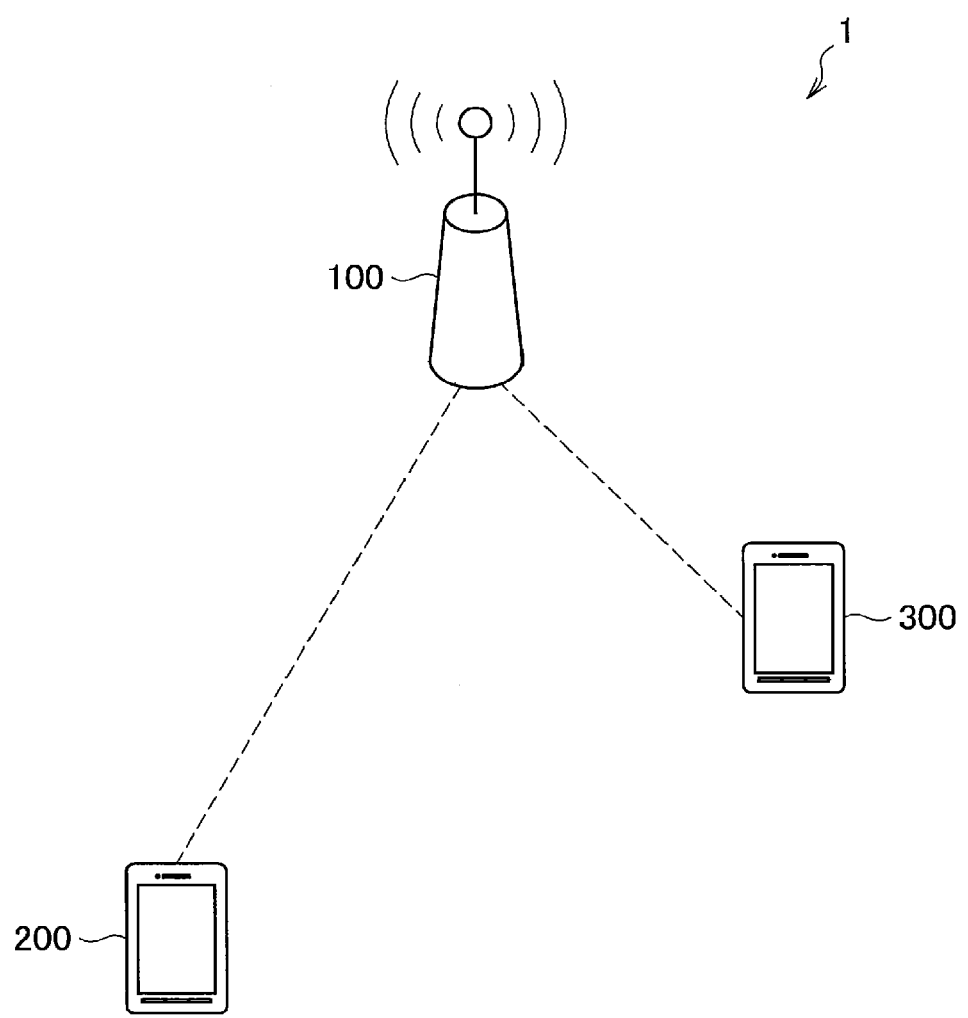
FIG. 2 is an explanatory diagram showing an overview of a communication system according to an embodiment.

FIG. 2 is an explanatory diagram showing an overview of a communication system 1 according to an embodiment. As shown in FIG. 2, the communication system 1 includes a base station 100, a wireless terminal 200, and a wireless terminal 300. The communication system 1 is, for example, a system that conforms with a wireless local area network (LAN) or a communication scheme equivalent to the wireless LAN.

The base station 100 is a wireless communication device that corresponds to a master station which is a center of the communication system 1. The base station 100 may be connected to an external network such as the Internet in a wired or wireless manner. For example, the base station 100 may be an access point in a wireless LAN system.

The wireless terminals 200 and 300 are wireless communication devices that correspond to slave stations which are each wirelessly connected to the base station 100 to perform communication. In FIG. 2, dotted lines indicate wireless connection with the base station 100. For example, the wireless terminals 200 and 300 may be stations in the wireless LAN system.

The wireless terminal 200 has at least one of a DSC function and a function of changing transmission power (a TPC function). When the wireless terminal 200 has the DSC function, the wireless terminal 200 can perform both of transmission using DSC and normal transmission using no DSC. When the wireless terminal 200 has the TPC function, the wireless terminal 200 can perform both of transmission using the TPC and normal transmission using no TPC. When the wireless terminal 200 is using DSC, the wireless terminal 200 determines whether a channel is idle according to a dynamically changed CCA threshold. When the wireless terminal 200 uses no DSC, the wireless terminal 200 determines whether a channel is idle according to a CCA threshold which is a pre-decided fixed value. The CCA threshold when no DSC is used may be decided in a specification or may be mounting-dependent. For example, the CCA threshold when the physical carrier sense is performed may be decided in a specification and the CCA threshold when the virtual carrier sense is performed may be mounting-dependent.

The wireless terminal 300 does not have the DSC function. That is, the wireless terminal 300 does not have the function of changing the CCA threshold. Therefore, the wireless terminal 300 determines whether a channel is idle according to the CCA threshold which is a pre-decided fixed value. Hereinafter, the wireless terminal 200 is also referred to as a high efficiency terminal (HE terminal) HE terminal 200 and the wireless terminal 300 is also referred to as a legacy terminal 300. When the HE terminal 200 and the legacy terminal 300 are not particularly distinguished from each other, these terminals are also collectively simply referred to as wireless terminals.

The HE terminal 200 according to the embodiment is assumed to dynamically change a threshold of packet detection as the CCA threshold when the HE terminal 200 detects a wireless packet and performs the virtual carrier sense in which a channel is forcibly treated as being in a busy state during a transmission suppression time described in the wireless packet. Of course, when the HE terminal 200 performs the carrier sense in which the reception power level is monitored and performs the physical carrier sense in which a channel is treated as being in a busy state, the HE terminal 200 may dynamically change a threshold of a reception power level as the CCA threshold. In any case, the HE terminal 200 is assumed to dynamically change the CCA threshold within a legally decided range.

Hereinafter, an operation mode when DSC is not used in the HE terminal 200 is also referred to as a normal mode. An operation mode when DSC is used to dynamically change the CCA threshold is also referred to as a DSC mode. A default CCA threshold in the normal mode is also referred to as a default threshold. A CCA threshold in the DSC mode is also referred to as a DSC threshold. Hereinafter, a parameter which is used by the HE terminal 200 to transmit data is also referred to as a transmission parameter. A transmission parameter in the normal mode is also referred to as a default transmission parameter. A transmission parameter in the DSC mode is also referred to as a DSC transmission parameter. The legacy terminal 300 is assumed to use the default threshold and the default transmission parameter. The default threshold and the default transmission parameter may be the same or may be different in devices.

Hereinafter, an overview of the communication system 1 according to the embodiment will be described. Next, an example of the configuration of each device included in the communication system 1 will be described.

2-2. Example of Configuration of Base Station

Figure 3:
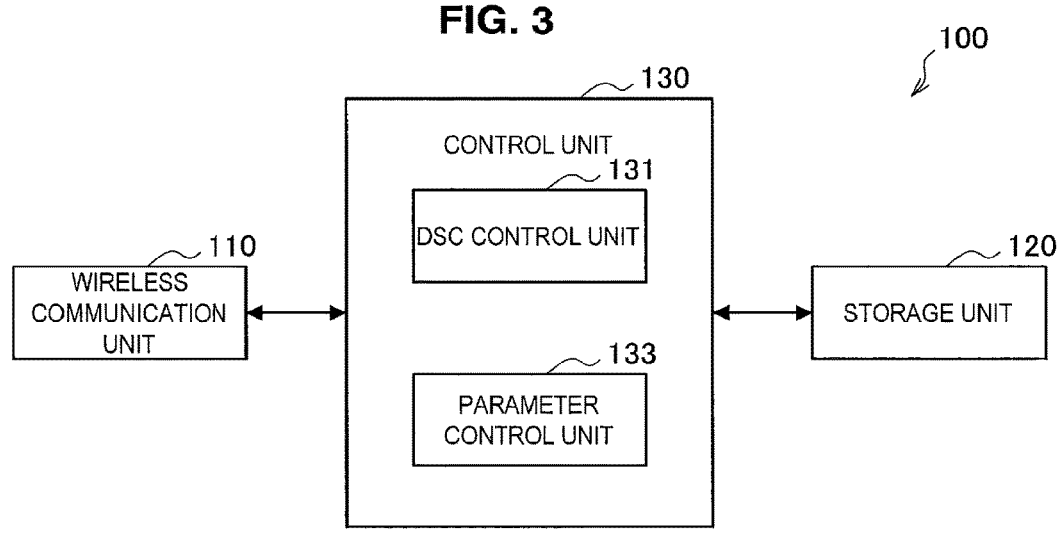
FIG. 3 is a block diagram showing an example of a logical configuration of a base station according to a first embodiment.

FIG. 3 is a block diagram showing an example of a logical configuration of the base station 100 according to a first embodiment. As shown in FIG. 3, the base station 100 includes a wireless communication unit 110, a storage unit 120, and a control unit 130.

(1) Wireless Communication Unit 110

The wireless communication unit 110 is a wireless communication interface that relays wireless communication with another device through the base station 100. In the embodiment, the wireless communication unit 110 performs wireless communication with the HE terminal 200 or the legacy terminal 300. For example, the wireless communication unit 110 receives a wireless signal transmitted from the HE terminal 200 or the legacy terminal 300. The wireless communication unit 110 may have, for example, functions of an amplifier, a frequency converter, a demodulator, and the like and can output received data to the control unit 130. The wireless communication unit 110 transmits a wireless signal to the HE terminal 200 or the legacy terminal 300 via an antenna. The wireless communication unit 110 may have, for example, functions of a modulator, an amplifier, and the like and may perform modulation, power amplification, and the like on data output from the control unit 130 to transmit the data.

The wireless communication unit 110 according to the embodiment receives a DSC request message from the HE terminal 200 and outputs the DSC request message to the control unit 130. The wireless communication unit 110 replies to the HE terminal 200 with a DSC reply message output from the control unit 130. The DSC request message is a control message used by the HE terminal 200 to request that the HE terminal 200 be permitted to operate in the DSC mode. The DSC reply message is a control message that includes a reply to the DSC request message. The wireless communication unit 110 may transmit or receive an acknowledgement (ACK) indicating that reception of such a control message has succeeded.

The function of the wireless communication unit 110 will be described in more detail. The wireless communication unit 110 transmits and receives a packet by performing general signal processing of the data link layer and the physical layer related to data transmission and reception. Specifically, a process of the data link layer includes addition and removal of an LLC/SNAP header to and from a data payload from an upper layer, addition/removal of an MAC header, addition of an error detection code/detection of a packet error, retransmission, a media access process by CSMA/CA, and generation of a management frame and a control frame. Specifically, a process of the physical layer includes a process of encoding, interleaving, and modulating processes based on coding and modulation schemes set by the control unit 130, addition of a PLCP header and a PLCP preamble, detection or a channel estimation process by a preamble, analog/digital signal conversion, frequency conversion, amplification, and filtering.

(2) Storage Unit 120

The storage unit 120 is a unit that records and reproduces data on and from a predetermined recording medium. The storage unit 120 is realized as, for example, a hard disc drive (HDD). Of course, as the recording medium, any of various recording media such as a solid-state memory such as a flash memory, a memory card, an optical disc, or a magneto-optical disc containing a fixed memory, and a hologram memory can be considered. The storage unit 120 may be considered to have a configuration in which recording and reproducing can be performed according to an adopted recording medium.

For example, the storage unit 120 according to the embodiment stores, for example, settable ranges of the CCA threshold and the transmission parameters. Moreover, the storage unit 120 may store identification information of a subordinate wireless terminal to which the wireless communication unit 110 is connected or may store information regarding radio resources such as usable channels.

(3) Control Unit 130

The control unit 130 functions as an arithmetic processing device and a control device and controls general operations in the base station 100 according to various programs. The control unit 130 is realized by, for example, an electronic circuit such as a central processing unit (CPU) or a microprocessor. The control unit 130 may include a read-only memory (ROM) that stores programs or arithmetic parameters to be used and a random access memory (RAM) that temporarily stores appropriately changed parameters.

For example, the control unit 130 has a function of controlling information for setting the DSC transmission parameter used by another device to transmit data and set based on a comparison result between a default threshold and the DSC threshold set in the other device capable of changing the CCA threshold, that is, having the DSC function through the wireless communication unit 110. In the embodiment, the base station 100 decides the DSC transmission parameter. On the other hand, in a fifth embodiment, the HE terminal 200 decides the DSC transmission parameter and the base station 100 notifies the HE terminal 200 of information used by the HE terminal 200 to decide the DSC transmission parameter. Hereinafter, a case in which the base station 100 decides the DSC transmission parameter will be described.

For example, the control unit 130 has a function of controlling the DSC transmission parameter used by another device to transmit data based on a comparison result between the default threshold and the DSC threshold set by the other device capable of changing the CCA threshold, that is, having the DSC function through the wireless communication unit 110. Specifically, when a DSC request message is received from the HE terminal 200, the control unit 130 performs the control by generating a DSC reply message to designate the CCA threshold and the transmission parameter to be set and replying with the DSC reply message. Based on an instruction from a higher application, the control unit 130 may control the wireless communication unit 110 such that data is transmitted and received. As shown in FIG. 3, the control unit 130 functions as a DSC control unit 131 and a parameter control unit 133.

(3-1) DSC Control Unit 131

The DSC control unit 131 has a function of controlling an operation mode of the HE terminal 200. For example, the DSC control unit 131 determines whether the HE terminal 200 which is a transmission source of the DSC request message is permitted to operate in the DSC mode. Various determination standards are considered. For example, the DSC control unit 131 may perform the determination based on number information regarding other devices connected to the wireless communication unit 110. For example, the DSC control unit 131 may perform the determination based on the number of legacy terminals 300 among the other devices connected to the wireless communication unit 110. Specifically, the DSC control unit 131 may permit the HE terminal 200 to operate in the DSC mode when the number of legacy terminals 300 is greater than a threshold, and may not permit the HE terminal 200 to operate in the DSC when the number of legacy terminals 300 is equal to or less than the threshold. Moreover, the DSC control unit 131 may perform the determination based on the number of HE terminals 200 connected to the wireless communication unit 110, a ratio of the legacy terminals 300 to all the other devices connected to the wireless communication unit 110, or a ratio of the HE terminals 200 to all the other devices as the number information. The DSC control unit 131 may perform the determination based on, for example, a transmission success ratio of the HE terminal 200, a transmission success ratio of the legacy terminal 300, the number of frames transmitted by the HE terminal 200, or the number of frames transmitted by the legacy terminal 300 as the number information. The DSC control unit 131 may perform the determination using any one of the pieces of number information regarding the other devices connected to the wireless communication unit 110 described above or may perform the determination by combining a plurality of pieces of any information.

The DSC control unit 131 stores information indicating a determination result in the DSC reply message.

(3-2) Parameter Control Unit 133

The parameter control unit 133 has a function of deciding the DSC threshold and the DSC transmission parameter.

Various decision standards are considered. For example, the parameter control unit 133 may decide the DSC threshold and the DSC transmission parameter based on the number information regarding the other devices connected to the wireless communication unit 110. For example, the parameter control unit 133 may decide the DSC threshold and the DSC transmission parameter based on the number of legacy terminals 300 among the other devices connected to the wireless communication unit 110. Specifically, the parameter control unit 133 may decide the DSC threshold of which a different from the default threshold is larger as the number of legacy terminals 300 is larger and may decide the DSC threshold of which a difference from the default threshold is smaller as the number of legacy terminals 300 is smaller. For example, the parameter control unit 133 may decide the DSC transmission parameter of which a different from the default transmission parameter is larger as the number of legacy terminals 300 is larger and may decide the DSC transmission parameter of which a different from the default transmission parameter is smaller as the number of legacy terminals 300 is smaller. Moreover, the parameter control unit 133 may decide the DSC transmission parameter based on a difference between the DSC threshold and the default threshold. For example, the parameter control unit 133 decides the DSC transmission parameter of which the difference from the default transmission parameter is small when the difference is small and decides the DSC transmission parameter of which the difference from the default transmission parameter is large when the different is large. Other examples of the number information include the number of HE terminals 200 connected to the wireless communication unit 110, a ratio of the legacy terminals 300 to all the other devices connected to the wireless communication unit 110, or a ratio of the HE terminals 200 to all the other devices as the number information. Moreover, examples of the number information include a transmission success ratio of the HE terminal 200, a transmission success ratio of the legacy terminal 300, the number of frames transmitted by the HE terminal 200, and the number of frames transmitted by the legacy terminal 300. When the parameter control unit 133 decides the DSC threshold and the DSC transmission parameter, the parameter control unit 133 may use any one of the pieces of number information regarding the other devices connected to the wireless communication unit 110, as described above, or may combine and use a plurality of pieces of any information.

The parameter control unit 133 decides a value which is added to an increase or decrease in an opposite direction of an increase or decrease in transmission opportunities by DSC as the DSC transmission parameter. More specifically, when the DSC threshold is greater than the default threshold, the parameter control unit 133 decides the DSC transmission parameter for which the transmission opportunities of the HE terminal 200 are decreased more than at the time of use of the default transmission parameter because of the increase in the transmission opportunities of the HE terminal 200. It is preferable that a value decided so that the transmission opportunities increased by the use of DSC are not excessively decreased is the DSC transmission parameter. This is because deviation from the original purpose of DSC, which is improving the throughput of the entire communication system does not occur. Conversely, when the DSC threshold is less than the default threshold, the control unit 230 decides the DSC transmission parameter for which the transmission opportunities of the HE terminal 200 are increased more than at the time of use of the default transmission parameter because of the decrease in the transmission opportunities of the HE terminal 200. Here, it is similarly preferable that a value decided so that the transmission opportunities decreased by the use of DSC are not excessively increased is the DSC transmission parameter.

Hereinafter, a specific example of the DSC threshold and the DSC transmission parameter decided by the parameter control unit 133 will be described.

—DSC Threshold

For example, the parameter control unit 133 may decide that the DSC threshold is a value less than the default threshold. In this case, the HE terminal 200 determines that a channel is busy more often than the legacy terminal 300. Similarly, the parameter control unit 133 may decide that the DSC threshold is a value greater than the default threshold. In this case, the HE terminal 200 determines that a channel is busy less often than the legacy terminal 300. The parameter control unit 133 may use a pre-decided value as the DSC threshold or may use a value calculated based on a ratio or the number of the legacy terminals 300, the transmission success ratio of the HE terminal 200, or the like.

—Interframe Space (IFS)

An IFS is a fixed length portion in a waiting time before the data transmission. Specifically, the IFS is a fixed length time defined by IEEE 802.11 and is a fixed length time waiting after an idle state of a channel when the HE terminal 200 transmits a frame. The IFS can have a different length according to a type of frame to be transmitted. The parameter control unit 133 decides the IFS so that the IFS is greater than the default transmission parameter when the DSC threshold is greater the default threshold. The parameter control unit 133 decides the IFS so that the IFS is less than the default transmission parameter when the DSC threshold is less than the default threshold. Thus, since the increase or decrease in the opposite direction of the increase or decrease in the transmission opportunities by DSC is realized, an inequality of the transmission opportunities occurring between the HE terminal 200 and the legacy terminal 300 is reduced without deteriorating the improvement in the throughput of the entire system.

—Slot Time

A slot time is a value necessary to decide the above-described IFS and is a parameter for deciding a waiting time before data transmission. In the specification of IEEE 802.11, a different IFS is realized by adding a variable slot time to a short IFS (SIFS) which is a minimum IFS. For example, a point coordination function IFS (PIFS) is SIFS+ slot time×2. The PIFS is an IFS at the time of waiting after an idle state of a channel channel when a frame used to inform a subordinate wireless terminal that a bandwidth is scheduled (also referred to as a PS-POLL) is transmitted. For example, the parameter control unit 133 decides the slot time so that the slot time is greater than the default transmission parameter when the DSC threshold is greater than the default threshold. The parameter control unit 133 decides the slot time so that the slot time is less than the default transmission parameter when the DSC threshold is less than the default threshold. Thus, a real-time length waiting before data transmission is different between the HE terminal 200 and the legacy terminal 300 even when the IFS is the same. In this way, since the increase or decrease in the opposite direction of the increase or decrease in the transmission opportunities by DSC is realized, an inequality of the transmission opportunities occurring between the HE terminal 200 and the legacy terminal 300 is reduced without deteriorating the improvement in the throughput of the entire system. As described above, the slot time corresponds to the fixed length portion in the waiting time before the data transmission. As will be described, the slot time also corresponds to a parameter of a distribution of an acquirable value of a time length selected at random in a waiting time before data transmission.

—CW Min

A CW min is one of the parameters for changing a distribution of an acquirable value of a contention window (CW). The CW is a time length selected at random in the waiting time before data transmission. After a channel is idle, the wireless terminal waits by the IFS and further waits for a random slot time. A minimum value of the distribution of the random slot time is given by the CW min. In general, as the distribution of a random value is smaller, a probability of a small value being obtained is higher. As the distribution of a random value is larger, a probability of a large value being obtained is higher. Accordingly, the parameter control unit 133 decides the CW min so that the CW min is greater than the default transmission parameter when the DSC threshold is greater than the default threshold. The parameter control unit 133 decides the CW min so that the CW min is less than the default transmission parameter when the DSC threshold is less than the default threshold. Thus, since the increase or decrease in the opposite direction of the increase or decrease in the transmission opportunities by DSC is realized, an inequality of the transmission opportunities occurring between the HE terminal 200 and the legacy terminal 300 is reduced without deteriorating the improvement in the throughput of the entire system.

—CW Max

A CW max is one of the parameters for changing a distribution of an acquirable value of the CW. The wireless terminal enlarges the distribution of the CW when the wireless terminal recognizes that a frame collides after transmission of the frame. As the number of collisions of the frame increases, the value of the distribution also increases. The CW max is a maximum value of the value of the distribution. Accordingly, the parameter control unit 133 decides the CW min so that the CW max is greater than the default transmission parameter when the DSC threshold is greater than the default threshold. The parameter control unit 133 decides the CW max so that the CW max is less than the default transmission parameter when the DSC threshold is less than the default threshold. Thus, since the increase or decrease in the opposite direction of the increase or decrease in the transmission opportunities by DSC is realized, an inequality of the transmission opportunities occurring between the HE terminal 200 and the legacy terminal 300 is reduced without deteriorating the improvement in the throughput of the entire system.

—Form of Probability Distribution of CW

The form of a probability distribution of the CW is one of the parameters for changing a distribution of an acquirable value of the CW. For example, in a wireless LAN in the current state, the probability distribution of the CW is a uniform distribution. The parameter control unit 133 changes an average of an established distribution of the CW, for example, by changing this distribution to a normal distribution or a multinomial distribution. For example, when the DSC threshold is greater than the default threshold, the parameter control unit 133 decides the form of the probability distribution of the CW so that an average of the probability distribution of the CW is greater than an average related to the default transmission parameter. When the DSC threshold is less than the default threshold, the parameter control unit 133 decides the form of the probability distribution of the CW so that the average of the probability distribution of the CW is less than the average related to the default transmission parameter. Thus, since the increase or decrease in the opposite direction of the increase or decrease in the transmission opportunities by DSC is realized, an inequality of the transmission opportunities occurring between the HE terminal 200 and the legacy terminal 300 is reduced without deteriorating the improvement in the throughput of the entire system.

—Maximum Byte Length of MSDU

A maximum byte length of a medium access control (MAC) service data unit (MSDU) is a maximum value of the amount of transmittable data. The MSDU is a unit of a frame and a maximum transmittable byte length is decided. When the maximum transmittable byte length is short at the time of transmission of data with a certain byte number, more MSDUs than when the maximum byte length is long are necessary, and thus the number of acquisitions of the transmission right increases. For example, the wireless terminal is considered to transmit data which can be transmitted once by dividing the data and transmitting the data twice since the maximum byte length is small. On the assumption that a probability of acquiring the transmission right is $\alpha$ (where $\alpha<1$) for simplicity, the wireless terminal can transmit all of the data at the probability of $\alpha$ when the data can be transmitted once. On the other hand, a probability that the wireless terminal can transmit data twice consecutively is $\alpha \times \alpha = \alpha^2$ and the other wireless terminal takes over the transmission right at the probability of $1-\alpha^2$ once every two times. Therefore, when the maximum byte length is short, the transmission opportunities to transmit data of the same number of bytes are decreased. Accordingly, when the DSC threshold is greater than the default threshold, the parameter control unit 133 decides the maximum byte length of the MSDU so that the maximum byte length of the MSDU is less than that of the default transmission parameter. When the DSC threshold is less than the default threshold, the parameter control unit 133 decides the maximum byte length of the MSDU so that the maximum byte length of the MSDU is greater than the default transmission parameter. Thus, since the increase or decrease in the opposite direction of the increase or decrease in the transmission opportunities by DSC is realized, an inequality of the transmission opportunities occurring between the HE terminal 200 and the legacy terminal 300 is reduced without deteriorating the improvement in the throughput of the entire system.

—Maximum Byte Length of Amount of Data Transmittable in a Bundle of Frames

For example, in the wireless LAN, a plurality of frames can be bundled to be transmitted. This is referred to as aggregation. A maximum byte length (maximum value) transmittable by the aggregation can be defined in a specification. For this parameter, as in the maximum byte length of the MSDU, when a maximum byte length is short, the transmission opportunities are decreased in transmission of data of the same number of bytes. Accordingly, the parameter control unit 133 decides the maximum byte length transmittable in the bundle of frames so that the maximum byte length of the amount of data is less than the default transmission parameter when the DSC threshold is greater than the default threshold. The parameter control unit 133 decides the maximum byte length of the amount of data transmittable in the bundle of frames so that the maximum byte length is greater than the default transmission parameter when the DSC threshold is less than the default threshold. Thus, since the increase or decrease in the opposite direction of the increase or decrease in the transmission opportunities by DSC is realized, an inequality of the transmission opportunities occurring between the HE terminal 200 and the legacy terminal 300 is reduced without deteriorating the improvement in the throughput of the entire system.

—TXOP Limit

For example, in the wireless LAN, the wireless terminal can schedule pseudo-transmission during a predetermined time. The schedulable maximum time is a transmission opportunity (TXOP) limit and corresponds to a maximum value of a transmittable time duration. The wireless terminal may transmit one long wireless packet within the range of the TXOP limit or may continuously transmit a plurality of wireless packets while providing a non-transmission interval. The TXOP limit is different according to each access category. When the TXOP limit is small, the number of acquisitions of the transmission right is increased to that extent. Therefore, the transmission opportunities are decreased in the transmission of the data of the same number of bytes. Accordingly, the parameter control unit 133 decides the TXOP limit so that the TXOP limit is less than the default transmission parameter when the DSC threshold is greater than the default threshold. The parameter control unit 133 decides the TXOP limit so that the TXOP limit is greater than the default transmission parameter when the DSC threshold is less than the default threshold. Thus, since the increase or decrease in the opposite direction of the increase or decrease in the transmission opportunities by DSC is realized, an inequality of the transmission opportunities occurring between the HE terminal 200 and the legacy terminal 300 is reduced without deteriorating the improvement in the throughput of the entire system.

—Maximum Number of Retransmissions

A maximum number of retransmissions is an upper limit of retransmission of the same frame. When the maximum number of transmissions is reduced, the number of transmissions of the same frame is decreased. Therefore, the number of transmissions of data is decreased. Accordingly, the parameter control unit 133 decides the maximum number of retransmissions so that the maximum number of retransmissions is less than the default transmission parameter when the DSC threshold is greater than the default threshold. The parameter control unit 133 decides the maximum number of retransmissions so that the maximum number of retransmissions is greater than the default transmission parameter when the DSC threshold is less than the default threshold. Thus, since the increase or decrease in the opposite direction of the increase or decrease in the transmission opportunities by DSC is realized, an inequality of the transmission opportunities occurring between the HE terminal 200 and the legacy terminal 300 is reduced without deteriorating the improvement in the throughput of the entire system.

—Maximum Number of Simultaneously Usable Channels

A maximum number of simultaneously usable channels is a maximum value of the number of unit channels usable in a bundle by the wireless terminal. The unit channel is a minimum bandwidth necessary for the wireless terminal to transmit a frame. The wireless terminal can improve a throughput by bundling and transmitting the plurality of unit channels. This effect is improved as the number of bundled channels is greater. Here, as the number of bundled channels is greater, the transmission opportunities at a plurality of channels are acquired more. Accordingly, the parameter control unit 133 decides the maximum number of simultaneously usable channels so that the maximum number of simultaneously usable channels is less than the default transmission parameter when the DSC threshold is greater than the default threshold. The parameter control unit 133 decides the maximum number of simultaneously usable channels so that the maximum number of simultaneously usable channels is greater than the default transmission parameter when the DSC threshold is less than the default threshold. Thus, since the increase or decrease in the opposite direction of the increase or decrease in the transmission opportunities by DSC is realized, an inequality of the transmission opportunities occurring between the HE terminal 200 and the legacy terminal 300 is reduced without deteriorating the improvement in the throughput of the entire system.

—Usable Channel

For example, consider a case in which channels often used by the HE terminal 200 and channels often used by the legacy terminal 300 coexist. In this case, the base station 100 can prevent the HE terminal 200 from excessively acquiring the transmission opportunities by restricting an operation in the DSC mode only in data transmission performed using a channel dominantly used by the HE terminal 200. For example, the parameter control unit 133 restricts the usable channels to the channels dominantly used by the HE terminal 200 when the DSC threshold is greater than the default threshold. The parameter control unit 133 allows the HE terminal 200 to use the channels not dominantly used by the HE terminal 200 when the DSC threshold is less than the default threshold. Thus, since the increase or decrease in the opposite direction of the increase or decrease in the transmission opportunities by DSC is realized, an inequality of the transmission opportunities occurring between the HE terminal 200 and the legacy terminal 300 is reduced without deteriorating the improvement in the throughput of the entire system. The base station 100 may provide a channel that is dedicated to the HE terminal 200 and restrict the data transmission in the DSC mode to only that channel.

—Period Scheduled in Advance as DSC-Usable Time

A period scheduled in advance as a DSC-usable time is, for example, a period which is ensured using a restricted access window (RAW) of IEEE 802.11ah and is a period scheduled as a transmittable time slot. The RAW is a scheduling mechanism performed in advance by the base station 100. According to the mechanism, the base station 100 can select several wireless terminals among the wireless terminals connected to the base station 100 and can set a period in which only the selected wireless terminals can acquire the transmission right using CSMA/CA. For example, the parameter control unit 133 restricts a time slot in which DSC is usable and decides a period in which only the HE terminal 200 can transmit data and a period in which only the legacy terminal 300 can transmit data. Thus, the parameter control unit 133 can create an environment in which the legacy terminal 300 is pseudo-non-existent or create an environment in which the HE terminal 200 is pseudo-non-existent, and thus can correct an inequality of the transmission opportunities in accordance with the length of the period.

—Types of Frames that are Transmittable Using DSC

The parameter control unit 133 restricts the frames that are transmittable using DSC. Various types of frames that are transmittable using DSC are considered. For example, the types of frames that are transmittable using DSC may be management frames of IEEE 802.11. The management frames are frames used to form or manage a wireless network in frames of IEEE 802.11 as in a beacon. Moreover, a type of frame that is transmittable using DSC may be, for example, a frame in which an access category of IEEE 802.11 is AC_VO. AC_VO is a frame in which quality of service (QoS) is high priority. Moreover, a type of frame that is transmittable using DSC may be, for example, a frame in which an access category of IEEE 802.11 is AC_VI. AC_VI is a frame in which QoS is second priority. Moreover, a type of frame that is transmittable using DSC may be, for example, a frame in which an access category of IEEE 802.11 is AC_BE. AC_BE is a frame in which QoS is third priority. Moreover, a type of frame that is transmittable using DSC may be, for example, a frame in which an access category of IEEE 802.11 is AC_BK. AC_BK is a frame in which QoS is fourth priority. In this way, the parameter control unit 133 can reduce the number of frames transmitted using DSC by restricting the types of frames that are transmittable using DSC. Thus, since the increase or decrease in the opposite direction of the increase or decrease in the transmission opportunities by DSC is realized, an inequality of the transmission opportunities occurring between the HE terminal 200 and the legacy terminal 300 is reduced without deteriorating the improvement in the throughput of the entire system.

The specific examples of the DSC threshold and the DSC transmission parameter decided by the parameter control unit 133 have been described above.

The parameter control unit 133 stores information indicating the decided CCA threshold and transmission parameter in the DSC reply message. For example, when operation in the DSC mode is permitted by the DSC control unit 131, the parameter control unit 133 stores information indicating the DSC threshold and information indicating the DSC transmission parameter. Conversely, when operation in the DSC mode is not permitted by the DSC control unit 131, the parameter control unit 133 may store none of the information or may store information indicating the default threshold and information indicating the default transmission parameter. The information indicating the CCA threshold and the transmission parameter may be a numerical value to be set, may be an amount of change from a default, or may be an index indicating one of pre-decided candidates.

(Supplements)

The control unit 130 may reply to the HE terminal 200 with one message including information indicating whether operation in the DSC mode is permitted and the information indicating the DSC threshold and the DSC transmission parameter or may separately reply to the HE terminal 200 with the pieces of information. After the control unit 130 replies to the HE terminal 200 with the message including the information indicating whether operation in the DSC mode is permitted, the DSC transmission parameter may be decided by the parameter control unit 133.

The DSC control unit 131 may unilaterally transmit a message for permitting operation in the DSC mode to the HE terminal 200 which has not transmitted the DSC request message. The DSC control unit 131 may transmit a message indicating prohibition of operation in the DSC mode to the HE terminal 200 which has already been permitted to perform operation in the DSC mode. The parameter control unit 133 may transmit a message for updating the DSC transmission parameter of the HE terminal 200 permitted to perform operation in the DSC mode at any timing according to a change in the condition in the communication system 1. This timing may be decided according to, for example, the number of legacy terminals 300 connected to the wireless communication unit 110. The base station 100 may operate in the DSC mode after the base station 100 permits at least one HE terminal to perform operation in the DSC mode.

The example of the configuration of the base station 100 according to the embodiment has been described above. Next, an example of the configuration of the HE terminal 200 according to the embodiment will be described with reference to FIG. 4.

2-3. Example of Configuration of HE Terminal

Figure 4:
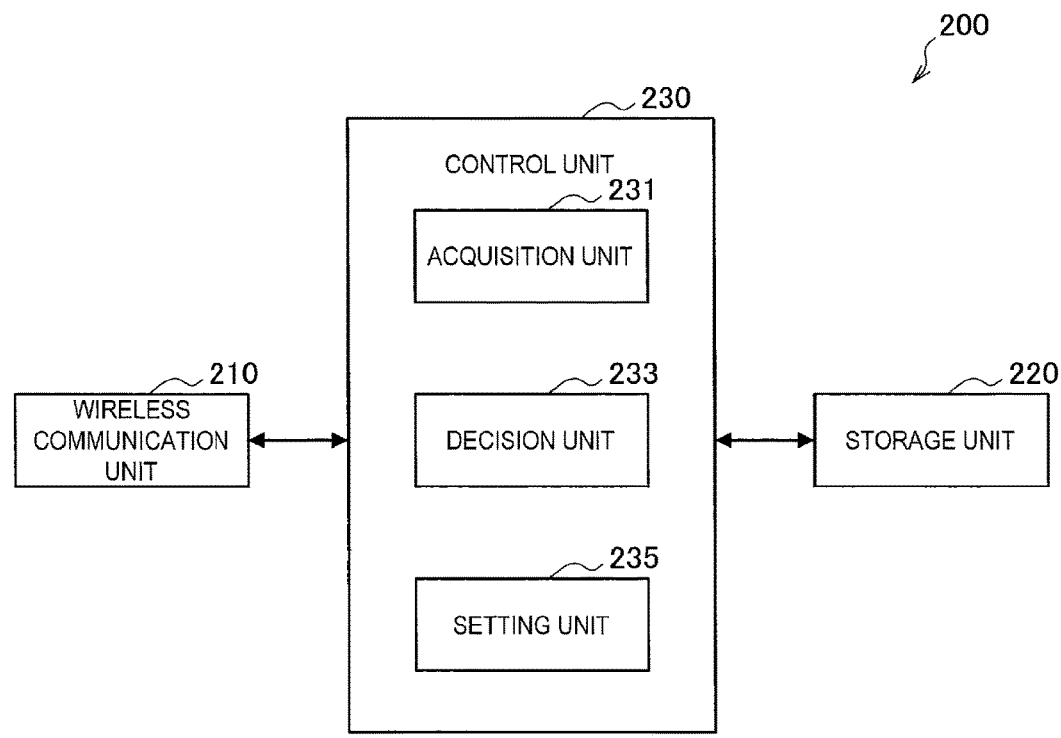
FIG. 4 is a block diagram showing an example of a logical configuration of an HE terminal according to the first embodiment.

FIG. 4 is a block diagram showing an example of a logical configuration of the HE terminal 200 according to a first embodiment. As shown in FIG. 4, the HE terminal 200 includes a wireless communication unit 210, a storage unit 220, and a control unit 230.

(1) Wireless Communication Unit 210

The wireless communication unit 210 is a wireless communication interface that relays wireless communication with another device through the HE terminal 200. In the embodiment, the wireless communication unit 210 performs wireless communication with the base station 100. For example, the wireless communication unit 210 receives a wireless signal transmitted from the base station 100. The wireless communication unit 210 may have, for example, functions of an amplifier, a frequency converter, a demodulator, and the like and can output received data to the control unit 230. The wireless communication unit 210 transmits a wireless signal to the base station 100 via an antenna. The wireless communication unit 210 may have, for example, functions of a modulator, an amplifier, and the like and may perform modulation, power amplification, and the like on data output from the control unit 230 to transmit the data.

The wireless communication unit 210 according to the embodiment transmits the DSC request message output from the control unit 230 to the base station 100. 210 receives the DSC reply message replied from the base station 100 and outputs the DSC reply message to the control unit 230. The wireless communication unit 210 may transmit or receive an acknowledgement (ACK) indicating that the reception of the control message succeeds.

The function of the wireless communication unit 210 will be described in more detail. The wireless communication unit 210 transmits and receives a packet by performing general signal processing of the data link layer and the physical layer related to data transmission and reception. Specifically, a process of the data link layer includes addition and removal of an LLC/SNAP header to and from a data payload from an upper layer, addition/removal of an MAC header, addition of an error detection code/detection of a packet error, retransmission, a media access process by CSMA/CA, and generation of a management frame and a control frame. Specifically, a process of the physical layer includes a process of encoding, interleaving, and modulating processes based on coding and modulation schemes set by the control unit 130, addition of a PLCP header and a PLCP preamble, detection or a channel estimation process by a preamble, analog/digital signal conversion, frequency conversion, amplification, and filtering.

The wireless communication unit 210 transmits transmission data using the CCA threshold and the transmission parameter set by the control unit 230.

(2) Storage Unit 220

The storage unit 220 is a unit that records and reproduces data on and from a predetermined recording medium. The storage unit 220 is realized as, for example, an HDD. Of course, as the recording medium, any of various recording media such as a solid-state memory such as a flash memory, a memory card, an optical disc, or a magneto-optical disc containing a fixed memory, and a hologram memory can be considered. The storage unit 220 may be considered to have a configuration in which recording and reproducing can be performed according to an adopted recording medium.

The storage unit 220 according to the embodiment stores the default threshold and the information indicating the transmission parameter in the normal mode. The storage unit 220 may store the DSC threshold and the transmission parameter in the DSC mode.

(3) Control Unit 230

The control unit 230 functions as an arithmetic processing device and a control device and controls general operations in the HE terminal 200 according to various programs. The control unit 230 is realized by, for example, an electronic circuit such as a CPU or a microprocessor. The control unit 230 may include a ROM that stores programs or arithmetic parameters to be used and a RAM that temporarily stores appropriately changed parameters.

For example, based on an instruction from an upper application, the control unit 230 controls the wireless communication unit 210 such that data is transmitted and received. For example, the control unit 230 controls the wireless communication unit 210 so that data is transmitted after an empty channel is confirmed by carrier sense. For example, the control unit 230 generates the DSC request message, transmits the DSC request message to the base station 100, and sets the CCA threshold and the transmission parameter based on the DSC reply message replied from the base station 100.

The control unit 230 has a function of controlling the CCA threshold and the transmission parameter. Specifically, the control unit 230 has a function of setting the DSC threshold and controlling the transmission parameter based on a comparison result between the set DSC threshold and the default threshold value. Specifically, the control unit 230 sets the transmission parameter for applying the increase or decrease in the opposite direction of the increase or decrease in transmission opportunities by DSC. Specifically, when the DSC threshold is greater than the default threshold, the transmission opportunities are greater in the DSC mode than in the normal mode. Therefore, the control unit 230 controls the DSC transmission parameter such that the transmission opportunities are decreased to be more than at the time of use of the default transmission parameter. When the DSC threshold is less than the default threshold, the transmission opportunities are lower in the DSC mode than in the normal mode. Therefore, the control unit 230 controls the DSC transmission parameter such that the transmission opportunities are increased to be more than at the time of use of the default transmission parameter. As shown in FIG. 4, the control unit 230 functions as an acquisition unit 231, a decision unit 233, and a setting unit 235.

(3-1) Acquisition Unit 231

The acquisition unit 231 has a function of acquiring information indicating the CCA threshold to be set and information indicating the transmission parameter. For example, the acquisition unit 231 may acquire information indicating the DSC threshold and the DSC transmission parameter. The acquisition unit 231 may acquire information indicating the default threshold and the default transmission parameter. The acquisition unit 231 may acquire such information from the base station 100 or may acquire such information from the storage unit 220. For example, the acquisition unit 231 may acquire the information indicating the DSC threshold and the DSC transmission parameter to change the operation mode to the DSC mode according to occurrence of a data transmission request, a reduction in a transmission success probability, a rise in transmission suppression establishment by the carrier sense, and the like.

The acquisition unit 231 transmits the DSC request message to the base station 100 through the wireless communication unit 210 when the acquisition unit 231 acquires the information from the base station 100. The acquisition unit 231 acquires the information included in the DSC reply message received by the wireless communication unit 210 and indicating whether operation in the DSC mode is permitted, the information indicating the CCA threshold to be set and included in the DSC reply message, and the information indicating the transmission parameter and included in the DSC reply message.

(3-2) Decision Unit 233

The decision unit 233 has a function of determining whether to change the default threshold to the DSC threshold and whether to perform data transmission using the DSC transmission parameter and deciding the operation mode. The decision unit 233 determines whether all of the conditions are satisfied. When all of the conditions are satisfied, the decision unit 233 decides the DSC mode as the operation mode. When all of the conditions are not satisfied, the decision unit 233 decides the normal mode as the operation mode. Moreover, when at least one of the plurality of conditions is satisfied, the decision unit 233 may decide the DSC mode as the operation mode.

For example, the decision unit 233 may determine whether to perform the data transmission based on whether a transmission time is included in a period scheduled in advance as a DSC-usable time. Specifically, the decision unit 233 decides to perform the data transmission in the DSC mode when the transmission time is included in the DSC-usable period indicated by the DSC transmission parameter. The decision unit 233 decides to perform the operation in the normal mode when the transmission time is not included in the DSC-usable period.

For example, the decision unit 233 may determine whether to perform the data transmission based on a kind of frame to be transmitted. For example, the decision unit 233 may determine whether to perform the data transmission based on whether the frame for which transmission is currently being attempted is included in a kind of frame that is transmittable using DSC indicated by the DSC transmission parameter. Specifically, the decision unit 233 decides to perform operation in the DSC mode when the frame for which transmission is currently being attempted is included in the kind of frame that is transmittable using DSC. Conversely, the decision unit 233 decides to perform the operation in the normal mode when the frame for which transmission is currently being attempted is not included in the kind of frame that is transmittable using DSC.

(3-3) Setting Unit 235

The setting unit 235 has a function of setting the CCA threshold and the transmission parameter. The setting unit 235 sets the DSC threshold and the DSC transmission parameter when the decision unit 233 decides the DSC mode as the operation mode. Conversely, the setting unit 235 sets the default threshold and the default transmission parameter when the decision unit 233 decides the normal mode as the operation mode.

The example of the configuration of the HE terminal 200 according to the embodiment has been described.

2-4. Example of Configuration of Legacy Terminal

The configuration of the legacy terminal 300 is the same as that of a general wireless terminal. For example, the legacy terminal 300 may have a configuration in which the acquisition unit 231 and the decision unit 233 are omitted from the configuration of the HE terminal 200. The legacy terminal 300 transmits data using the default threshold and the default transmission parameter.

The example of the configuration of each device included in the communication system 1 according to the embodiment has been described. Hereinafter, an operation process of the communication system 1 according to the embodiment will be described. First, a DSC use permission process will be described with reference to FIG. 1.

2-5. DSC Use Permission Process

Figure 5:
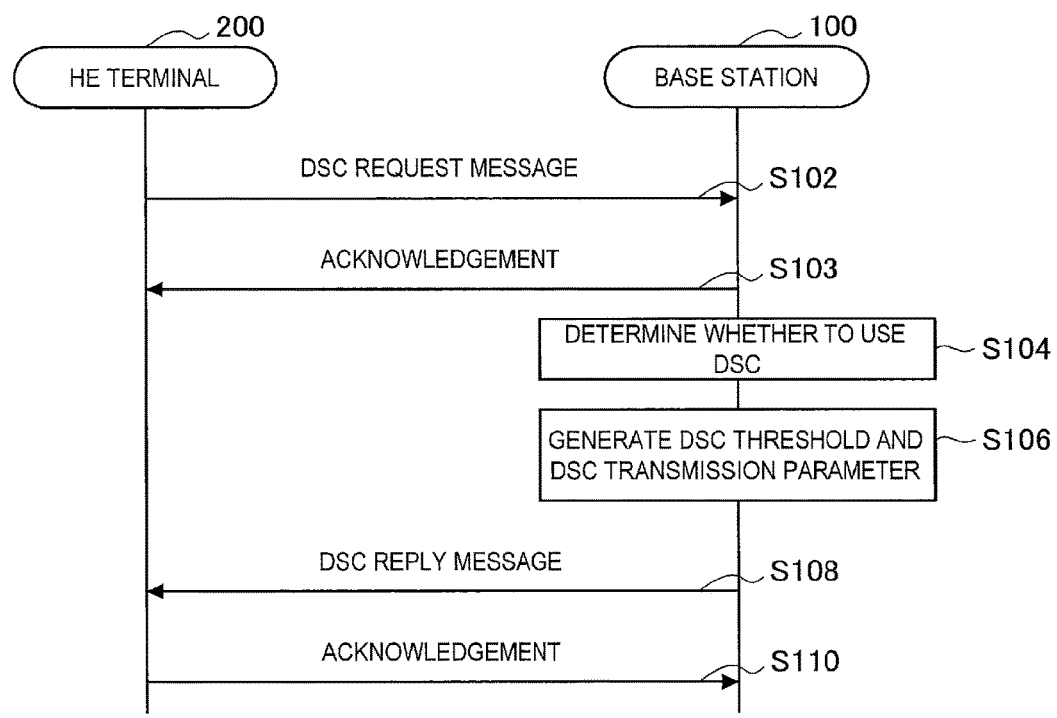
FIG. 5 is a sequence diagram showing an example of the flow of a DSC use permission process performed in a communication system according to the first embodiment.

FIG. 5 is a sequence diagram showing an example of the flow of a DSC use permission process performed in the communication system 1 according to the first embodiment. As shown in FIG. 5, the base station 100 and the HE terminal 200 participate in this sequence.

First, in step S102, the HE terminal 200 transmits the DSC request message to the base station 100. For example, the acquisition unit 231 transmits the DSC request message according to occurrence of a data transmission request, a reduction in a transmission success probability, a rise in transmission suppression establishment by the carrier sense, and the like.

Next, in step S103, the base station 100 succeeding in the reception of the DSC request message replies to the HE terminal 200 with an acknowledgement.

Subsequently, in step S104, the base station 100 determines whether to use DSC. For example, the DSC control unit 131 determines whether to permit the HE terminal 200 which is a transmission source of the DSC request message to operate in the DSC mode based on the number of legacy terminals 300 among the other devices connected to the wireless communication unit 110. Hereinafter, a process when the use of DSC is permitted will be described.

Subsequently, in step S106, the base station 100 generates the DSC threshold and the DSC transmission parameter. For example, the parameter control unit 133 decides the DSC threshold and the DSC transmission parameter based on the number of legacy terminals 300 among the other devices connected to the wireless communication unit 110. Moreover, the parameter control unit 133 may decide the DSC transmission parameter based on a difference between the DSC threshold and the default threshold. At this time, the parameter control unit 133 decides a value for applying the increase or decrease in the opposite direction of the increase or decrease in transmission opportunities by DSC.

Subsequently, in step S108, the base station 100 transmits the DSC reply message to the HE terminal 200. For example, the base station 100 generates the DSC reply message that stores the information permitting the use of DSC, the DSC threshold, and the DSC transmission parameter and transmits the DSC reply message to the HE terminal 200. When the DSC control unit 131 does not permit the use of DSC in the foregoing step S104, information indicating that the use of DSC is not permitted is stored in the DSC reply message.

Next, in step S110, the HE terminal 200 succeeding in the reception of the DSC reply message replies to the base station 100 with an acknowledgement.

As described above, the communication system 1 according to the embodiment can dynamically control whether operation in the DSC mode is performed and can dynamically change the transmission parameter. At this time, the communication system 1 can adjust the transmission parameter based on the degree of inequality occurring between the HE terminal 200 and the legacy terminal 300. Therefore, the communication system 1 can reduce an inequality of the transmission opportunities between the HE terminal 200 and the legacy terminal 300 while improving a throughput by using DSC.

The DSC use permission process has been described above. Next, a data transmission process by the HE terminal 200 will be described with reference to FIGS. 6 to 8.

2-6. Data Transmission Process

Figure 6:
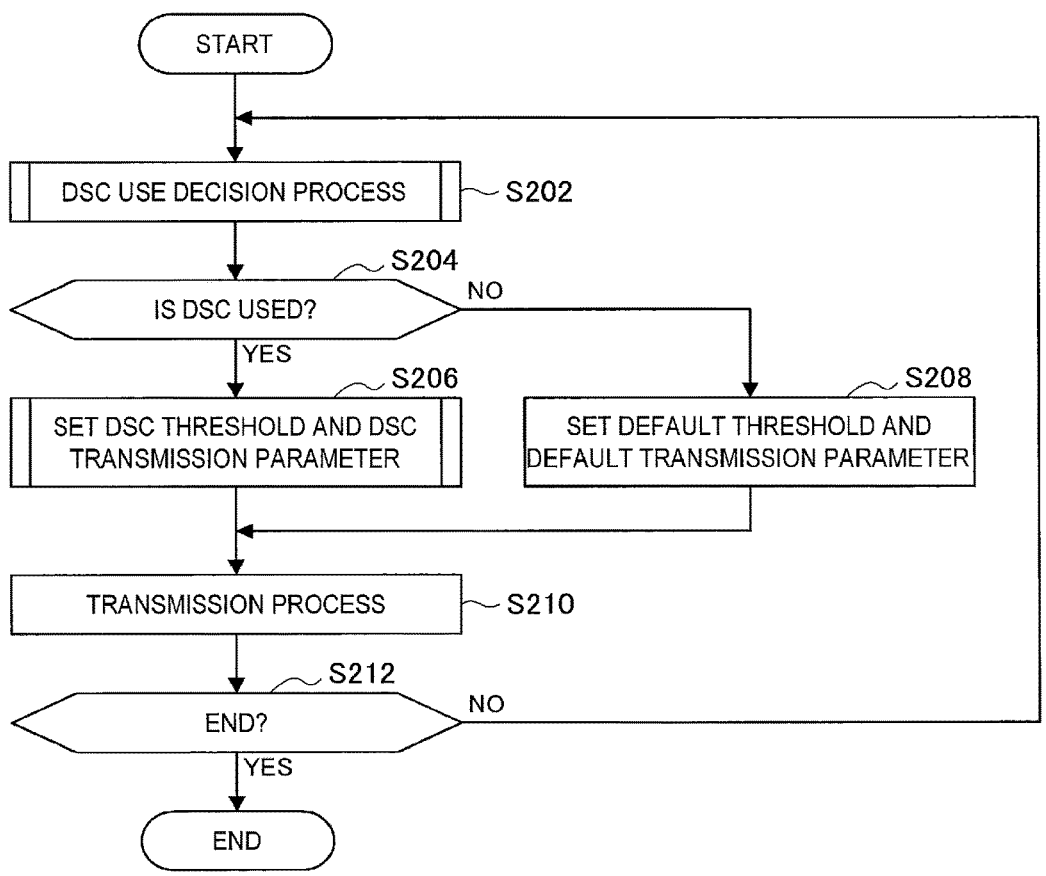
FIG. 6 is a flowchart showing an example of the flow of a data transmission process by the HE terminal according to the first embodiment.

FIG. 6 is a flowchart showing an example of the flow of a data transmission process by the HE terminal 200 according to the embodiment.

As shown in FIG. 6, in step S202, the HE terminal 200 first performs a DSC use decision process. Since this process will be described below, the detailed description thereof will be omitted here.

Subsequently, in step S204, the setting unit 235 determines whether to use DSC with reference to a process result by the decision unit 233.

When DSC is used (YES in S204), the setting unit 235 sets the DSC threshold and the DSC transmission parameter in step S206. For example, the setting unit 235 sets the DSC threshold and the DSC transmission parameter included in the DSC reply message. For example, when the DSC threshold is greater than the default threshold, the HE terminal 200 acquires more transmission opportunities than the legacy terminal 300. In this case, the setting unit 235 sets the DSC transmission parameter so that the transmission opportunities are less than those of the legacy terminal 300. Conversely, when the DSC threshold is less than the default threshold, the HE terminal 200 acquires less transmission opportunities than the legacy terminal 300. In this case, the setting unit 235 sets the DSC transmission parameter so that the transmission opportunities are more than those of the legacy terminal 300. The setting unit 235 realizes the increase or decrease in the opposite direction of the increase or decrease in the transmission opportunities by DSC by performing such setting, and thus an inequality of the transmission opportunities occurring between the HE terminal 200 and the legacy terminal 300 can be reduced without deteriorating the improvement in the throughput of the entire system. Since this process will be described below, the detailed description thereof will be omitted herein.

When DSC is not used (NO in S204), the setting unit 235 sets the default threshold and the default transmission parameter in step S208. For example, the setting unit 235 sets the default threshold and the default transmission parameter with reference to the storage unit 220.

Then, in step S210, the wireless communication unit 210 transmits the transmission data using the CCA threshold and the transmission parameter set by the control unit 230. In the transmission process, for example, general CSMA/CA is performed.

Subsequently, in step S212, the control unit 230 performs ending determination. For example, the control unit 230 determines that the process does not end when the transmission data remains. The control unit 230 determines that the process ends when the transmission data does not remain. When the control unit 230 determines that the process does not end (NO in S212), the process returns to step S202. When the control unit 230 determines that the process ends (YES in S212), the control unit 230 ends the process.

The data transmission process by the HE terminal 200 has been described above. Next, the detailed operation of DSC use decision process in step S202 of FIG. 6 will be described with reference to FIG. 7.

2-7. DSC Use Decision Process

Figure 7:
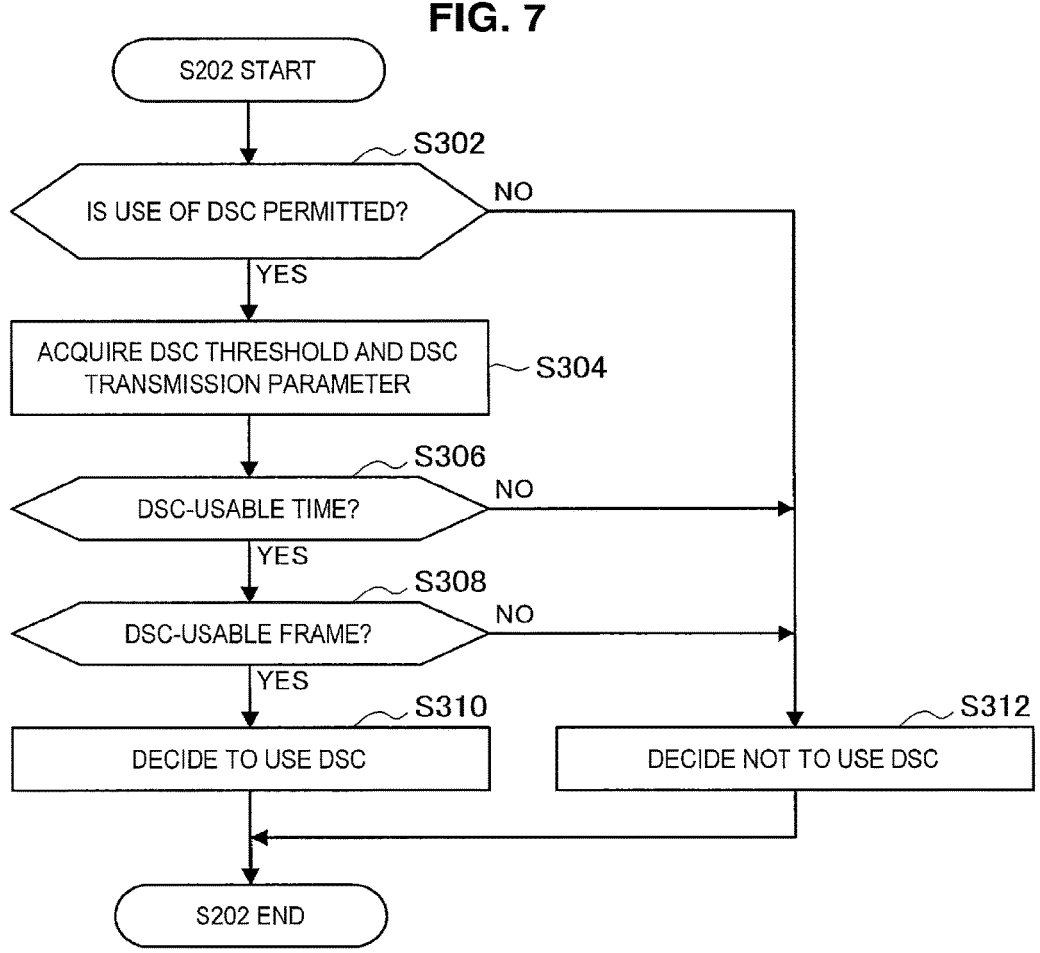
FIG. 7 is a flowchart showing an example of the flow of a DSC use decision process by the HE terminal according to the first embodiment.

FIG. 7 is a flowchart showing an example of the flow of a DSC use decision process by the HE terminal 200 according to the first embodiment.

As shown in FIG. 7, in step S302, the acquisition unit 231 first determines whether the use of DSC is permitted. For example, the acquisition unit 231 determines whether the use of DSC is permitted with reference to information indicating whether to use DSC and stored in the DSC reply message received from the base station 100 in the DSC use permission process described above with reference to FIG. 5.

When it is determined that the use of DSC is not permitted (NO in S302), the decision unit 233 decides not to use DSC and decides to operate in the normal mode in step S312.

Conversely, when it is determined that the use of DSC is permitted (YES in S302), the acquisition unit 231 acquires the DSC threshold and the DSC transmission parameter in step S304. For example, the acquisition unit 231 acquires the information indicating the DSC threshold and the DSC transmission parameter from the DSC reply message received from the base station 100 in the DSC use permission process described above with reference to FIG. 5.

The DSC transmission parameter can include information indicating at least one of, for example, the IFS, the slot time, the CW min, the CW max, and the form of the probability distribution of the CW, the maximum byte length of the MSDU, the maximum byte length of the amount of data transmittable in a bundle of frames, the TXOP limit, the maximum number of retransmissions, the maximum number of simultaneously usable channels, and a usable channel. Moreover, the DSC transmission parameter may include the period scheduled in advance as the DSC-usable time and the type of frame that is transmittable using DSC.

Subsequently, in step S306, the decision unit 233 determines whether a current time is a DSC-usable time. For example, the decision unit 233 determines whether the current time is included in the period scheduled in advance as the DSC-usable time and included in the DSC reply message. Specifically, when the current time is included in the DSC-usable period, the decision unit 233 determines that the current time is the DSC-usable time. Conversely, when the current time is not included in the DSC-usable period, the decision unit 233 determines that the current time is not the DSC-usable time.

When the decision unit 233 determines that the current time is not the DSC-usable time (NO in S306), the decision unit 233 decides that DSC is not used and decides to perform the operation in the normal mode.

Conversely, when the decision unit 233 determines that the current time is the DSC-usable time (YES in S306), the decision unit 233 determines whether the frame for which transmission is currently being attempted is the frame that is transmittable using DSC in step S308. For example, the decision unit 233 may determine whether the frame for which transmission is currently being attempted is included in the type of frame that is transmittable using DSC and included in the DSC reply message. Specifically, when the frame for which transmission is currently being attempted is included in the type of frame that is transmittable using DSC, the decision unit 233 determines that the frame is the DSC-usable frame. Conversely, when the frame for which transmission is currently being attempted is not included in the type of frame that is transmittable using DSC, the decision unit 233 determines that the frame is not the DSC-usable frame.

When it is determined that the frame is not the DSC-usable frame (NO in S308), the decision unit 233 decides not to use DSC and decides to perform the operation in the normal mode in step S312.

Conversely, when it is determined that the frame is the DSC-usable frame (YES in S308), the decision unit 233 decides to use DSC and decides to perform operation in the DSC mode in step S310. In this way, the communication system 1 can reduce an inequality of the transmission opportunities occurring between the HE terminal 200 and the legacy terminal 300 by imposing the restriction on the time slot or the frame with which the HE terminal 200 can transmit data using DSC.

The DSC use decision process by the HE terminal 200 has been described above. Next, the detailed operation of the process of setting the DSC threshold and the DSC transmission parameter in step S206 of FIG. 6 will be described with reference to FIG. 8.

2-8. Process of Setting DSC Threshold and DSC Transmission Parameter

Figure 8:
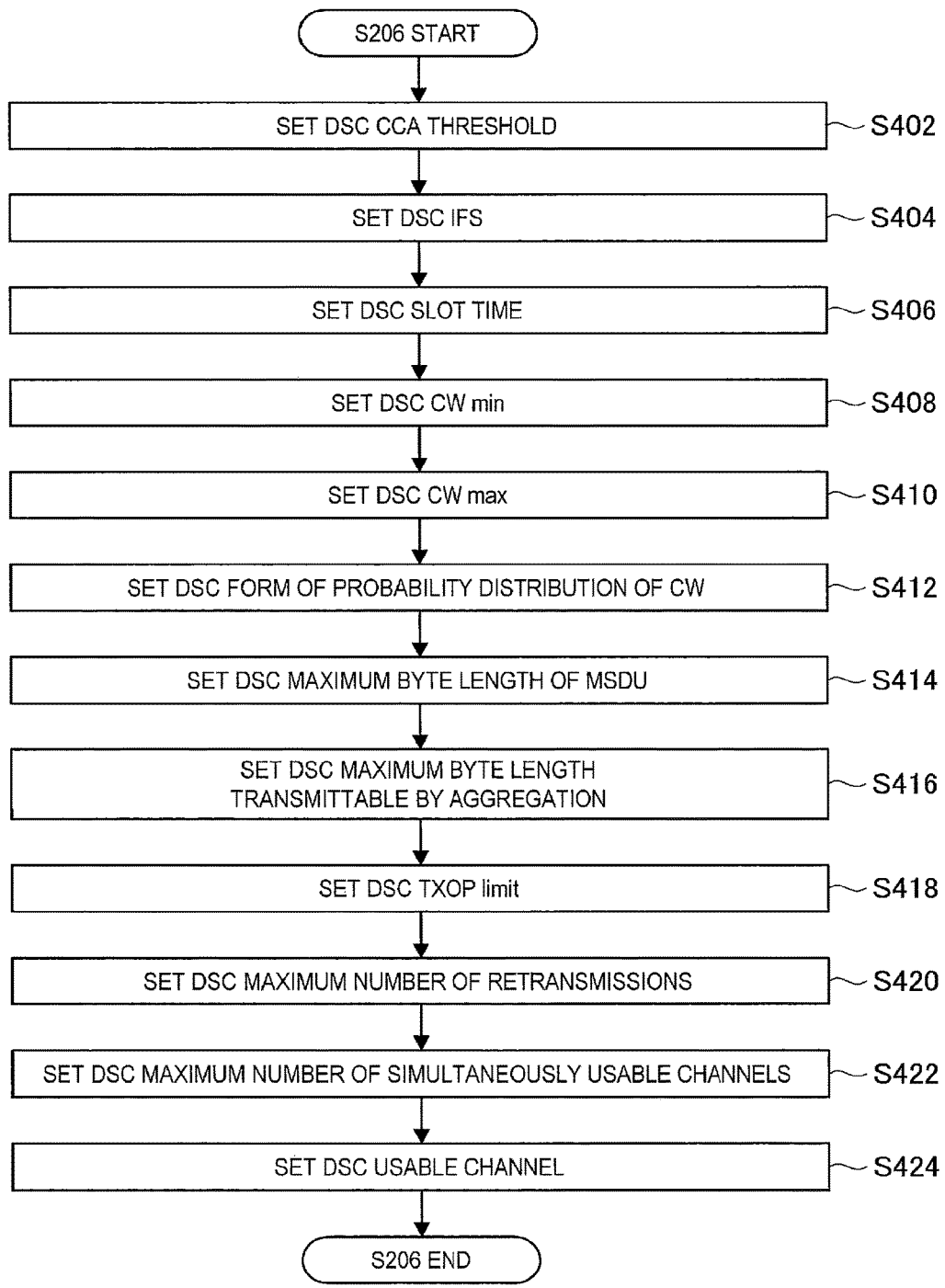
FIG. 8 is a flowchart showing an example of the flow of a process of setting a DSC threshold and a DSC transmission parameter by the HE terminal according to the first embodiment.

FIG. 8 is a flowchart showing an example of the flow of a process of setting a DSC threshold and a DSC transmission parameter by the HE terminal 200 according to the first embodiment.

As shown in FIG. 8, in step S402, the setting unit 235 sets the DSC threshold included in the DSC reply message, that is, the DSC CCA threshold.

Subsequently, in step S404, the setting unit 235 sets the DSC IFS included in the DSC reply message.

Subsequently, in step S406, the setting unit 235 sets the DSC slot time included in the DSC reply message.

Subsequently, in step S408, the setting unit 235 sets the DSC CW min included in the DSC reply message.

Subsequently, in step S410, the setting unit 235 sets the DSC CW max included in the DSC reply message.

Subsequently, in step S412, the setting unit 235 sets the DSC form of the probability distribution of the CW included in the DSC reply message.

Subsequently, in step S414, the setting unit 235 sets the DSC maximum byte length of the MSDU included in the DSC reply message.

Subsequently, in step S416, the setting unit 235 sets the DSC maximum byte length transmittable by the aggregation and included in the DSC reply message.

Subsequently, in step S418, the setting unit 235 sets the DSC TXOP limit included in the DSC reply message.

Subsequently, in step S420, the setting unit 235 sets the DSC maximum number of retransmissions included in the DSC reply message.

Subsequently, in step S422, the setting unit 235 sets the DSC maximum number of simultaneously usable channels included in the DSC reply message.

Subsequently, in step S424, the setting unit 235 sets the DSC usable channel included in the DSC reply message.

The process of setting the DSC threshold and the DSC transmission parameter by the HE terminal 200 has been described above. The foregoing flow can also be set in the default threshold and the default transmission parameter.

3. SECOND EMBODIMENT

The embodiment is a mode in which the HE terminal 200 can autonomously perform an operation in the DSC mode without being controlled by the base station 100. The configuration of each device included in the communication system 1 according to the embodiment is the same as that described in the first embodiment. Hereinafter, a characteristic configuration of the HE terminal 200 according to the embodiment will be described.

3-1. Example of Configuration of HE Terminal (1) Storage Unit 220

The storage unit 220 according to the embodiment stores the DSC threshold and the DSC transmission parameter in addition to the default threshold and the default transmission parameter. The DSC transmission parameter may be stored in advance or may be stored or updated based on a signal from the base station 100. Examples of the signal from the base station 100 include a beacon and a probe response.

(2) Acquisition Unit 231

The acquisition unit 231 according to the embodiment acquires the CCA threshold and the transmission parameter in either the normal mode or the DSC mode with reference to the storage unit 220. The acquisition unit 231 may autonomously acquire a threshold and a transmission parameter to be used among a plurality of candidates for the DSC threshold and the transmission parameter according to occurrence of a data transmission request, a reduction in a transmission success probability, a rise in transmission suppression establishment by the carrier sense, and the like.

(3) Decision Unit 233

The decision unit 233 according to the embodiment decides the operation mode. For example, the decision unit 233 decides whether to autonomously perform operation in the DSC mode according to the occurrence of the data transmission request, the reduction in the transmission success probability, the rise in the transmission suppression establishment by the carrier sense, and the like.

The example of the characteristic configuration of the HE terminal 200 in the embodiment has been described. Next, an operation process according to the embodiment will be described.

3-2. Operation Process

In the embodiment, the same operation process as that of the first embodiment described above with reference to FIG. 6 is performed. However, the DSC use decision process in step S202 is different. Accordingly, the detailed operation of the DSC use decision process according to the embodiment will be described with reference to FIG. 9.

Figure 9:
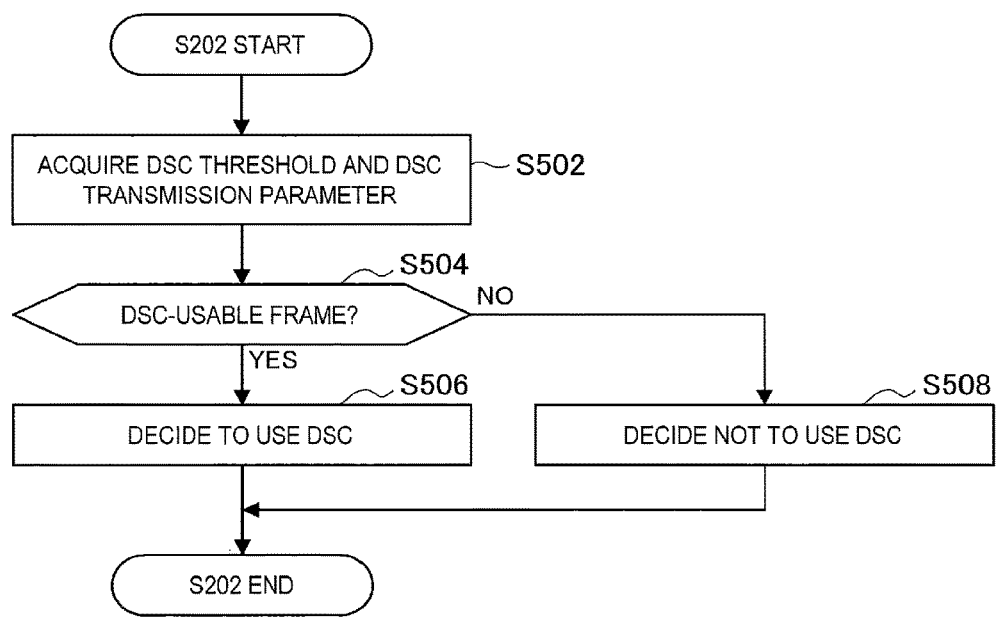
FIG. 9 is a flowchart showing an example of the flow of a DSC use decision process by an HE terminal according to a second embodiment.

FIG. 9 is a flowchart showing an example of the flow of the DSC use decision process by the HE terminal 200 according to the embodiment.

As shown in FIG. 9, in step S502, the acquisition unit 231 first acquires the DSC threshold and the DSC transmission parameter with reference to the storage unit 220. Here, since there is no coordinator controlling the DSC threshold, the acquisition unit 231 is assumed to acquire the DSC threshold greater than the default threshold so that the transmission opportunities of the HE terminal 200 are increased. In this case, the acquisition unit 231 acquires the DSC transmission parameter so that the transmission opportunities of the HE terminal 200 are decreased. Of course, the acquisition unit 231 may acquire the DSC threshold less than the default threshold. In this case, the acquisition unit 231 acquires the DSC transmission parameter so that the transmission opportunities of the HE terminal 200 are increased. The specific example of the acquired transmission parameter has been described in the first embodiment.

Subsequently, in step S504, the decision unit 233 determines whether the frame for which transmission is currently being attempted is the frame that is transmittable using DSC.

For example, the decision unit 233 may determine whether the frame for which transmission is currently being attempted is included in the type of frame that is transmittable using DSC. The specific example of the type of frame has been described in the first embodiment.

When the decision unit 233 determines that the frame is not the DSC-usable frame (NO in S504), the decision unit 233 decides not to use DSC and decides the operation in the normal mode in step S508.

When the decision unit 233 determines that the frame is the DSC-usable frame (YES in S504), the decision unit 233 decides to use DSC and decides to perform operation in the DSC mode in step S506. In this way, the communication system 1 can reduce an inequality of the transmission opportunities occurring between the HE terminal 200 and the legacy terminal 300 by autonomously imposing the restriction on the frame with which the HE terminal 200 can transmit data using DSC.

The DSC use decision process according to the embodiment has been described above. The process of setting the DSC threshold and the DSC transmission parameter according to the embodiment has been described above with reference to FIG. 8.

4. THIRD EMBODIMENT

The embodiment is a mode in which the HE terminal 200 performs DSC for each channel. First, an overview of the communication system 1 according to the embodiment will be described with reference to FIG. 10.

Figure 10:
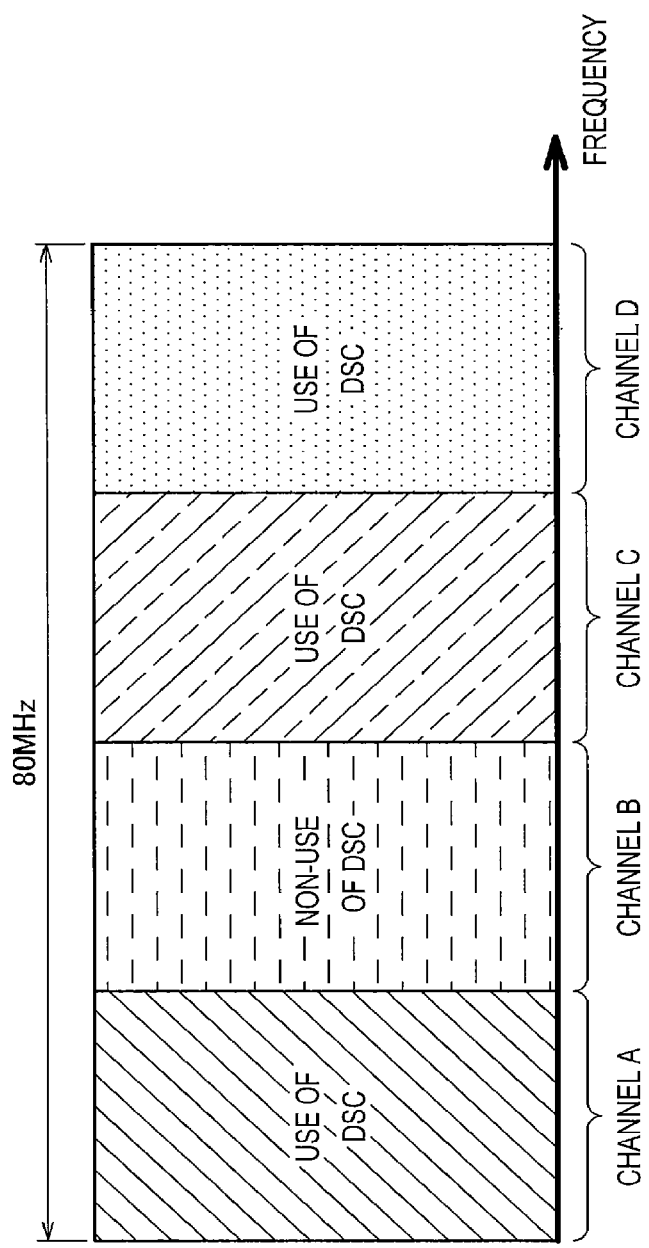
FIG. 10 is an explanatory diagram showing an example of a channel according to a third embodiment.

FIG. 10 is an explanatory diagram showing an example of a channel according to the embodiment. In the example shown in FIG. 10, the communication system 1 transmits and receives data using four channels, channels A, B, C, and D. A unit channel is set to, for example, 20 MHz. The channels are referred to as the channels A, B, C, and D in order from the unit channel with the lowest frequency. For example, the HE terminal 200 is assumed to transmit data using the channel A when the HE terminal 200 transmits the data with the unit channel using the channel A as a first channel (primary channel). The HE terminal 200 can also transmit data in a bundle of a plurality of channels. The HE terminal 200 according to the embodiment can sort out use or non-use of DSC for each unit channel, as shown in FIG. 10 when the HE terminal 200 transmits data in a bundle of the plurality of channels. The HE terminal 200 can set the different transmission parameter for each unit channel.

The configuration of each device included in the communication system 1 according to the embodiment is the same as that described in the first embodiment. Hereinafter, characteristic configurations of the base station 100 and the HE terminal 200 according to the embodiment will be described.

4-1. Example of Configuration of Base Station (1) DSC Control Unit 131

The DSC control unit 131 according to the embodiment has a function of controlling the operation mode of the HE terminal 200 for each channel. For example, the DSC control unit 131 determines whether to permit the HE terminal 200 which is a transmission source of a DSC request message of a certain channel to perform operation in the DSC mode at the channel. Determination standards are the same as those of the first embodiment. The DSC control unit 131 may allow the channels at which the use of DSC is permitted and the channels at which the use of DSC is not permitted to coexist.

The DSC control unit 131 determines whether to permit the use of DSC for each channel and stores information indicating a determination result in a DSC reply message.

The DSC control unit 131 may unilaterally transmit a message for permitting to perform operation in the DSC mode at any channel to the HE terminal 200 which has not transmitted the DSC request message. The DSC control unit 131 may transmit a message for prohibiting operation in the DSC mode at a certain channel to the HE terminal 200 which has already been permitted to perform operation in the DSC mode at the channel.

(2) Parameter Control Unit 133

The parameter control unit 133 has a function of deciding the DSC threshold and the DSC transmission parameter for each frequency (channel) used by the HE terminal 200 to transmit data. Decision standards and specific parameter decision content are the same as those of the first embodiment.

The parameter control unit 133 may transmit a message for updating the DSC transmission parameter of the HE terminal 200 permitted at a certain channel to perform operation in the DSC mode at the channel at any timing according to a change in the condition in the communication system 1. This timing may be decided according to, for example, the number of legacy terminals 300 connected to the wireless communication unit 110.

The parameter control unit 133 decides the DSC threshold for each channel. Then, the parameter control unit 133 decides the DSC transmission parameter for applying the increase or decrease in the opposite direction of the increase or decrease in transmission opportunities by DSC for each channel. Thus, the increase or decrease in the opposite direction of the increase or decrease in the transmission opportunities by DSC is realized for each channel. Accordingly, an inequality of the transmission opportunities occurring between the HE terminal 200 and the legacy terminal 300 for each channel is reduced without deteriorating the improvement in the throughput of the entire system.

4-2. Example of Configuration of HE Terminal (1) Wireless Communication Unit 210

The wireless communication unit 210 according to the embodiment can transmit data using the different CCA threshold and transmission parameter for each channel. The wireless communication unit 210 transmits data using the DSC threshold and the DSC transmission parameter at the channel at which the use of DSC is permitted by the base station 100. Conversely, the wireless communication unit 210 transmits data using the default threshold and the default transmission parameter at the channel at which the use of DSC is not permitted by the base station 100.

(2) Acquisition Unit 231

The acquisition unit 231 according to the embodiment has a function of acquiring information indicating the CCA threshold and information indicating the transmission parameter to be set for each channel. The acquisition unit 231 may transmit and receive a DSC request message and a DSC reply message for each channel or may transmit or receive the messages at all of the channels at once.

(3) Decision Unit 233

The decision unit 233 according to the embodiment has a function of determining whether to change the default threshold to the DSC threshold and to perform data transmission using the transmission parameter in the DSC mode and deciding the operation mode for each channel for each channel.

(4) Setting Unit 235

The setting unit 235 according to the embodiment has a function of setting the CCA threshold and the transmission parameter for each channel. The setting unit 235 may allow the channels at which the DSC threshold and the DSC transmission parameter are set and the channels at which the default threshold and the default transmission parameter are set to coexist.

The example of the configuration of each device included in the communication system 1 according to the embodiment has been described. Hereinafter, an operation process of the communication system 1 according to the embodiment will be described. First, a DSC use permission process will be described with reference to FIGS. 11 and 12.

4-3. DSC Use Permission Process

Figure 11:
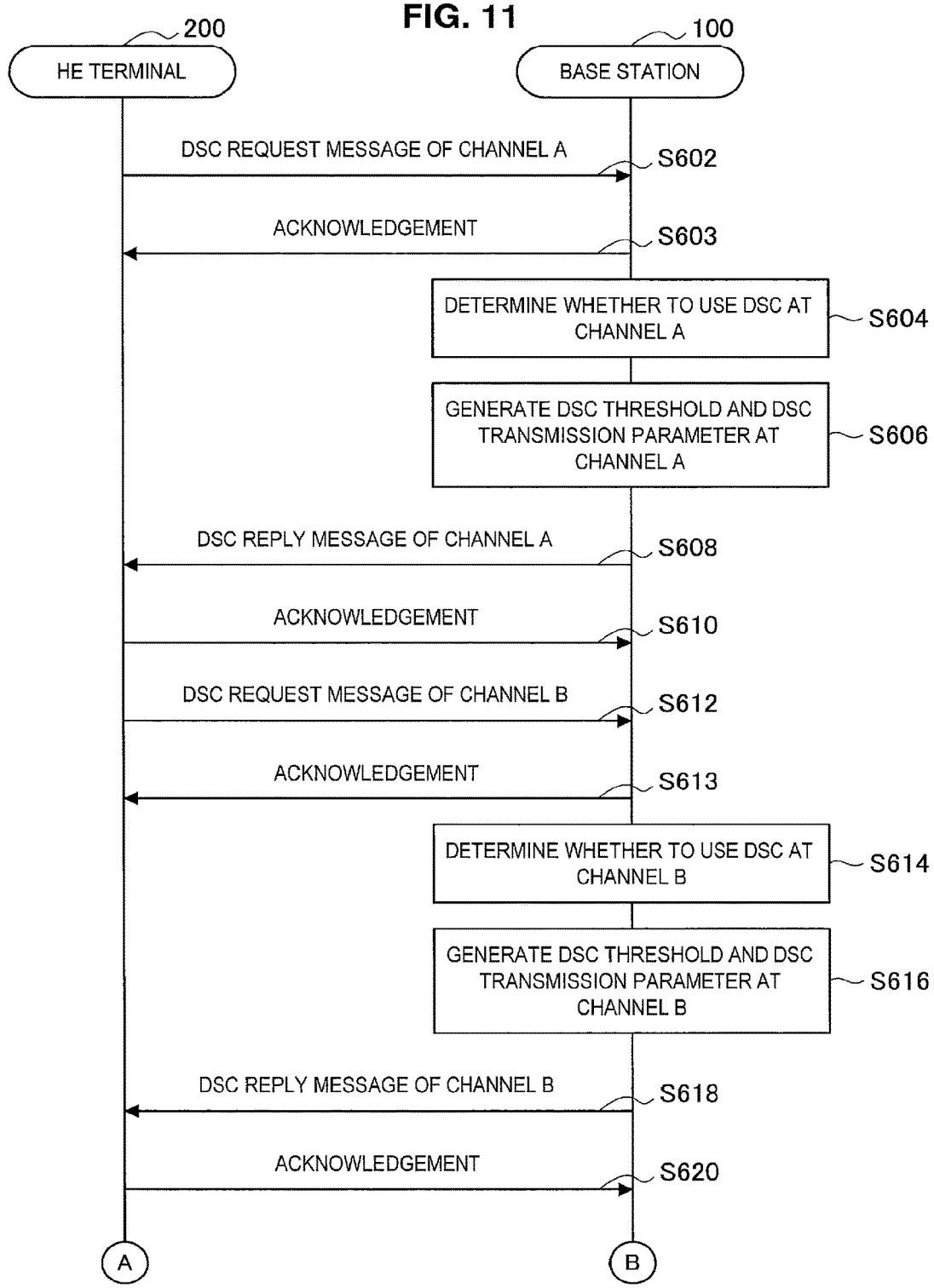
FIG. 11 is a sequence diagram showing an example of the flow of a DSC use permission process performed in a communication system according to the third embodiment.
Figure 12:
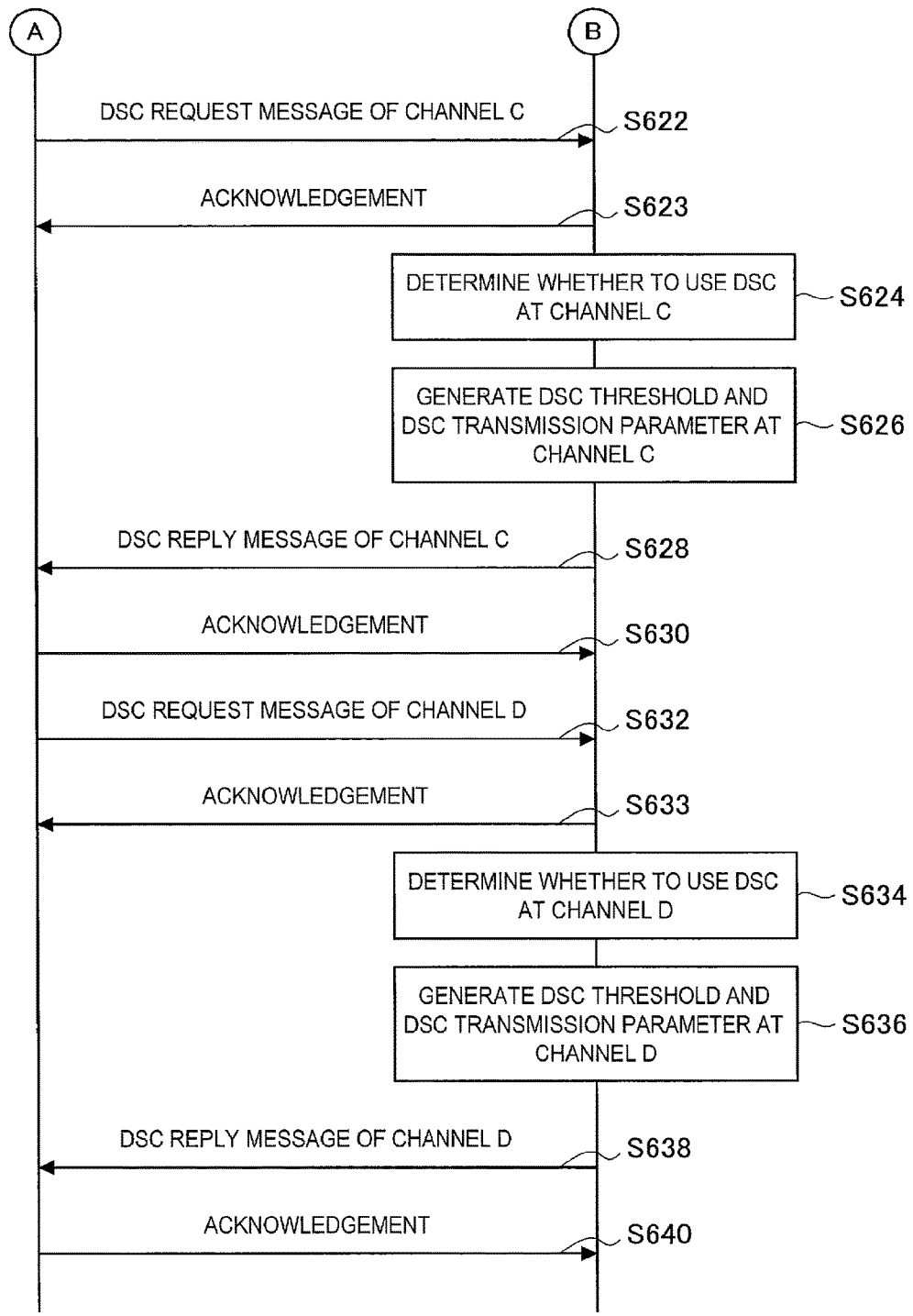
FIG. 12 is a sequence diagram showing the example of the flow of the DSC use permission process performed in the communication system according to the third embodiment.

FIGS. 11 and 12 are sequence diagrams showing an example of the flow of the DSC use permission process performed in the communication system 1 according to the embodiment. As shown in FIGS. 11 and 12, the base station 100 and the HE terminal 200 participate in this sequence.

As shown in FIG. 11, in step S602, the HE terminal 200 first transmits the DSC request message of the channel A to the base station 100. The DSC request message can be transmitted using, for example, the channel A.

Subsequently, in step S603, the base station 100 succeeding in the reception of the DSC request message replies to the HE terminal 200 with an acknowledgement.

Subsequently, in step S604, the base station 100 determines whether to use DSC at the channel A. For example, the DSC control unit 131 determines whether to permit the HE terminal 200 which is a transmission source of the DSC request message to operate in the DSC mode based on the number of legacy terminals 300 among the other devices connected to the wireless communication unit 110 using the channel A. Hereinafter, a process when the use of DSC at the channel A is permitted will be described.

Subsequently, in step S606, the base station 100 generates the DSC threshold and the DSC transmission parameter at the channel A. For example, the parameter control unit 133 decides the DSC threshold and the DSC transmission parameter at the channel A based on the number of legacy terminals 300 among the other devices connected to the wireless communication unit 110. Moreover, the parameter control unit 133 may decide the DSC transmission parameter at the channel A based on a difference between the DSC threshold and the default threshold at the channel A. At this time, the parameter control unit 113 decides a value for applying the increase or decrease in the opposite direction of the increase or decrease in transmission opportunities by DSC at the channel A.

Subsequently, in step S608, the base station 100 transmits the DSC reply message of the channel A to the HE terminal 200. For example, the base station 100 generates the DSC reply message that stores the information permitting the use of DSC at the channel A, the DSC threshold at the channel A, and the DSC transmission parameter and transmits the DSC reply message at the channel A to the HE terminal 200. When the DSC control unit 131 does not permit the use of DSC at the channel A in the foregoing step S104, information indicating that the use of DSC at the channel A is not permitted is stored in the DSC reply message.

Subsequently, in step S610, the HE terminal 200 succeeding in the reception of the DSC reply message replies to the base station 100 with an acknowledgement.

Subsequently, in steps S612 to S620, the HE terminal 200 performs the DSC use permission process of the channel B. The DSC request message and the DSC reply message may be transmitted and received using the channel A which is the primary channel. The processes herein are the same as those of the foregoing steps S602 to S610, and thus the detailed description thereof will be omitted herein.

Subsequently, as illustrated in FIG. 12, in steps S622 to S630, the HE terminal 200 performs the DSC use permission process of the channel C. The DSC request message and the DSC reply message may be transmitted and received using the channel A which is the primary channel. The processes herein are the same as those of the foregoing steps S602 to S610, and thus the detailed description thereof will be omitted herein.

Subsequently, in steps S632 to S640, the HE terminal 200 performs the DSC use permission process of the channel D. The DSC request message and the DSC reply message may be transmitted and received using the channel A which is the primary channel. The processes herein are the same as those of the foregoing steps S602 to S610, and thus the detailed description thereof will be omitted herein.

As described above, the communication system 1 according to the embodiment can control whether operation in the DSC mode is performed for each channel and can dynamically change the transmission parameter for each channel. At this time, the communication system 1 can adjust the transmission parameter at each channel based on the degree of inequality occurring between the HE terminal 200 and the legacy terminal 300. Therefore, the communication system 1 can reduce an inequality of the transmission opportunities between the HE terminal 200 and the legacy terminal 300 for each channel while improving a throughput by using DSC.

The DSC use permission process has been described above. Next, a data transmission process by the HE terminal 200 will be described with reference to FIGS. 13 and 14.

4-4. Data Transmission Process

Figure 13:
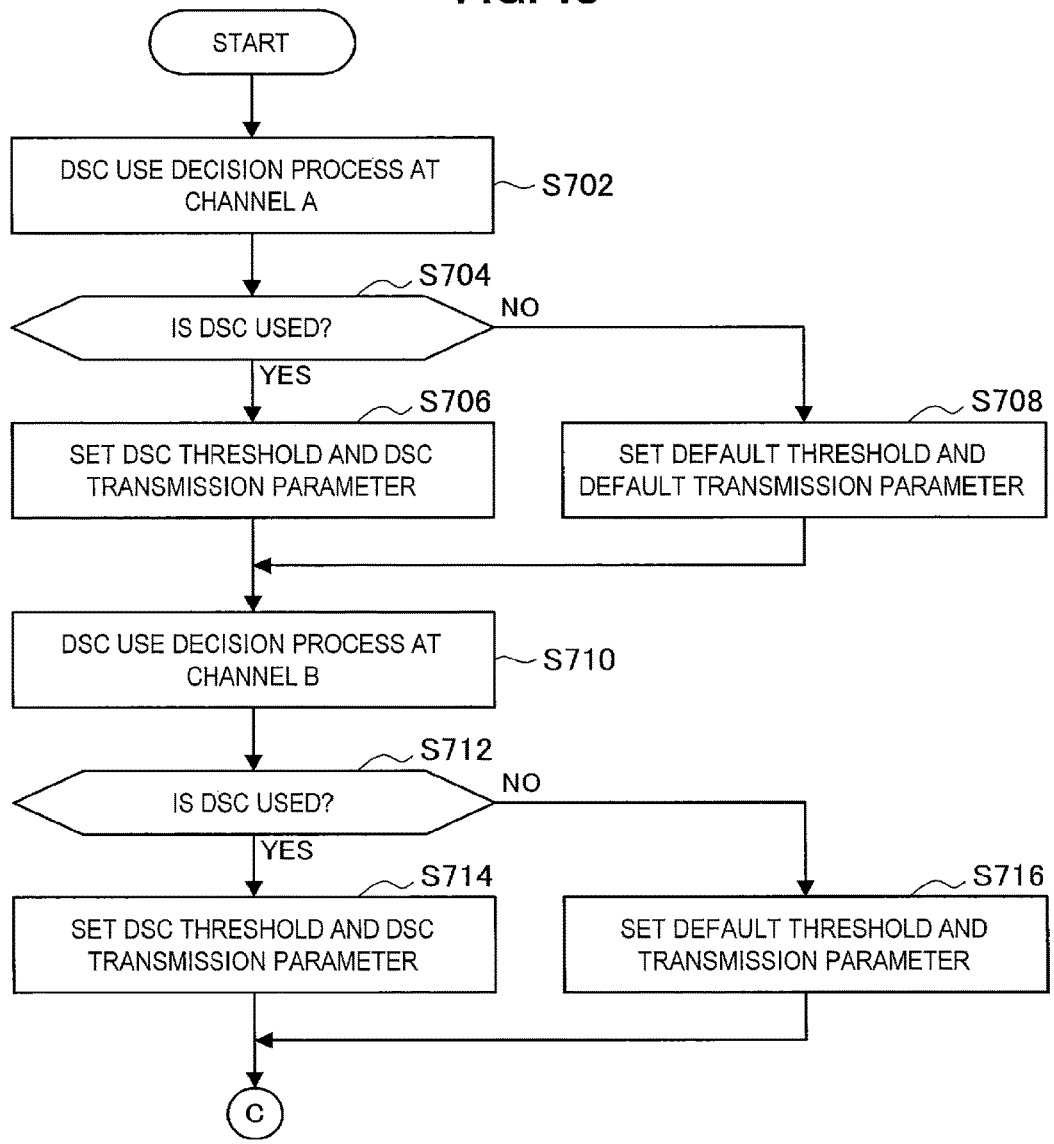
FIG. 13 is a flowchart showing an example of the flow of a data transmission process by an HE terminal according to the third embodiment.
Figure 14:
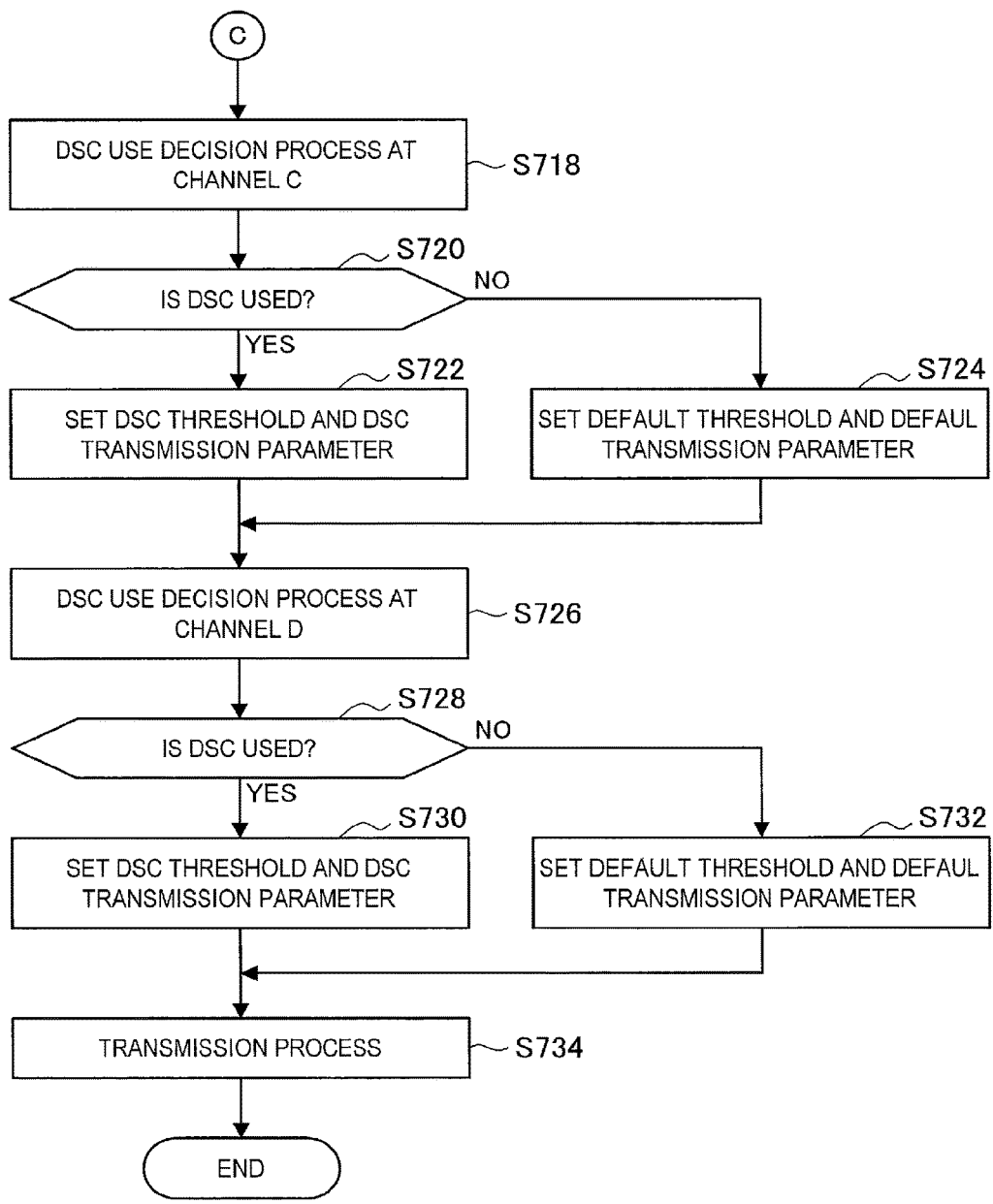
FIG. 14 is a flowchart showing the example of the flow of the data transmission process by the HE terminal according to the third embodiment.

FIGS. 13 and 14 are flowcharts showing an example of the flow of a data transmission process by the HE terminal 200 according to the third embodiment.

As shown in FIG. 13, in step S702, the HE terminal 200 first performs a DSC use decision process at the channel A. For example, the HE terminal 200 performs the above-described process at the channel A with reference to FIG. 7. Thus, the acquisition unit 231 acquires the DSC threshold and the DSC transmission parameter at the channel A. The decision unit 233 decides whether to use DSC at the channel A by determining whether the frame current time is the DSC-usable time at the channel A and whether the frame for which transmission is currently being attempted is the DSC-usable frame at the channel A.

Subsequently, in step S704, the setting unit 235 determines whether to use DSC at the channel A with reference to a process result by the decision unit 233.

When DSC is used (YES in S704), the setting unit 235 sets the DSC threshold and the DSC transmission parameter at the channel A in regard to the channel A in step S706. For example, the HE terminal 200 performs the above-described process in regard to the channel A with reference to FIG. 8.

When DSC is not used (NO in S704), the setting unit 235 sets the default threshold and the default transmission parameter at the channel A in step S708.

Next, in steps S710 to S716, the HE terminal 200 performs the DSC use decision process at the channel B to set the DSC threshold and the DSC transmission parameter or the default threshold and the default transmission parameter at the channel B in regard to the channel B. The processes herein are the same as the foregoing steps S702 to S708, and thus the detailed description thereof will be omitted therein.

Next, as illustrated in FIG. 14, in steps S718 to S724, the HE terminal 200 performs the DSC use decision process at the channel C to set the DSC threshold and the DSC transmission parameter or the default threshold and the default transmission parameter at the channel C in regard to the channel C. The processes herein are the same as the foregoing steps S702 to S708, and thus the detailed description thereof will be omitted therein.

Next, in steps S726 to S732, the HE terminal 200 performs the DSC use decision process at the channel D to set the DSC threshold and the DSC transmission parameter or the default threshold and the default transmission parameter at the channel D in regard to the channel D. The processes herein are the same as the foregoing steps S702 to S708, and thus the detailed description thereof will be omitted therein.

In step S734, the wireless communication unit 210 transmits transmission data in a bundle of four channels using the CCA threshold and the transmission parameter set by the control unit 230. In the transmission process, for example, general CSMA/CA is performed. Here, in the embodiment, the different CCA threshold can be obtained for each channel. When it is determined that some channels are idle and the other channels are busy, the HE terminal 200 may perform transmission using only the channels determined to be idle.

The data transmission process by the HE terminal 200 has been described above.

5. FOURTH EMBODIMENT

The embodiment is a mode in which the HE terminal 200 autonomously operates in the DSC mode for each channel without performing control by the base station 100. The configuration of each device included in the communication system 1 according to the embodiment is the same as that described in the second and third embodiments. Hereinafter, a characteristic configuration of the HE terminal 200 according to the embodiment will be described.

(1) Storage Unit 220

The storage unit 220 according to the embodiment stores the DSC threshold and the DSC transmission parameter for each channel in addition to the default threshold and the default transmission parameter.

(2) Acquisition Unit 231

The acquisition unit 231 according to the embodiment acquires the CCA threshold and the transmission parameter for each channel in either the normal mode or the DSC mode with reference to the storage unit 220.

(3) Decision Unit 233

The decision unit 233 according to the embodiment decides the operation mode for each channel. The DSC use decision process has been described above in the third embodiment.

(4) Setting Unit 235

The setting unit 235 according to the embodiment sets the CCA threshold and the transmission parameter for each channel.

The example of the characteristic configuration of the HE terminal 200 in the embodiment has been described above. The HE terminal 200 according to the embodiment transmits the transmission data in the bundle of four channels using the CCA threshold and the transmission parameter autonomously set by the control unit 230. In the transmission process, for example, general CSMA/CA is performed. Here, in the embodiment, the different CCA threshold can be obtained for each channel. When it is determined that some channels are idle and the other channels are busy, the HE terminal 200 may perform transmission using only the channels determined to be idle.

According to the embodiment, the communication system 1 can reduce an inequality of the transmission opportunities between the HE terminal 200 and the legacy terminal 300 for each channel while improving a throughput by autonomously using DSC.

6. FIFTH EMBODIMENT

The embodiment is a mode in which the HE terminal 200 decides the DSC threshold and the DSC transmission parameter. First, an example of the configuration of the base station 100 according to the embodiment will be described with reference to FIG. 15.

6-1. Example of Configuration of Base Station

Figure 15:
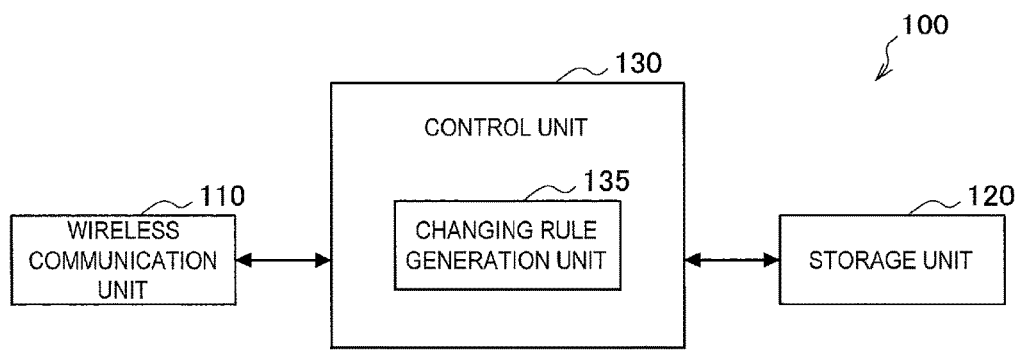
FIG. 15 is a block diagram showing an example of a logical configuration of a base station according to a fifth embodiment.

FIG. 15 is a block diagram showing an example of a logical configuration of a base station 100 according to a fifth embodiment. As shown in FIG. 15, in the base station 100 according to the embodiment, the configuration of the control unit 130 is different from the example of the configuration shown in FIG. 3. As shown in FIG. 15, the control unit 130 according to the embodiment functions as a changing rule generation unit 135.

The changing rule generation unit 135 has a function of generating a changing rule which is used in the HE terminal 200 to set the DSC threshold and the DSC transmission parameter. The changing rule includes a margin value and a changing parameter (second parameter) to be described below. The changing rule generation unit 135 causes the wireless communication unit 110 to transmit information indicating the generated changing rule to the HE terminal 200.

The example of the configuration of the base station 100 according to the embodiment has been described above. Next, an example of the configuration of the HE terminal 200 according to the embodiment will be described with reference to FIG. 16.

6-2. Example of Configuration of HE Terminal

Figure 16:
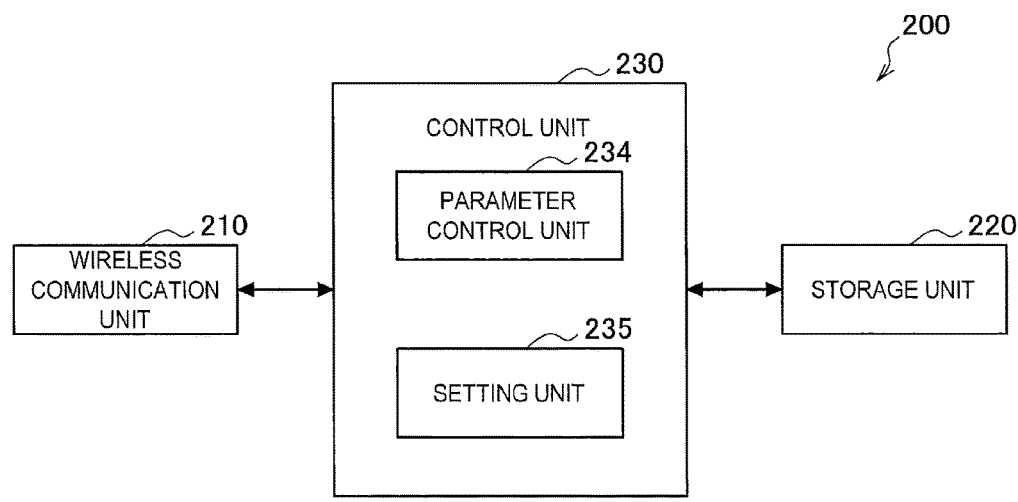
FIG. 16 is a block diagram showing an example of a logical configuration of an HE terminal according to the fifth embodiment.

FIG. 16 is a block diagram showing an example of a logical configuration of an HE terminal 200 according to the fifth embodiment. As shown in FIG. 16, in the HE terminal 200 according to the embodiment, the configuration of the control unit 230 is different from the example of the configuration shown in FIG. 4. As shown in FIG. 16, the control unit 230 according to the embodiment functions as a parameter control unit 234 and a setting unit 235.

The parameter control unit 234 has the function of deciding the DSC threshold and the DSC transmission parameter as in the parameter control unit 133 described in the first embodiment. Here, the parameter control unit 234 according to the embodiment decides the DSC threshold and the DSC transmission parameter based on the changing rule which the base station 100 notifies of. The decision process will be described in detail below.

The setting unit 235 sets the DSC threshold and the DSC transmission parameter decided by the parameter control unit 234.

The example of the configuration of the HE terminal 200 according to the embodiment has been described. Next, technical characteristics of the communication system 1 according to the embodiment will be described.

6-3. Technical Characteristics

Figure 17:
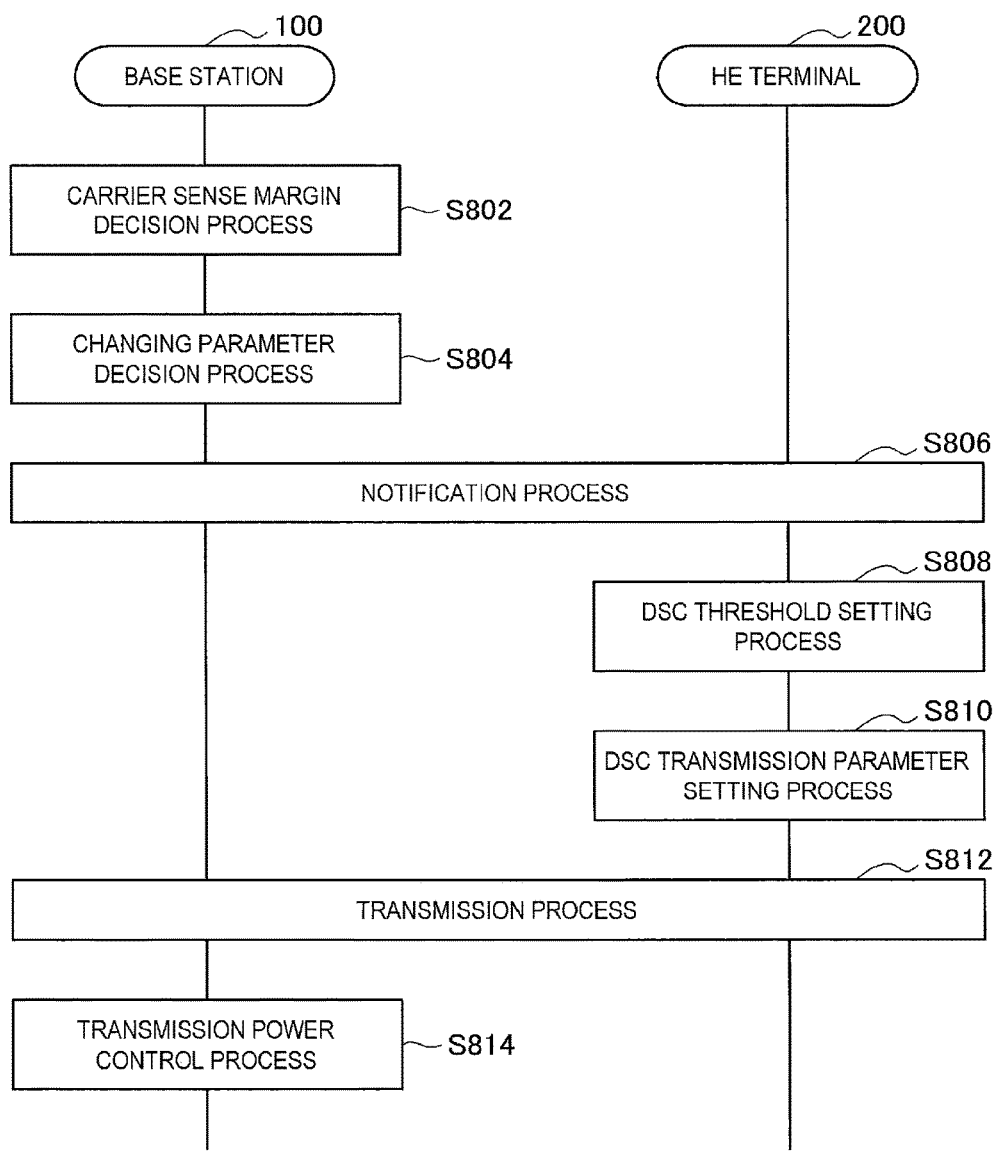
FIG. 17 is a sequence diagram showing an example of the flow of all the processes performed in a communication system according to the fifth embodiment.
Figure 18:
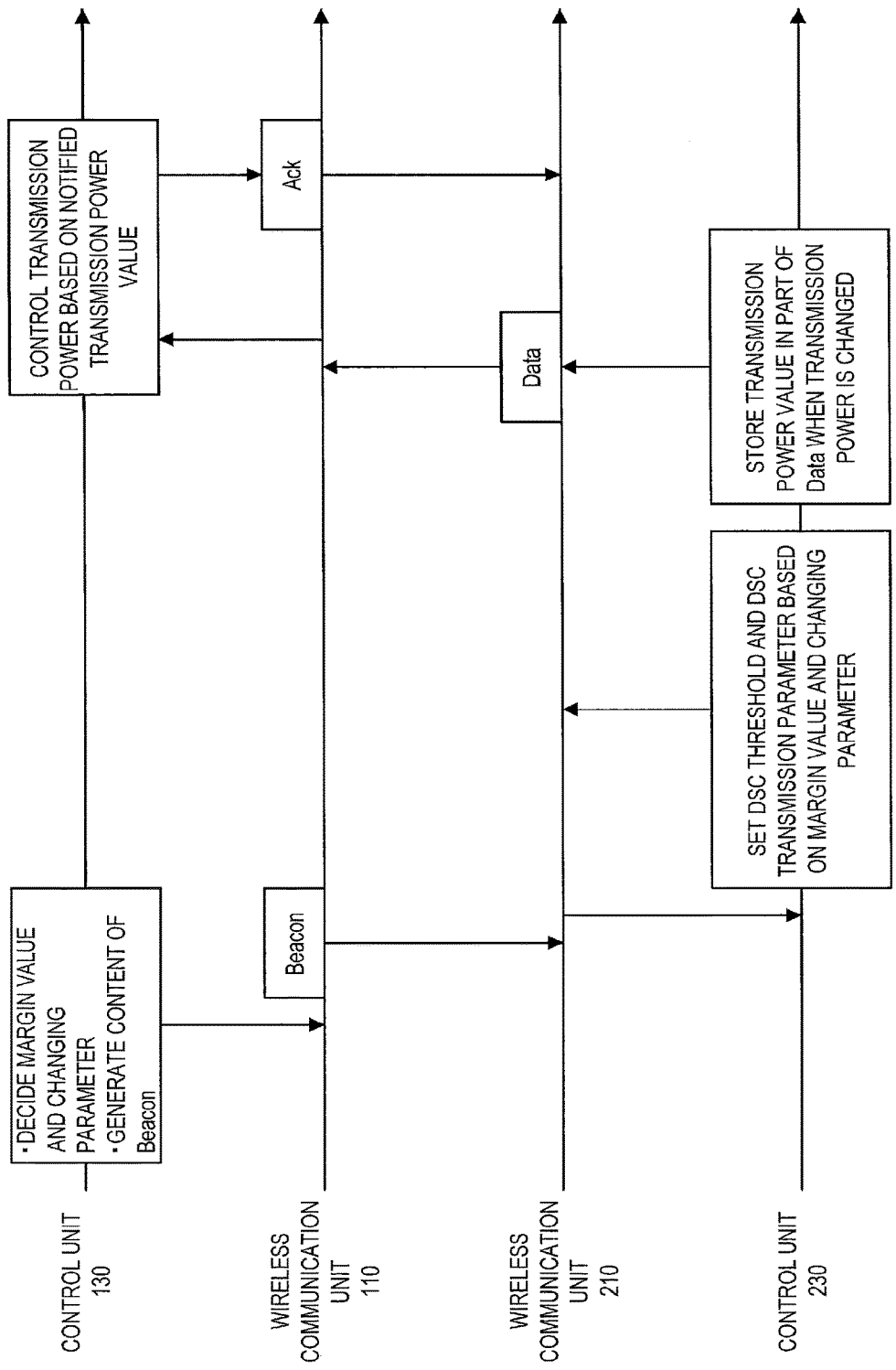
FIG. 18 is a sequence diagram showing an example of the flow of all the processes performed in the communication system according to the fifth embodiment.

FIG. 17 is a sequence diagram showing an example of the flow of all the processes performed in a communication system 1 according to the fifth embodiment. As shown in FIG. 17, the base station 100 and the HE terminal 200 participate in this sequence. As shown in FIG. 17, the base station 100 performs a carrier sense margin decision process (step S802), a changing parameter decision process (step S804), and a notification process (step S806) to the HE terminal 200. Subsequently, the HE terminal 200 performs a DSC threshold setting process (step S808), a DSC transmission parameter setting process (step S810), and a transmission process (step S812) to the base station 100. Then, the base station 100 performs a transmission power control process (step S814). The more detailed process content than the sequence shown in FIG. 17 is shown in FIG. 18. FIG. 18 is a sequence diagram showing an example of the flow of all the processes performed in the communication system 1 according to the embodiment.

(Step S802) Carrier Sense Margin Decision Process

The base station 100 (for example, the changing rule generation unit 135) decides a margin value used by the subordinate connected HE terminal 200 to decide the DSC threshold as one changing rule. In the embodiment, a carrier sense level (carrier sense detection threshold) decided by the HE terminal 200 is treated as the DSC threshold. Hereinafter, the carrier sense level is also referred to as a clear channel assessment signal detection level (CCASD) in some cases.

The base station 100 can decide the margin value by various standards. For example, the base station 100 may monitor surroundings, measure an average strength of interference, and decide the margin value based on the measured average strength of the interference. Specifically, the base station 100 decides a large value when the average strength of the interference is high, and decides a small value when the average strength of the interference is small. Moreover, the base station 100 may decide the margin value according to the number of subordinate HE terminals 200 and the number of legacy terminals 300 or may also decide the margin value by adding information regarding the HE terminals 200 and the number of legacy terminals 300 of another BSS. The base station 100 may decide the margin value in accordance with the combination of the number of wireless terminals and the average strength of the interference. The base station 100 may adopt a predetermined value.

(Step S804) Changing Parameter Decision Process

The base station 100 (for example, the changing rule generation unit 135) decides the changing parameter used when the connected subordinate HE terminal 200 decides the DSC transmission parameter (that is, changes the transmission parameter from the default) as one changing rule.

The changing parameter is a parameter for causing the HE terminal 200 to change the transmission parameter to a value for applying the increase or decrease in the opposite direction of the increase or decrease in transmission opportunities by DSC. That is, the changing parameter is an incidental parameter imposed to alleviate an inequality of the entire system when the HE terminal 200 changes CCASD. The changing parameter is an implication of a penalty imposed to the increase and exchange of the transmission opportunities at the time of an increase in CCASD and a preference given to the decrease and exchange of the transmission opportunities conversely at the time of a decrease in CCASD. The DSC transmission parameter changed from the default transmission parameter is set in conjunction with the change in CCASD by the changing parameter.

There is a one-to-one correspondence between the changing parameter and the above-described margin value. That is, the margin value and the changing parameter uniquely correspond to each other. Accordingly, in the base station 100, the changing parameter is ensured to be the same when the margin value is the same. Further, a combination between the margin value and the changing parameter may be common to another base station 100. In this case, in the other base station 100, the changing parameter is ensured to be the same when the margin value is the same.

For example, the base station 100 stores the combinations of the margin values and the changing parameters in the storage unit 120 and selects the combination to be used from the combinations. Selection standards have been described in the decision standards of the margin value. Moreover, the margin value and the changing parameter may be derived using a calculation equation for one-to-cone correspondence.

Various transmission parameters changed by the changing parameters are considered.

For example, the changing parameter includes transmission power changing coefficients $\alpha$ and $\beta$ as parameters for changing the transmission power. Thus, the transmission power is changed in conjunction with the change in CCASD.

The changing parameter may include a fixed waiting time changing coefficient $\gamma$ for transmission as a parameter for changing a transmission fixed waiting time. Thus, the fixed waiting time for transmission is changed in conjunction with the change in CCASD.

The changing parameter may include random waiting time changing coefficients $\delta$ and $\varepsilon$ for carrier sense as parameters for changing a random waiting time for carrier sense. Thus, the random waiting time for carrier sense is changed in conjunction with the change in CCASD.

The changing parameter may include maximum frame time length changing coefficients $\mu$ and $\nu$ as parameters for changing exclusive time lengths of radio resources (for example, a frequency). Thus, the exclusive time length of radio resources is changed in conjunction with the change in CCASD. For the same purpose, parameters for changing a maximum amount of transmission information in one-time frame transmission, a maximum packet connection number in one-time transmission, the maximum number of retransmissions of the same packet, and a maximum time length (for example, TXOP limit) usable in consecutive transmission of a plurality of frames may be included in the changing parameters.

The changing parameter may include a usable channel bandwidth changing coefficient $\lambda$ as a parameter for changing a usable channel bandwidth. Thus, a usable channel bandwidth is changed in conjunction with the change in CCASD.

The changing parameter may include at least one of a channel restriction operation determination coefficient $\omega$ and information indicating a usable channel group as parameters for restricting usable channel frequencies. Thus, the usable channel frequencies are restricted in conjunction with the change in CCASD.

The following Table 1 shows examples of combinations of the margin values and the changing parameters. Table 1 shows examples in which the transmission power and the fixed waiting time (for example, AIFSN) are changing target transmission parameters. The base station 100 selects one entry (row) therefrom. The values of the change parameters may be changed by the base station 100 or the HE terminal 200 which is a notification destination so that an amount of change (the magnitude of the penalty or the preference) increases.

TABLE 1

| Margin value (dB) | Changing target transmission parameter 1 | | Changing target transmission parameter 2 | |
|---|---|---|---|---|
| | Type | Changing coefficient value | Type | Changing coefficient value |
| 40 | TxPower | $\alpha = 1, \beta = 10$ | AIFSN | $\gamma = 10$ |
| 30 | TxPower | $\alpha = 1, \beta = 8$ | AIFSN | $\gamma = 10$ |
| 20 | TxPower | $\alpha = 1.5, \beta = 5$ | AIFSN | $\gamma = 5$ |
| 10 | TxPower | $\alpha = 2, \beta = 3$ | AIFSN | $\gamma = 3$ |

(Step S806) Notification Process

The base station 100 (for example, the changing rule generation unit 135 and the wireless communication unit 110) notifies the HE terminal 200 of information indicating the generated changing rule.

In the embodiment, the base station 100 stores the margin value and the changing parameter in a frame to notify of the margin value and the changing parameter. The frame which is a storing destination may be a beacon frame which all the subordinate terminals are notified of or may be another management frame which the subordinate terminals are individually notified of. For example, an example of a format stored in a beacon frame is shown in FIG. 19.

Figure 19:
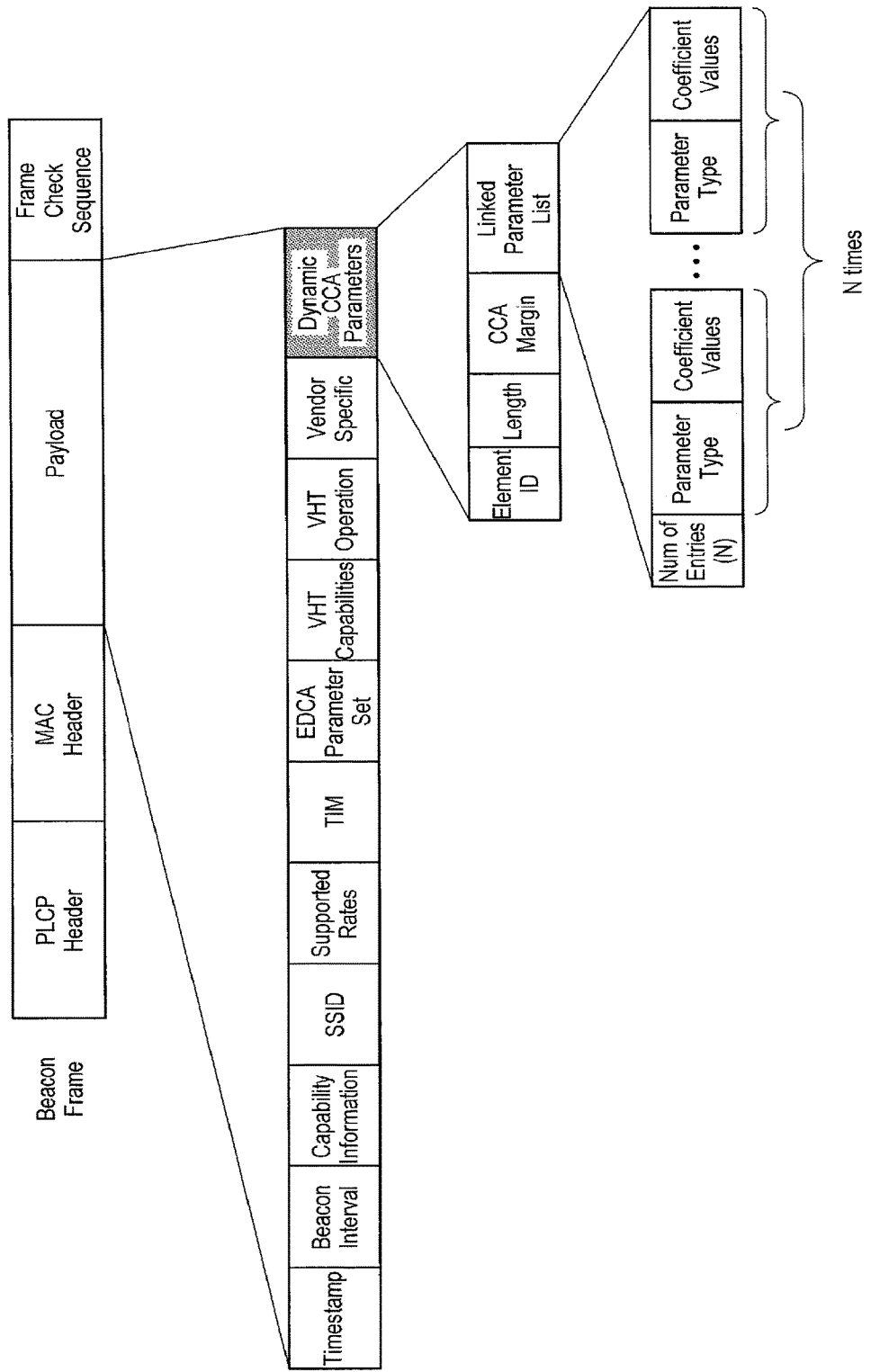
FIG. 19 is an explanatory diagram showing an example of the format of a beacon frame according to the fifth embodiment.

FIG. 19 is an explanatory diagram showing an example of the format of the beacon frame according to the embodiment. As shown in FIG. 19, there is "Dynamic CCA parameters" storing information indicting the changing rule in a payload. The content of "Dynamic CCA parameters" is formed of "Element ID" storing identification information, "Length" storing a field length, "CCA Margin" storing a margin value, and "Linked Parameter List" storing the changing parameter. "Linked Parameter List" is formed of "Num of Entries" storing the number of changing target transmission parameters and N pairs of "Parameter Type" storing the types of changing target transmission parameters and "Coefficient Values" storing changing coefficient values. Here, N indicates the number of changing target transmission parameters.

By storing the margin value and the changing parameter in the frame to notify the HE terminal 200 of the margin value and the changing parameter, the rule of the "one-to-one correspondence between the changing parameter and the changing parameter," as described above, is obeyed. Further, by storing the margin value and the changing parameter in the frame to notify the HE terminal 200 of the margin value and the changing parameter, a fault can be detected by the HE terminal 200 or another device even when the base station 100 performs faulty setting which may impair the quality of the system, and thus testability is ensured.

In this way, the base station 100 notifies the HE terminal 200 of the information indicating the combination (that is, the changing rule) of the margin value and the changing parameter. In the embodiment, as shown in FIG. 19, the base station 100 notifies the HE terminal 200 of the frame in which the margin value and the changing parameter are stored.

(Step S808) DSC Threshold Setting Process

The HE terminal 200 (for example, the parameter control unit 234 and the setting unit 235) decides and sets the DSC threshold based on the notification from the base station 100.

For example, the HE terminal 200 decides the DSC threshold based on the notified margin value and the reception strength (received signal strength indication (RSSI)) of a reference frame. The reference frame may be a beacon frame storing the information indicating the changing rule described above. Hereinafter, a DSC threshold decision process will be described with reference to FIG. 20.

Figure 20:
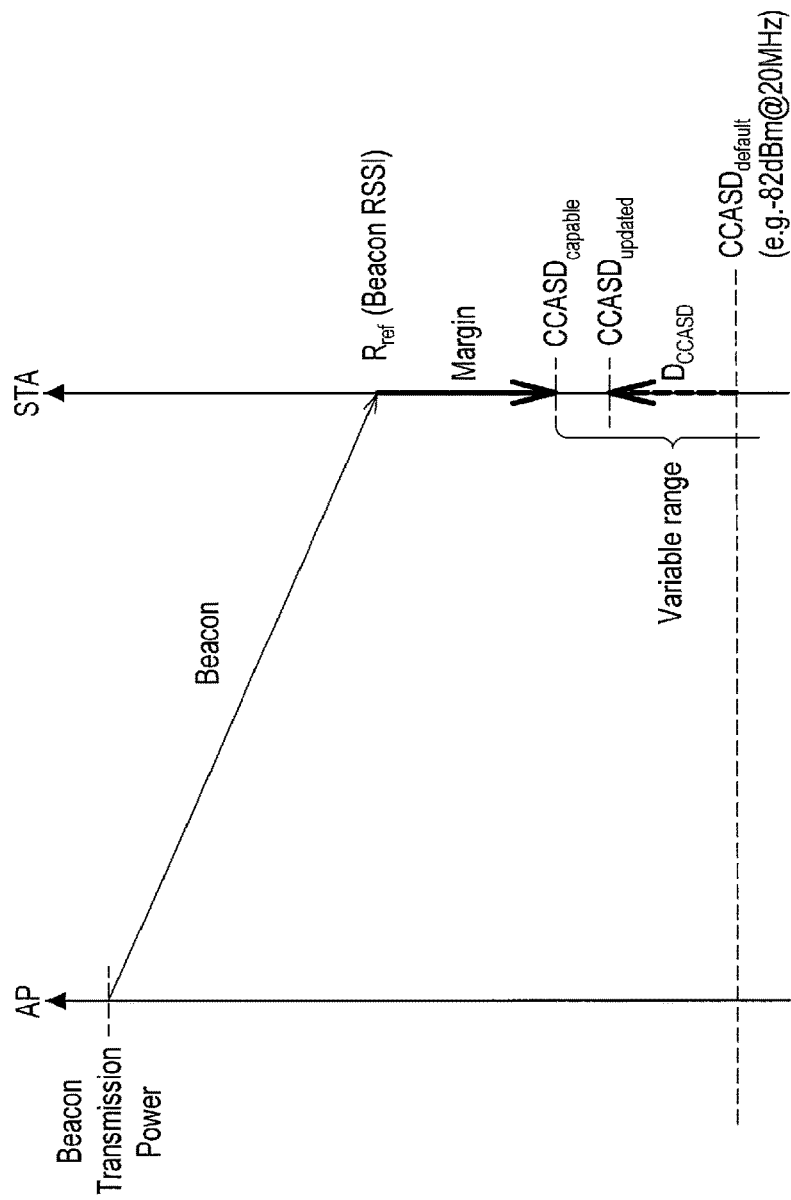
FIG. 20 is an explanatory diagram showing a DSC threshold decision process according to the fifth embodiment.

FIG. 20 is an explanatory diagram showing a DSC threshold decision process according to the embodiment. An AP in the drawing indicates the base station 100 and an STA indicates the HE terminal 200. As shown in FIG. 20, the HE terminal 200 receives a beacon frame transmitted from the base station 100 which is a connection destination.

For example, the HE terminal 200 calculates a value obtained by subtracting the margin value from the reception strength of the reference frame as an upper limit $CCASD_{capable}$ of a settable CCASD by the following equation. The HE terminal 200 changes CCASD in a range which does not exceed the upper limit $CCASD_{capable}$ (that is, decides the DSC threshold). Thus, the signal transmitted by the base station 100 is reliably detected in the HE terminal 200. The following expression is a logarithmic expression.

[Math. 1]

$$CCASD_{capable} = R_{ref} - M \quad \text{(Equation 1)}$$

Here, the reception strength (RSSI) of the latest reference frame (beacon frame) received from the base station 100 which is a connection destination in the HE terminal 200 is referred to as $R_{ref}$ (dBm) and the margin value which the base station 100 notifies of in the above-described notification process is referred to as M(dB). $R_{ref}$ may be a value obtained by performing filtering such as averaging on a measurement result extending over the plurality of reference frames. The value of $CCASD_{capable}$ may be restricted by an upper limit or a lower limit based on another factor.

The value of a default CCASD is referred to as $CCASD_{default}$ and the value of a changed CCASD (that is, the DSC threshold) is referred to as $CCASD_{updated}$. For example, $CCASD_{default}$ may be −82 dBm per 20 MHz bandwidth. A difference $D_{CCASD}$ between $CCASD_{default}$ and $CCASD_{updated}$ is calculated by the following equation. The following equation is also a logarithmic expression. The $D_{CCASD}$ which appears in the following equations is all dB values.

[Math. 2]

$$D_{CCASD} = CCASD_{updated} - CCASD_{default} \quad \text{(Equation 2)}$$

Referring to the foregoing Equation 1, a change to a high CCASD is permitted in the HE terminal 200 with a large RSSI. The change in CCASD is free within a range and the HE terminal 200 may not necessarily set $CCASD_{updated}$ to $CCASD_{capable}$. The HE terminal 200 may not completely change CCASD. That is, the $D_{CCASD}$ can be changed under the control of the side of the HE terminal 200. Thus, it is possible to prevent the performance of the entire system from deteriorating since the HE terminal 200 in a bad link state performs changing to the high CCASD and an unexpected transmission failure is increased.

(Step S810) DSC Transmission Parameter Setting Process

The HE terminal 200 (for example, the parameter control unit 234 and the setting unit 235) decides and sets the DSC transmission parameter.

More specifically, the HE terminal 200 controls the DSC transmission parameter according to the difference between the DSC threshold and the default threshold decided in the above-described DSC threshold decision process, that is, the $D_{CCASD}$. For example, the HE terminal 200 increases an amount of change (the magnitude of a penalty or a preference) as the difference increases, and decreases the amount of change as the difference decreases. Thus, it is possible to appropriately alleviate an inequality of the entire system occurring according to an increase width or a decrease width of CCASD.

The HE terminal 200 sets the DSC transmission parameter using the changing parameter corresponding to the margin value. The HE terminal 200 is assumed to decide the DSC transmission parameter in obedience to the changing rule which the base station 100 notifies of without deviance. Hereinafter, a DSC transmission parameter decision method based on the notified changing parameter will be described.

—Transmission Power

The HE terminal 200 changes transmission power according to the $D_{CCASD}$. An example of the change in the transmission power using the changing coefficients α and β is expressed in the following equation. Changed transmission power is referred to as $P_{updated}$, transmission power serving as a standard is referred to as $P_{default}$, and the transmission power has a dB value. The standard transmission power $P_{default}$ is assumed to be shared in advance between each base station and each wireless terminal in the system in accordance with any method.

[Math. 3]

$$P_{updated} = P_{default} - D_{CCASD}/\alpha + \beta \quad \text{(Equation 3)}$$

When α is a positive value and the DSC threshold is greater than the default threshold, the transmission power decreases with an increase in the $D_{CCASD}$ (that is, as the DSC threshold is greater). When α is a positive value and the DSC threshold is less than the default threshold, the transmission power increases with a decrease in the $D_{CCASD}$ (that is, as the DSC threshold is less).

Even when α is a positive value and the DSC threshold is greater than the default threshold, the $P_{updated}$ calculated by the foregoing equation is greater than $P_{default}$ in some cases. In this case, the HE terminal 200 is assumed to use the $P_{default}$ without changing the transmission power. Similarly, even when α is a positive value and the DSC threshold is less than the default threshold, the $P_{updated}$ calculated by the foregoing equation is less than the $P_{default}$ in some cases. In this case, the HE terminal 200 is assumed to use the $P_{default}$ without changing the transmission power. In this way, when the penalty or preference to be imposed is applied in the opposite direction, the HE terminal 200 is assumed to use the default transmission parameter. The same also applies to other transmission parameters to be described below.

—Fixed Waiting Time for Transmission

The HE terminal 200 changes the fixed waiting time for transmission according to the $D_{CCASD}$.

The fixed waiting time for transmission corresponds to, for example, an AIFS in the 802.11 standard. The AIFS corresponds to the number of time slots (AIFSN) which has to be waited before transmission is performed. That is, the HE terminal 200 may change the AIFSN according to the $D_{CCASD}$.

An example of the change in the AIFSN using the changing coefficient γ is expressed in the following equation. The changed AIFSN is referred to as $AIFSN_{updated}$, the default AIFSN is referred to as AIFSN$_{default}$, and these values are assumed to be true values.

[Math. 4]

$$AIFSN_{updated} = AIFSN_{default} + \lfloor D_{CCASD}/\gamma \rfloor \quad \text{(Equation 4)}$$

Here, the default AIFSN is assumed to be the value of the AIFSN which the base station 100 informs of using EDCA parameter IE of the beacon frame. The change in the AIFSN is applied to all the access categories.

When γ is a positive value and the DSC threshold is greater than the default threshold, the AIFSN, that is, the number of waiting slots, increases with an increase in the $D_{CCASD}$ (that is, as the DSC threshold is greater). When γ is a positive value and the DSC threshold is less than the default threshold, the AIFSN, that is, the number of waiting slots, decreases with a decrease in the $D_{CCASD}$ (that is, as the DSC threshold is less).

—Random Waiting Time for Carrier Sense

The random waiting time for carrier sense corresponds to a contention window (CW) indicating a random backoff range, for example, in the 802.11 standard. In the CW, there are a CW$_{min}$ and a CW$_{max}$. Hereinafter, an example in which the HE terminal 200 changes the CW$_{min}$ according to the $D_{CCASD}$ will be described.

An example of the change in the CW$_{min}$ using the changing coefficients δ and ε is expressed in the following equation. The changed CW$_{min}$ is referred to as CW$_{updated}$, the default CW$_{min}$ is referred to as CW$_{default}$, and these values are assumed to be true values.

[Math. 5]

$$CW_{updated} = CW_{default} * \lfloor D_{CCASD}/\delta \rfloor + \lfloor D_{CCASD}/\varepsilon \rfloor \quad \text{(Equation 5)}$$

Here, the default CW$_{min}$ is assumed to be the value of the CW$_{min}$ of which the base station 100 informs using EDCA parameter IE of the beacon frame. The change in the CW$_{min}$ is applied to all the access categories. Further, different values may be assigned as δ and ε to respective access categories.

The CW$_{min}$ has been described above. The same change may also be performed on the CW$_{max}$.

When δ and ε are positive values and the DSC threshold is greater than the default threshold, the CW$_{min}$ increases and an expected value of the random waiting time is lengthened with an increase in the $D_{CCASD}$ (that is, as the DSC threshold is greater). When δ and ε are positive values and the DSC threshold is less than the default threshold, the CW$_{min}$ decreases and an expected value of the random waiting time is shortened with a decrease in the $D_{CCASD}$ (that is, as the DSC threshold is less).

—Maximum Frame Time Length

The HE terminal 200 changes the maximum frame time length according to the $D_{CCASD}$. The maximum frame time length corresponds to, for example, a PPDU time length. The HE terminal 200 provides, for example, an upper limit of the PPDU time length and decides the upper limit according to the $D_{CCASD}$.

An example of the change in the upper limit of the PPDU time length using the changing coefficients μ and ν is expressed in the following equation. The changed upper limit of the PPDU time length is referred to as T$_{updated}$ and this value is assumed to be a true value.

[Math. 6]

$$T_{updated} = \mu - \nu * D_{CCASD} \quad \text{(Equation 6)}$$

When ν is a positive value and the DSC threshold is greater than the default threshold, T$_{updated}$, that is, the PPDU time length, is shortened with an increase in the $D_{CCASD}$ (that is, as the DSC threshold is greater). When ν is a positive value and the DSC threshold is less than the default threshold, T$_{updated}$, that is, the PPDU time length, is lengthened with a decrease in the $D_{CCASD}$ (that is, as the DSC threshold is less).

For the same purpose of changing the exclusive time lengths of the radio resources, as described above, the same calculation can also be applied to a maximum amount of transmission information in one-time frame transmission, a maximum packet connection number in one-time transmission, the maximum number of retransmissions of the same packet, and a maximum time length usable in consecutive transmission of a plurality of frames.

—Usable Channel Bandwidth

The HE terminal 200 changes a channel bandwidth usable for transmission according to the $D_{CCASD}$. An example of the change in the usable channel bandwidth using the changing coefficient λ is expressed in the following equation. The changed usable channel bandwidth is referred to as BW$_{updated}$, the default usable channel bandwidth is referred to as BW$_{default}$, the minimum granularity of the channel bandwidth is referred to as BW$_{unit}$, and these values are assumed to be true values.

[Math. 7]

$$BW_{updated} = BW_{default} - \left\lfloor \frac{\lambda * D_{CCASD}}{BW_{unit}} \right\rfloor * BW_{unit} \quad \text{(Equation 7)}$$

When λ is a positive value and the DSC threshold is greater than the default threshold, BW$_{updated}$, that is, the usable channel bandwidth, is narrowed with an increase in the $D_{CCASD}$ (that is, as the DSC threshold is greater). When λ is a positive value and the DSC threshold is less than the default threshold, BW$_{updated}$, that is, the usable channel bandwidth, is enlarged with a decrease in the $D_{CCASD}$ (that is, as the DSC threshold is less).

—Usable Channel Frequency

The HE terminal 200 changes the channel frequency that is usable for transmission according to the $D_{CCASD}$. For example, the HE terminal 200 uses a channel designated by the base station 100 when the $D_{CCASD}$ is greater than the channel restriction operation determination coefficient ω.

(Step S812) Transmission Process

The HE terminal 200 transmits a signal using the DSC threshold and the DSC transmission parameter decided and set through the above-described process.

The HE terminal 200 notifies the base station 100 which is a connection destination of information indicating the set transmission power when the transmission power is changed as the DSC transmission parameter. For example, the HE terminal 200 stores information indicating the changed transmission power P$_{updated}$ in a part of the frame to transmit the information. Thus, the base station 100 can perform the transmission power control in accordance with the change in the transmission power on the side of the HE terminal 200. An example of a frame format used to notify of the changed transmission power is shown in FIG. 21.

Figure 21:
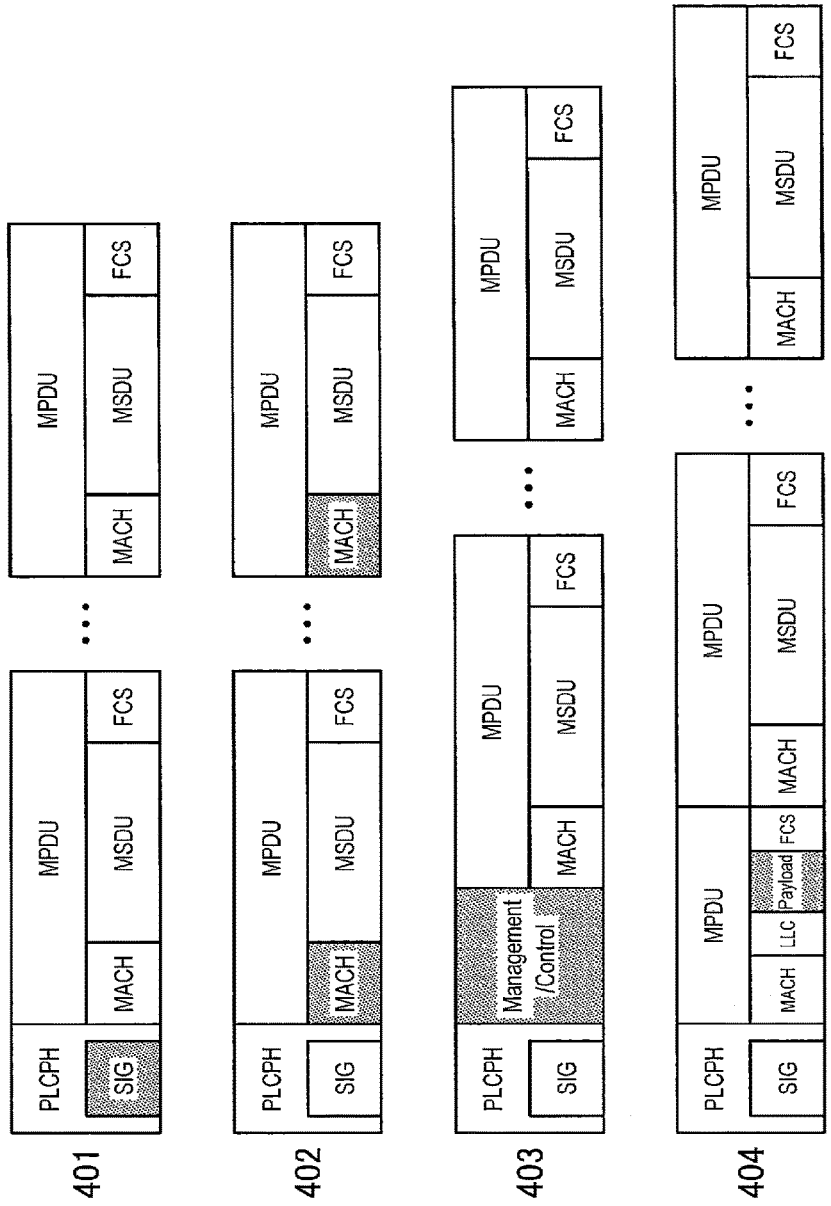
FIG. 21 is an explanatory diagram showing an example of a frame format transmitted by the HE terminal according to the fifth embodiment.

FIG. 21 is an explanatory diagram showing an example of a frame format transmitted by the HE terminal 200 according to the embodiment. In a frame format denoted by reference numeral 401, information indicating the transmission power is stored in a PLCP header. In a frame format denoted by reference numeral 402, information indicating the transmission power is stored in a MAC header. In a frame format denoted by reference numeral 403, information indicating the transmission power is stored in a payload of a management frame and the payload is connected to a part of a transmission frame by frame aggregation. In a frame format denoted by reference numeral 404, information indicating the transmission power is stored in a payload of a data frame in which EtherType of an LLC-SNAP header has a different value from a normal case and the payload is connected to a part of a transmission frame by frame aggregation.

In the frame formats denoted by reference numerals 401 and 402, overheads are small, but it is necessary to change existing formats. Thus, there is the disadvantage in that the legacy terminal 300 may not correctly acquire data from a signal and may perform an unexpected operation. In the frame formats denoted by reference numerals 403 and 404, overheads are larger than in the frame formats denoted by reference numerals 401 and 402. However, the legacy terminal 300 can skip over added information indicating the transmission power, and thus there is the advantage that backward compatibility can be ensured.

In FIG. 21, a frame which is originally transmitted by the HE terminal 200 is a data frame, and an example of a frame format in which the data frame is an aggregation MAC protocol data unit (A-MPDU) in which a plurality of frames are connected is shown. Of course, the HE terminal 200 can store the information indicating the transmission power in another any frame. For example, the HE terminal 200 may store the information indicating the transmission power in a data frame, a management frame, a control frame, or the like which is not aggregated.

(Step S814) Transmission Power Control Process

The base station 100 (for example, the parameter control unit 133 and the wireless communication unit 110) controls the transmission power based on information which the HE terminal 200 notifies of.

For example, the base station 100 sets the transmission power of a frame to be transmitted to the HE terminal 200 based on the information indicating the transmission power set in the HE terminal 200. For example, when the transmission power in the HE terminal 200 is lower than standard transmission power, the base station 100 also lowers the transmission power so that the transmission power is lower than the standard transmission power. Thus, then penalty or preference is imposed to ensure equality of the entire system. When the individual transmission power of the device included in the system is lowered, the interference can be reduced and the efficiency of the entire system can be improved.

For example, the base station 100 may reply to the HE terminal 200 with a reply frame of ACK/NACK for the frame received from the HE terminal 200 using the transmission power after the transmission power control.

Here, the base station 100 maintains the transmission power of the reference frame at a predetermined value (standard transmission power). This is because the HE terminal 200 decides the DSC threshold based on a reception strength of the reference frame.

(Others)

The base station 100 may also dynamically change CCASD and the transmission parameter using the margin value and the changing parameter decided by the base station 100.

In this case, it is necessary for a subordinate wireless terminal (for example, the HE terminal 200) of the base station 100 to periodically transmit the reference frame to the base station 100. Even when the transmission power is changed in the above-described process, the HE terminal 200 is assumed to maintain the transmission power of the reference frame at a predetermined value.

The base station 100 treats the smallest reception strength among reception strengths of the reference frames from all the subordinate HE terminals 200 as the above-described $R_{ref}$ and performs the DSC threshold setting process, the DSC transmission parameter setting process, and the like, as described above. Even when the transmission power is changed, the base station 100 is assumed to maintain the transmission power of the reference frame at a predetermined value.

6-4. Modification Examples

The combinations of the margin values and the changing parameters shown in the foregoing Table 1 may be shared with the HE terminal 200. In this case, the amount of information of which the base station 100 notifies the HE terminal 200 in "(Step S806) Notification process" can be reduced, and thus the frame format for notification can be simplified.

For example, information indicating that a node number is assigned to identification information for each of the combinations of the margin values and the changing parameters is assumed to be shared between the base station 100 and the HE terminal 200. Examples of the combinations of the margin values and the changing parameters and the mode numbers are shown in the following Table 2.

TABLE 2

| Mode number | Margin value (dB) | Changing target transmission parameter 1 | | Changing target transmission parameter 2 | |
|---|---|---|---|---|---|
| | | Type | Changing coefficient value | Type | Changing coefficient value |
| 1 | 40 | TxPower | $\alpha = 1, \beta = 10$ | AIFSN | $\gamma = 10$ |
| 2 | 30 | TxPower | $\alpha = 1, \beta = 8$ | AIFSN | $\gamma = 10$ |
| 3 | 20 | TxPower | $\alpha = 1.5, \beta = 5$ | AIFSN | $\gamma = 5$ |
| 4 | 10 | TxPower | $\alpha = 2, \beta = 3$ | AIFSN | $\gamma = 3$ |

The base station 100 notifies of the mode number as information indicating the combination of the margin value and the changing parameter in "(Step S806) Notification process". The HE terminal 200 comprehends the combination of the margin value and the changing parameter referring to the notified mode number in the information shown in Table 2.

Figure 22:
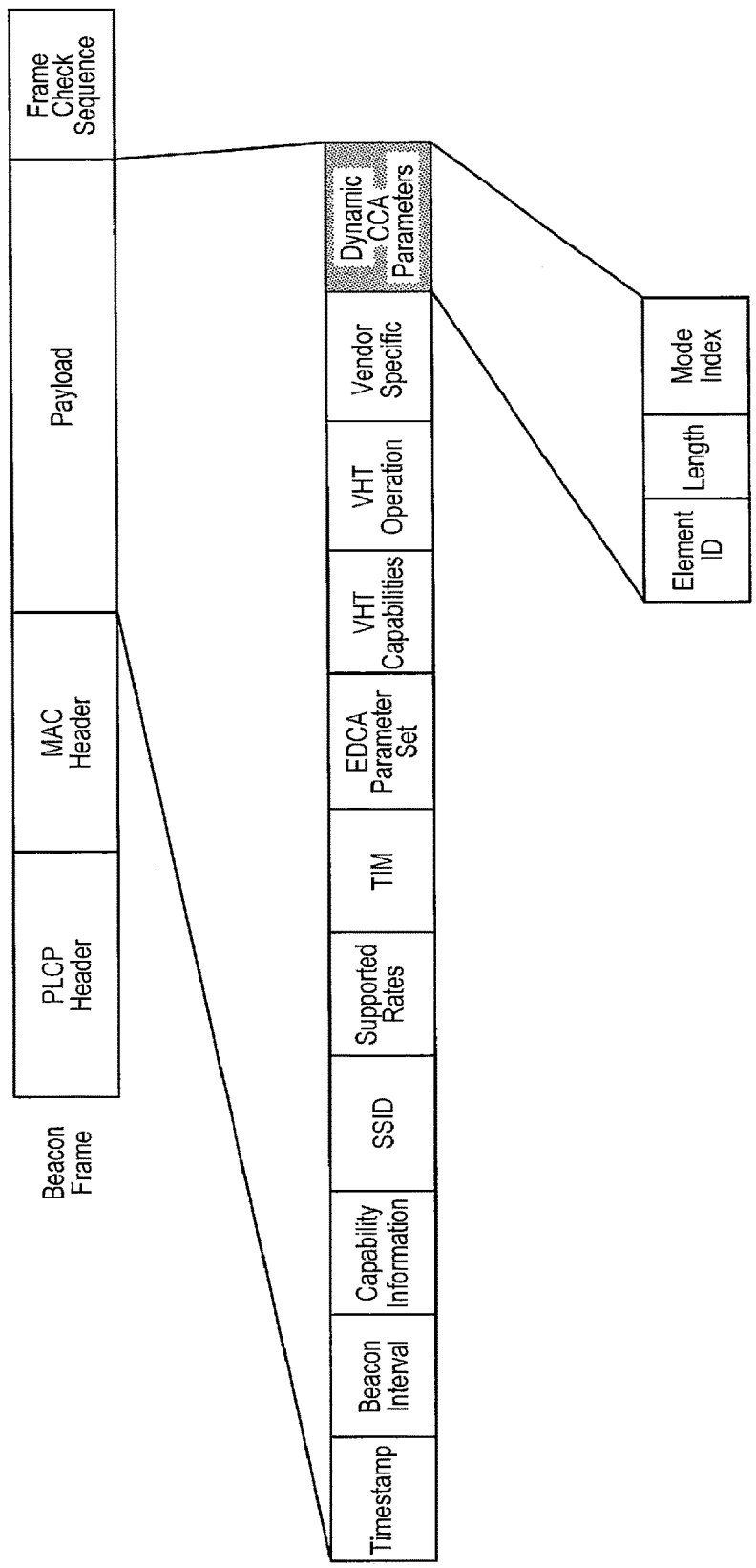
FIG. 22 is an explanatory diagram showing an example of the format of a beacon frame according to a modification example.

For example, an example of a format when the mode number is stored in the beacon frame is shown in FIG. 22.

FIG. 22 is an explanatory diagram showing an example of the format of a beacon frame according to a modification example. As shown in FIG. 22, there is "Dynamic CCA parameters" storing information indicating the changing rule in a payload. The content of "Dynamic CCA parameters" is formed by "Element ID" storing identification information, "Length" storing a field length, and "Mode Index" storing the mode number.

7. SIXTH EMBODIMENT

In the fifth embodiment, the transmission power control (TPC) has been performed on the premise that DSC is performed in the HE terminal 200. On the other hand, the embodiment is a mode in which DSC is performed on the premise that the transmission power control is performed in the HE terminal 200. In the embodiment, a case in which CCASD is not changed (that is, DSC is not performed) in the HE terminal 200 is also permitted. Hereinafter, the transmission power changed through the transmission power control is also referred to TPC transmission power. The transmission power serving as a standard for calculating a correction amount by the transmission power control is also referred to as transmission power serving as a standard. The transmission parameter changed in conjunction with the transmission power control is also referred to as a TPC transmission parameter.

First, referring back to FIG. 15, an example of the configuration of the base station 100 according to the embodiment will be described.

7-1. Example of Configuration of Base Station

The base station 100 according to the embodiment can have the same example of the configuration as the example of the configuration shown in FIG. 15. Hereinafter, the characteristic configuration of the control unit 130 in the embodiment will be described.

The control unit 130 according to the embodiment has a function of controlling information for setting the TPC transmission power used by another device to transmit data and set based on a comparison result between the TPC transmission power set in the other device capable of changing the transmission power, that is, having the TPC function and the standard transmission power through the wireless communication unit 110. Hereinafter, an example in which information used by the base station 100 to decide the TPC transmission parameter in the HE terminal 200 is notified of will be described as in the fifth embodiment. However, the present technology is not limited to this example. For example, as in the first embodiment, the base station 100 may decide the TPC transmission parameter.

The changing rule generation unit 135 has a function of generating a changing rule used in the HE terminal 200 to set the TPC transmission power and the TPC transmission parameter. The changing rule includes a margin value and a changing parameter (third parameter) to be described below. The changing rule generation unit 135 causes the wireless communication unit 110 to transmit information indicating the generated changing rule to the HE terminal 200.

The example of the configuration of the base station 100 according to the embodiment has been described. Next, referring back to FIG. 16, an example of the configuration of the HE terminal 200 according to the embodiment will be described.

7-2. Example of Configuration of Wireless Terminal

The HE terminal 200 according to the embodiment can have the same example of the configuration as the example of the configuration shown in FIG. 16. Hereinafter, the characteristic configuration of the control unit 230 in the embodiment will be described.

The control unit 230 has a function of controlling the transmission power and the transmission parameter. Specifically, the control unit 230 has a function of setting the TPC transmission power and controlling the transmission parameter based on a comparison result between the set TPC transmission power and the standard transmission power.

Hereinafter, an example in which the HE terminal 200 decides the TPC transmission power will be described as in the fifth embodiment. The present technology is not limited to the example. For example, as in the first embodiment, the HE terminal 200 may set the TPC transmission parameter decided by the base station 100.

The parameter control unit 234 decides the TPC transmission power and the TPC transmission parameter based on the changing rule which the base station 100 notifies of. The decision process will be described in detail below.

The setting unit 235 sets the TPC transmission power and the TPC transmission parameter decided by the parameter control unit 234.

The example of the configuration of the HE terminal 200 according to the embodiment has been described above. Next, technical characteristics of the communication system 1 according to the embodiment will be described.

7-3. Technical Characteristics

Figure 23:
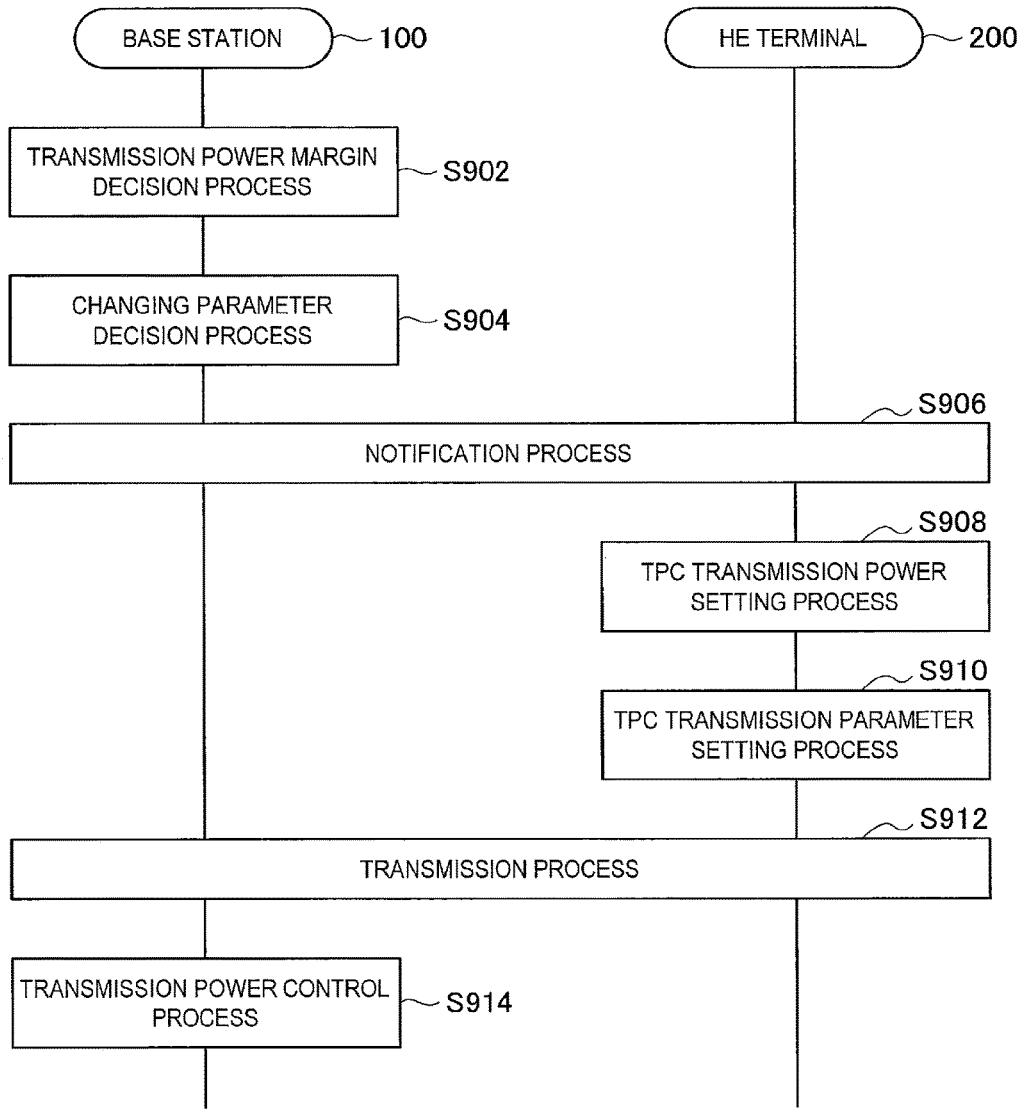
FIG. 23 is a sequence diagram showing an example of the flow of all the processes performed in the communication system according to a sixth embodiment.

FIG. 23 is a sequence diagram showing an example of the flow of all the processes performed in the communication system 1 according to the embodiment. As shown in FIG. 23, the base station 100 and the HE terminal 200 participate in this sequence. As shown in FIG. 23, the base station 100 performs a transmission power margin decision process (step S902), a changing parameter decision process (step S904), and a notification process (step S906) to the HE terminal 200. Subsequently, the HE terminal 200 performs a TPC transmission power setting process (step S908), a TPC transmission parameter setting process (step S910), and a transmission process (step S912) to the base station 100. Then, the base station 100 performs a transmission power control process (step S914).

(Step S902) Transmission Power Margin Decision Process

The base station 100 (for example, the changing rule generation unit 135) decides a margin value used by the subordinate connected HE terminal 200 to decide the TPC transmission power as one changing rule.

The base station 100 can decide the margin value by various standards. For example, the base station 100 may monitor surroundings, measure an average strength of interference, and decide the margin value based on the measured average strength of the interference. Specifically, the base station 100 decides a large value when the average strength of the interference is high, and decides a small value when the average strength of the interference is small. Moreover, the base station 100 may decide the margin value according to the number of subordinate HE terminals 200 and the number of legacy terminals 300 or may also decide the margin value by adding information regarding the HE terminals 200 and the number of legacy terminals 300 of another BSS. The base station 100 may decide the margin value in accordance with the combination of the number of wireless terminals and the average strength of the interference. The base station 100 may adopt a predetermined value.

(Step S904) Changing Parameter Decision Process

The base station 100 (for example, the changing rule generation unit 135) decides the changing parameter used when the connected subordinate HE terminal 200 decides the TPC transmission parameter (that is, changes the transmission parameter from the default) as one changing rule.

The changing parameter is a parameter for causing the HE terminal 200 to change the transmission parameter to a value for applying the increase or decrease in the opposite direction of the increase or decrease in a transmission success ratio due to the change of the transmission power to the standard transmission power. That is, the changing parameter is an incidental parameter imposed to alleviate an inequality of the entire system when the HE terminal 200 changes the transmission power. The changing parameter is an implication of a penalty imposed to the increase and exchange of the transmission success ratio at the time of an increase in the transmission power and a preference imposed on the decrease and exchange of the transmission success ratio conversely at the time of a decrease in the transmission power. The transmission parameter changed from the default transmission parameter is set in conjunction with the change in the transmission power by the changing parameter.

There is a one-to-one correspondence between the changing parameter and the above-described margin value. That is, the margin value and the changing parameter uniquely correspond to each other. Accordingly, in the base station 100, the changing parameter is ensured to be the same when the margin value is the same. Further, a combination between the margin value and the changing parameter may be common to another base station 100. In this case, in the other base station 100, the changing parameter is ensured to be the same when the margin value is the same.

For example, the base station 100 stores the combinations of the margin values and the changing parameters in the storage unit 120 and selects the combination to be used from the combinations. Selection standards have been described in the decision standards of the margin value. Moreover, the margin value and the changing parameter may be derived using a calculation equation for one-to-cone correspondence.

Various transmission parameters changed by the changing parameters are considered.

For example, the changing parameter includes CCASD changing coefficients α and β as parameters for changing the CCASD. Thus, the CCASD is changed in conjunction with the change in transmission power.

The changing parameter may include a fixed waiting time changing coefficient γ for transmission as a parameter for changing a transmission fixed waiting time. Thus, the fixed waiting time for transmission is changed in conjunction with the change in transmission power.

The changing parameter may include random waiting time changing coefficients δ and ε for carrier sense as parameters for changing a random waiting time for carrier sense. Thus, the random waiting time for carrier sense is changed in conjunction with the change in transmission power.

The changing parameter may include maximum frame time length changing coefficients μ and ν as parameters for changing exclusive time lengths of radio resources (for example, a frequency). Thus, the exclusive time length of radio resources is changed in conjunction with the change in transmission power. For the same purpose, parameters for changing a maximum amount of transmission information in one-time frame transmission, a maximum packet connection number in one-time transmission, the maximum number of retransmissions of the same packet, and a maximum time length usable in consecutive transmission of a plurality of frames may be included in the changing parameters. "Linked Parameter List" is formed of "Num of Entries" storing the number of changing target transmission parameters and N pairs of "Parameter Type" storing the types of changing target transmission parameters and "Coefficient Values" storing changing coefficient values. Here, N indicates the number of changing target transmission parameters.

The changing parameter may include a usable channel bandwidth changing coefficient λ as a parameter for changing a usable channel bandwidth. Thus, a usable channel bandwidth is changed in conjunction with the change in transmission power.

The changing parameter may include at least one of a channel restriction operation determination coefficient ω and information indicating a usable channel group as parameters for restricting usable channel frequencies. Thus, the usable channel frequencies are restricted in conjunction with the change in transmission power.

(Step S906) Notification Process

The base station 100 (for example, the changing rule generation unit 135 and the wireless communication unit 110) notifies the HE terminal 200 of information indicating the generated changing rule.

In the embodiment, the base station 100 stores the margin value and the changing parameter in a frame to notify of the margin value and the changing parameter. The frame which is a storing destination may be a beacon frame which all the subordinate terminals are notified of or may be another management frame which the subordinate terminals are individually notified of. For example, an example of a format stored in a beacon frame is shown in FIG. 24.

Figure 24:
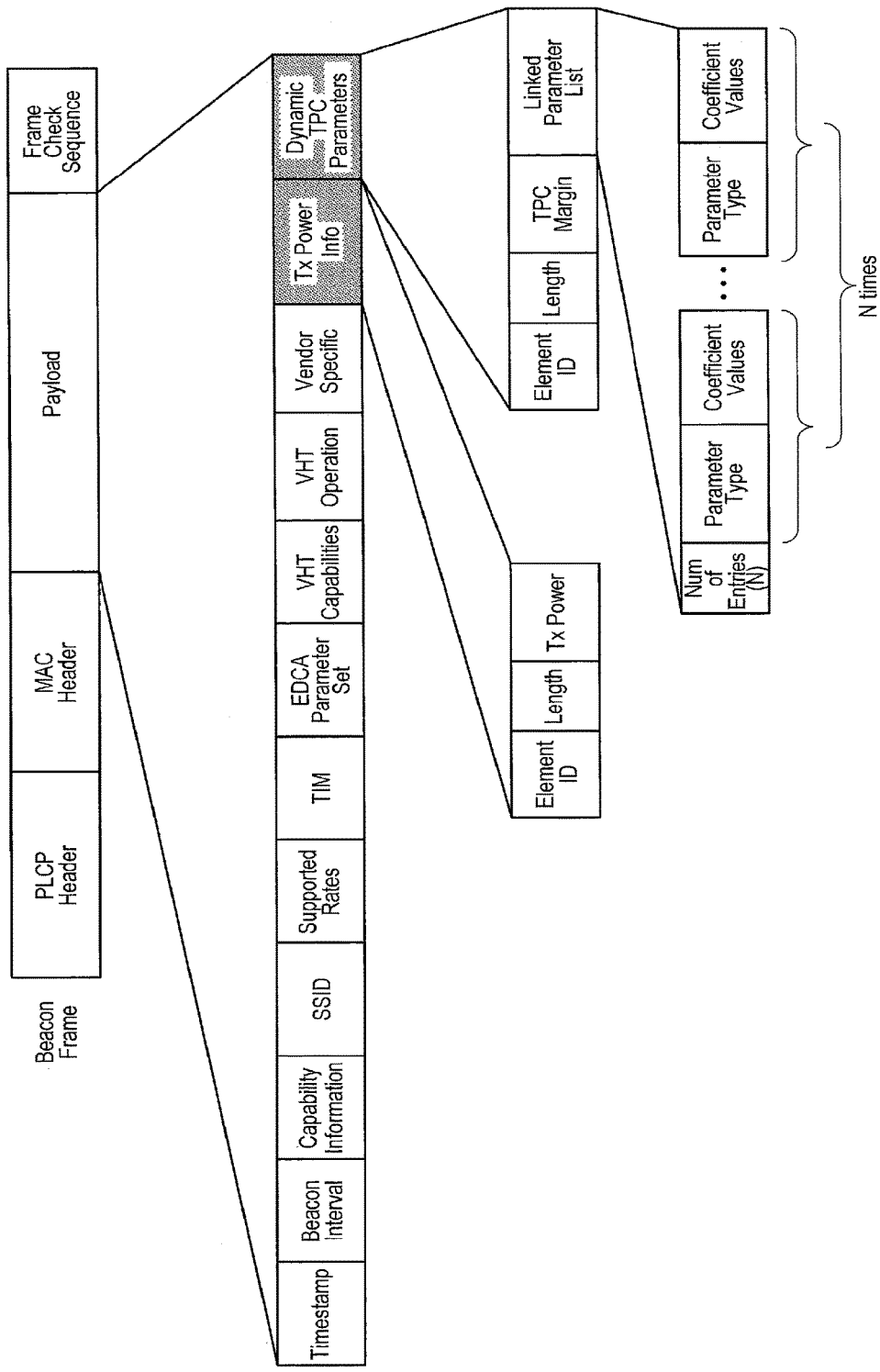
FIG. 24 is an explanatory diagram showing an example of the format of a beacon frame according to the sixth embodiment.

FIG. 24 is an explanatory diagram showing an example of the format of a beacon frame according to the embodiment. As shown in FIG. 24, there are "Tx Power Info" storing the information indicating the transmission power of the base station 100 and "Dynamic TPC parameters" storing information indicting the changing rule in a payload. "Tx Power Info" is formed of "Element ID" storing identification information, "Length" storing a field length and "Tx Power" storing information indicating the transmission power (for example, the standard transmission power) used to transmit the reference frame. "Dynamic TPC parameters" is formed of "Element ID" storing identification information, "Length" storing a field length, "TPC Margin" storing a margin value, and "Linked Parameter List" storing the changing parameter.

In this way, the base station 100 notifies the HE terminal 200 of the information indicating the combination (that is, the changing rule) of the margin value and the changing parameter, as described above. As in the modification example of the fifth embodiment described above, the base station 100 may notify the HE terminal 200 of the frame storing the mode number, instead of the margin value and the changing parameter.

(Step S908) TPC Transmission Power Setting Process

The HE terminal 200 (for example, the parameter control unit 234 and the setting unit 235) decides and sets the TPC transmission power based on the notification from the base station 100.

For example, the HE terminal 200 decides the TPC transmission power based on the notified margin value and reception strength (RSSI) of the reference frame. The reference frame may be a beacon frame storing the information indicating the above-described changing rule. Hereinafter, a TPC transmission power decision process will be described with reference to FIG. 25.

Figure 25:
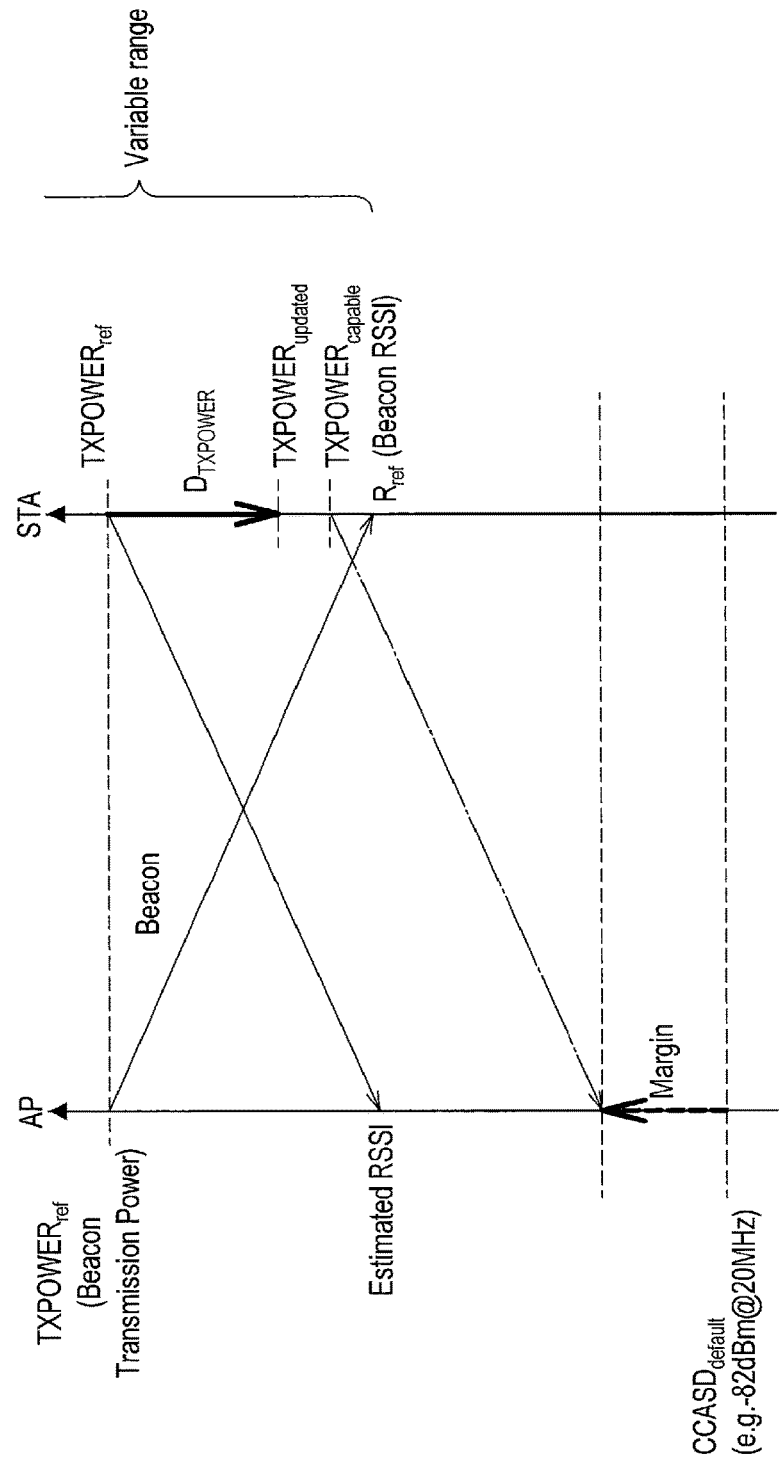
FIG. 25 is an explanatory diagram showing a TPC transmission power decision process according to the sixth embodiment.

FIG. 25 is an explanatory diagram showing a TPC transmission power decision process according to the embodiment. An AP in the drawing indicates the base station 100 and an STA indicates the HE terminal 200. As shown in FIG. 25, the HE terminal 200 receives a beacon frame transmitted from the base station 100 which is a connection destination.

For example, the HE terminal 200 sets transmission power by which a signal transmitted by the HE terminal 200 is estimated to be received by the base station 100 to the lower limit of the settable transmission power at reception strength higher by the margin value than CCASD of the side of the base station 100. Specifically, the HE terminal 200 calculates a value obtained by adding the default carrier sense level and the margin value of the base station 100 to a value obtained by subtracting the reception strength from the transmission power of the reference frame as a lower limit $TXPOWER_{capable}$ of the settable transmission power by the following equation. Here, the value $CCASD_{default}$ set as the default carrier sense level of the base station 100 is assumed to be an existing common value to the wireless terminals in the system. The following expression is a logarithmic expression.

[Math. 8]

$$TXPOWER_{capable} = TXPOWER_{ref} - R_{ref} + CCASD_{default} + M \quad \text{(Equation 8)}$$

Here, the reception strength (RSSI) of the latest reference frame (beacon frame) received from the base station 100 which is a connection destination in the HE terminal 200 is referred to as $R_{ref}$ (dBm), the margin value which the base station 100 notifies of in the above-described notification process is referred to as M(dB), and the transmission power of the reference frame which the base station 100 notifies of is referred to as $TXPOWER_{ref}$. $R_{ref}$ may be a value obtained by performing filtering such as averaging on a measurement result extending over the plurality of reference frames. M is a margin value. The value of $TXPOWER_{capable}$ may be restricted by an upper limit or a lower limit based on other factors.

Then, the HE terminal 200 changes the transmission power (that is, decides the TPC transmission power) in a range which is not below (that is, not less than) the lower limit $TXPOWER_{capable}$. Thus, a signal transmitted by the HE terminal 200 is reliably detected by the base station 100.

The value of the standard transmission power is referred to as $TXPOWER_{ref}$ and the value of the changed transmission power (that is, the TPC transmission power) is referred to as $TXPOWER_{updated}$. A difference $D_{TXPOWER}$ between $TXPOWER_{ref}$ and $TXOPWER_{updated}$ is calculated by the following equation. The following equation is also a logarithmic expression.

[Math. 9]

$$D_{TXPOWER} = TXPOWER_{ref} - TXPOWER_{updated} \quad \text{(Equation 9)}$$

Here, the value of the standard transmission power may not necessarily be identical to $TXPOWER_{ref}$ as long as the value of the standard transmission power is an existing common value to each wireless terminal and the base station in the system. Referring to the foregoing Equation 8, a change to low transmission power is permitted in the HE terminal 200 with a large RSSI. The change in the transmission power is free within a range and the HE terminal 200 may not necessarily set $TXOPWER_{updated}$ to $TXPOWER_{capable}$. The HE terminal 200 may not change the transmission power at all. That is, the $D_{TXPOWER}$ can be changed under the control of the side of the HE terminal 200. Thus, it is possible to prevent the performance of the entire system from deteriorating since the HE terminal 200 in a bad link state performs changing to the low transmission power and an unexpected transmission failure is increased. The HE terminal 200 may set the transmission power within the range according to a modulation scheme and an error correction coding scheme to be used.

(Step S910) TPC Transmission Parameter Setting Process

The HE terminal 200 (for example, the parameter control unit 234 and the setting unit 235) decides and sets the TPC transmission parameter.

More specifically, the HE terminal 200 controls a difference between the TPC transmission power and the standard transmission power decided in the above-described TPC transmission power decision process, that is, the TPC transmission parameter, according to the $D_{TXPOWER}$. For example, the HE terminal 200 increases an amount of change (the magnitude of a penalty or a preference) as the difference increases, and decreases the amount of change as the difference decreases. Thus, it is possible to appropriately alleviate an inequality of the entire system occurring according to an increase width or a decrease width of the transmission power.

The HE terminal 200 sets the TPC transmission parameter using the changing parameter corresponding to the margin value. The HE terminal 200 is assumed to decide the TPC transmission parameter in obedience to the changing rule which the base station 100 notifies of without deviance. Hereinafter, a TPC transmission parameter decision method based on the notified changing parameter will be described.

—Carrier Sense Level

The HE terminal 200 changes CCASD of the HE terminal 200 according to the $D_{TXPOWER}$. An example of the change in CCASD using the changing coefficients α and β is expressed in the following equation. A changed CCASD is referred to as $CCASD_{updated}$, a default CCASD is referred to as $CCASD_{default}$, and CCASD has a dB value.

[Math. 10]

$$CCASD_{updated} = CCASD_{default} + D_{TXPOWER}/\alpha + \beta \quad \text{(Equation 10)}$$

When α is a positive value and the TPC transmission power is lower than the standard transmission power, CCASD increases with an increase in the $D_{TXPOWER}$ (that is, as the TPC transmission power is lower). When α is a positive value and the TPC transmission power is higher than the standard transmission power, CCASD decreases with a decrease in the $D_{TXPOWER}$ (that is, as the TPC transmission power is higher).

Even when α is a positive value and the TPC transmission power is lower than the standard transmission power, $CCASD_{updated}$ calculated by the foregoing equation is lower than $CCASD_{default}$ in some cases. In this case, the HE terminal 200 is assumed to use $CCASD_{default}$ without changing CCASD. Similarly, even when α is a positive value and the TPC transmission power is higher than the standard transmission power, $CCASD_{updated}$ calculated by the foregoing equation is higher than $CCASD_{default}$ in some cases. In this case, the HE terminal 200 is assumed to use $CCASD_{default}$ without changing CCASD. In this way, when the penalty or preference to be imposed is applied in the opposite direction, the HE terminal 200 is assumed to use the default transmission parameter. The same also applies to other transmission parameters to be described below.

—Fixed Waiting Time for Transmission

The HE terminal 200 changes the fixed waiting time for transmission according to $D_{TXPOWER}$. For example, the HE terminal 200 may change the AIFSN according to $D_{TXPOWER}$.

An example of the change in the AIFSN using the changing coefficient γ is expressed in the following equation. The changed AIFSN is referred to as $AIFSN_{updated}$, the default AIFSN is referred to as $AIFSN_{default}$, and these values are assumed to be true values.

[Math. 11]

$$AIFSN_{updated} = AIFSN_{default} - \lfloor D_{TXPOWER}/\gamma \rfloor \quad \text{(Equation 11)}$$

Here, the default AIFSN is assumed to be the value of the AIFSN which the base station 100 informs of using EDCA parameter IE of the beacon frame. The change in the AIFSN is applied to all the access categories.

When γ is a positive value and the TPC transmission power is lower than the standard transmission power, the AIFSN, that is, the number of waiting slots, decreases with an increase in $D_{TXPOWER}$ (that is, as the TPC transmission power is lower). When γ is a positive value and the TPC transmission power is higher than the standard transmission power, the AIFSN, that is, the number of waiting slots, increases with a decrease in $D_{TXPOWER}$ (that is, as the TPC transmission power is higher).

—Random Waiting Time for Carrier Sense

The HE terminal 200 changes the random waiting time for carrier sense according to $D_{TXPOWER}$. For example, the HE terminal 200 may change the $CW_{min}$ according to $D_{TXPOWER}$.

An example of the change in the $CW_{min}$ using the changing coefficients δ and ε is expressed in the following equation. The changed $CW_{min}$ is referred to as $CW_{updated}$, the default $CW_{min}$ is referred to as $CW_{default}$, and these values are assumed to be true values.

[Math. 12]

$$CW_{updated} = CW_{default} / \lfloor D_{TXPOWER} / \delta \rfloor - \lfloor D_{TXPOWER} / \varepsilon \rfloor \quad \text{(Equation 12)}$$

Here, the default $CW_{min}$ is assumed to be the value of the $CW_{min}$ of which the base station 100 informs using EDCA parameter IE of the beacon frame. The change in the $CW_{min}$ is applied to all the access categories. Further, different values may be assigned as δ and ε to respective access categories.

The $CW_{min}$ has been described above. The same change may also be performed on the $CW_{max}$.

When δ and ε are positive values and the TPC transmission power is lower than the standard transmission power, the $CW_{min}$ decreases and an expected value of the random waiting time is shortened with an increase in $D_{TXPOWER}$ (that is, as the TPC transmission power is lower). When δ and ε are positive values and the TPC transmission power is higher than the standard transmission power, the $CW_{min}$ increases and an expected value of the random waiting time is lengthened with a decrease in $D_{TXPOWER}$ (that is, as the TPC transmission power is higher).

—Maximum Frame Time Length

The HE terminal 200 changes the maximum frame time length according to $D_{TXPOWER}$. The HE terminal 200 provides, for example, an upper limit of the PPDU time length and decides the upper limit according to $D_{TXPOWER}$.

An example of the change in the upper limit of the PPDU time length using the changing coefficients μ and ν is expressed in the following equation. The changed upper limit of the PPDU time length is referred to as $T_{updated}$ and this value is assumed to be a true value.

[Math. 13]

$$T_{updated} = \mu + \nu * D_{TXPOWER} \quad \text{(Equation 13)}$$

When ν is a positive value and the TCP transmission power is lower than the standard transmission power, $T_{updated}$, that is, the PPDU time length, is lengthened with an increase in $D_{TXPOWER}$ (that is, as the TCP transmission power is lower). When ν is a positive value and the TCP transmission power is higher than the standard transmission power, $T_{updated}$, that is, the PPDU time length, is shortened with a decrease in $D_{TXPOWER}$ (that is, as the TCP transmission power is higher).

For the same purpose of changing the exclusive time lengths of the radio resources, as described above, the same calculation can also be applied to a maximum amount of transmission information in one-time frame transmission, a maximum packet connection number in one-time transmission, the maximum number of retransmissions of the same packet, and a maximum time length usable in consecutive transmission of a plurality of frames.

—Usable Channel Bandwidth

The HE terminal 200 changes a channel bandwidth usable for transmission according to the $D_{TXPOWER}$. An example of the change in the usable channel bandwidth using the changing coefficient λ is expressed in the following equation. The changed usable channel bandwidth is referred to as $BW_{updated}$, the default usable channel bandwidth is referred to as $BW_{default}$, the minimum granularity of the channel bandwidth is referred to as $BW_{unit}$, and these values are assumed to be true values.

[Math. 14]

[Math. 14]

$$BW_{updated} = BW_{default} + \left\lfloor \frac{\lambda * D_{TXPOWER}}{BW_{unit}} \right\rfloor * BW_{unit} \quad \text{(Equation 14)}$$

When λ is a positive value and the TPC transmission power is lower than the standard transmission power, $BW_{updated}$, that is, the usable channel bandwidth, is enlarged with an increase in $D_{TXPOWER}$ (that is, as the TPC transmission power is lower). When λ is a positive value and the TPC transmission power is higher than the standard transmission power, $BW_{updated}$, that is, the usable channel bandwidth, is narrowed with a decrease in $D_{TXPOWER}$ (that is, as the TPC transmission power is higher).

—Usable Channel Frequency

The HE terminal 200 changes the channel frequency usable for transmission according to $D_{TXPOWER}$. For example, when the usable channels are restricted by the base station 100 and $D_{TXPOWER}$ is greater than the channel restriction operation determination coefficient ω, the HE terminal 200 excludes the restriction. Thus, the base station 100 can perform transmission at a corresponding channel.

(Step S912) Transmission Process

A process herein has been described in the fifth embodiment, and thus the detailed description thereof will be omitted herein. The HE terminal 200 notifies the base station 100 which is a connection destination of the information indicating the set transmission power.

(Step S914) Transmission Power Control Process

A process herein has been described in the fifth embodiment, and thus the detailed description thereof will be omitted herein. The base station 100 sets the transmission power of a frame to be transmitted to the HE terminal 200 based on the information indicating the transmission power set in the HE terminal 200. Here, the base station 100 maintains the transmission power of the reference frame at a predetermined value (default transmission power).

(Others)

The base station 100 may also dynamically change the transmission power and the transmission parameter using the margin value and the changing parameter decided by the base station 100.

In this case, it is necessary for a subordinate wireless terminal (for example, the HE terminal 200) of the base station 100 to periodically transmit the reference frame to the base station 100. Even when the transmission power is changed in the above-described process, the HE terminal 200 is assumed to maintain the transmission power of the reference frame at a predetermined value. The reference frame stores information indicating the transmission power to be used to transmit the reference frame.

The base station 100 measures the reception strength $R_{ref}$ of the reference frame from each of the subordinate HE terminals 200 and changes the transmission power based on $R_{ref}$ for each subordinate HE terminal 200. The base station 100 changes the transmission parameter based on $D_{TXPOWER}$ for each subordinate HE terminal 200.

8. SEVENTH EMBODIMENT

The embodiment is a mode which provides a mechanism for further improving efficiency of the entire system by adding a process of suppressing an excessive decrease in transmission power according to a situation on the basis of the sixth embodiment as a rule. Specifically, in the embodiment, the restriction on $TXPOWER_{capable}$ described with reference to FIG. 25 in the sixth embodiment by the lower limit is embodied. The embodiment provides a mechanism for improving the efficiency by adding the number of HE terminals 200 and the number of legacy terminal 300.

Hereinafter, referring back to FIG. 23, characteristic processes in the embodiment will be described in detail.
(Transmission Power Margin Decision Process)

In the embodiment, the base station 100 uses information regarding the numbers of the HE terminals 200 and legacy terminals 300 in the transmission power margin decision process.

The base station 100 can decide the margin value by various standards. For example, the base station 100 may monitor surroundings, measure an average strength of interference, and decide the margin value based on the measured average strength of the interference. Specifically, the base station 100 decides a large value when the average strength of the interference is high, and decides a small value when the average strength of the interference is small. The base station 100 decides the margin value according to the numbers of subordinate HE terminals 200 and legacy terminals 300. The base station 100 may decide the margin value of the transmission power by further adding information regarding the numbers of HE terminals 200 and legacy terminals 300 belonging to a wireless network established by another base station. Specifically, the base station 100 decides a large margin value when a ratio of the legacy terminals to the total number of terminals is high, and decides a small margin value when the ratio is low.

The base station 100 obtains the numbers of subordinate HE terminals 200 and legacy terminals 300 from information owned by the base station 100. The base station 100 obtains the information regarding the numbers of HE terminals 200 and legacy terminals 300 of the other wireless network from content of a beacon transmitted by the base station of the other wireless network. The format of the beacon for performing the obtainment will be described below.

Subsequently, in the embodiment, the base station 100 decides the margin value of the transmission power and also decides a lower limit level which is a parameter used in a TPC transmission power setting process by a subordinate terminal. The lower limit level is preferably decided based on the strength of interference. An example of the decision procedure will be described below.

For example, the base station 100 first measures an average strength of interference using a monitor and sets the measured value as I. The base station 100 is assumed to set a level at which sufficient SINR can be ensured with respect to I and noise power N to the lower limit level. The lower limit level is referred to as LL. When SINR in which a certain modulation and coding scheme (MCS) can ensure sufficient transmission characteristics is referred to as SINR (m) on the assumption that an index of the MCS is m, the lower level LL(m) corresponding to each m is expressed in the following equation. The following equation is an expression in a true value.

$$LL(m)=SINR(m)*\{1+N\} \qquad \text{(Equation 15)}$$

Each LL(m) may be a value obtained by adding a predetermined offset to a value obtained by the foregoing Equation 15. LL may not be present by the number of MCSs to be necessarily used. For example, LL presuming a specific MCS may be typified.
(Changing Parameter Decision Process)

This process is the same as that of the sixth embodiment and the detailed description will be omitted herein.
(Notification Process)

Figure 26:
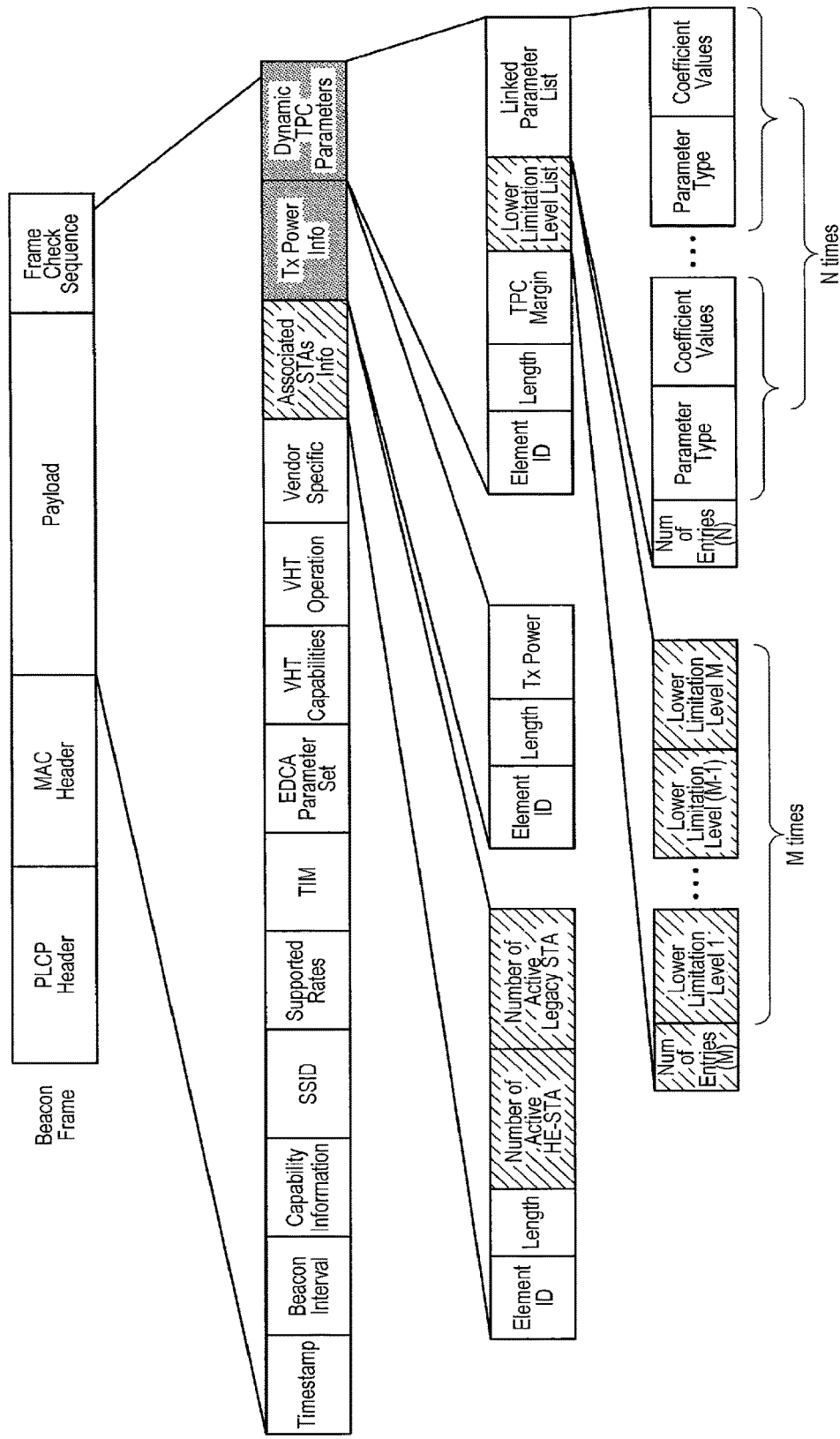
FIG. 26 is an explanatory diagram showing an example of the format of a beacon frame according to a seventh embodiment.

FIG. 26 shows the format of a beacon frame when a margin value and a changing parameter are stored in the beacon frame as in the sixth embodiment. As shown in FIG. 26, in the format of the beacon frame according to the embodiment, an "Associated STAs Info" element is added in addition to the content of the sixth embodiment. A "Lower Limitation Level List" field is added to a "Dynamic TPC Parameters" element.

In the "Associated STAs Info" element, the numbers of subordinate HE terminals and legacy terminals connected to the base station 100 are described. Thus, when the base station 100 receives a beacon with this format transmitted from another base station, the base station 100 can ascertain the numbers of HE terminals 200 and legacy terminals 300 belonging to another wireless network. When the number of terminals is stored, the number of terminals may be described in addition to an amount of traffic per certain time. For example, since a terminal which does not perform communication despite being connected does not contribute to interference in communication with another station, contribution may be set to be small at the time of counting or may be set to be omitted from the counting.

The value LL of the lower limit level decided in the above-described transmission power margin decision process is stored in the "Lower Limitation Level List" field. When there are the plurality of LLs, the LLs are sequentially stored.

Positions and hierarchies at which information regarding "Associated STAs Info" and "Lower Limitation Level List" are stored are not limited to the form of FIG. 26, but may be other positions and hierarchies.
(TPC Transmission Power Setting Process)

First, the HE terminal 200 obtains $TXPOWER_{capable}$ by Equation 8, as in the sixth embodiment. Subsequently, the HE terminal 200 obtains a lower limit reception level $R_{LL}$ based on the lower limit level information LL(m) delivered from the base station in a notification process. $TXPOWER_{capable}$ is also a lower limit of the setting of $TXPOWER_{updated}$ and the lower limit of the value of $TXPOWER_{capable}$ is designated through this calculation. Here, the maximum value not greater than $R_{ref}$ (Beacon RSSI in FIG. 25) in LL(m) is assumed to be $R_{LL}$. When $R_{ref}$ is lower than every LL(m), the minimum LL(m) is assumed to be $R_{LL}$. Here, the HE terminal 200 may add the predetermined offset shared in advance with the base station 100 to LL(m), and then decide $R_{LL}$.

The HE terminal 200 updates $TXPOWER_{capable}$ in the following equation. The following equation is a logarithmic expression.

$$TXPOWER_{capable}=\max(TXTOWER_{capable}, TXOPWER_{ref}-R_{ref}+R_{LL}) \quad \text{(Equation 16)}$$

Then, the HE terminal 200 changes the transmission power (that is, decides the TPC transmission power) in a range which is not below (that is, not less than) the lower limit $TXPOWER_{capable}$. A value of the changed transmission power is $TXPOWER_{updated}$. Thus, a signal transmitted by the HE terminal 200 is reliably detected by the base station 100.

Here, the HE terminal 200 may further add information regarding "Associated STAs Info" received from the connected base station 100 and decide $TXPOWER_{updated}$. Specifically, the HE terminal 200 decides high $TXPOWER_{updated}$ when a ratio of the legacy terminals to the total number of terminals is high, and decides low $TXPOWER_{updated}$ when a ratio of the legacy terminals to the total number of terminals is low.

(TPC Transmission Parameter Setting Process)
(Transmission Process)
(Transmission Power Control Process)

The subsequent processes are the same as those of the sixth embodiment, and the detailed description thereof will be omitted herein.

The seventh embodiment has been described above. By performing the extension of the sixth embodiment as in the embodiment, $TXPOWER_{capable}$ becomes a higher value by a lower limit structure of $TXPOWER_{capable}$ described above. Thus, it is possible to avoid an adverse effect caused due to the excessive decrease in the transmission power. The adverse effect refers to a state in which usable modulation is excessively low at a data rate when the transmission power is decreased more than necessary, and thus use efficiency of radio resources is lowered in the entire system.

The embodiment provides two extension elements, the lower limit structure of $TXPOWER_{capable}$ and the correction in which the information regarding the numbers of HE terminals 200 and legacy terminals 300 is added, as described above. It is not necessary to combine and use the extension elements, but any one extension element may be independently applied.

9. EIGHTH EMBODIMENT

The lower-limit mechanism of the transmission power and the correction mechanism to which the number of terminals is added in the above-described seventh embodiment can be applied even when the transmission power is used as a changing parameter interlocking with DSC in the fifth embodiment. The embodiment is a mode developed from the fifth embodiment.

The HE terminal 200 according to the embodiment may limit a settable range of transmission power based on a CCASD lower-limit mechanism. More specifically, the HE terminal 200 calculates a settable range of the DSC threshold back from the settable range of the transmission power and changes the value of CCASD within this range.

Hereinafter, referring back to FIG. 17, characteristic processes in the embodiment will be described in detail.

(Carrier Sense Margin Decision Process)

In the embodiment, the base station 100 uses information regarding the number of HE terminals 200 and the number of legacy terminals 300 to decide a carrier sense margin.

The base station 100 can decide the margin value by various standards. For example, the base station 100 may monitor surroundings, measure an average strength of interference, and decide the margin value based on the measured average strength of the interference. Specifically, the base station 100 decides a large value when the average strength of the interference is high, and decides a small value when the average strength of the interference is small. The base station 100 decides the margin value according to the numbers of subordinate HE terminals 200 and legacy terminals 300. The base station 100 decides the margin value of the transmission power by further adding information regarding the numbers of HE terminals 200 and legacy terminals 300 belonging to a wireless network established by another base station. Specifically, the base station 100 decides a large margin value when a ratio of the legacy terminals to the total number of terminals is high, and decides a small margin value when the ratio is low.

The base station 100 obtains the numbers of subordinate HE terminals 200 and legacy terminals 300 from information owned by the base station 100. The base station 100 obtains the information regarding the numbers of HE terminals 200 and legacy terminals 300 of the other wireless network from content of a beacon transmitted by the base station of the other wireless network. The format of the beacon for performing the obtainment will be described below.

Subsequently, in the embodiment, the base station 100 decides the carrier sense margin value and also decides a transmission power lower-limit level which is a parameter used by a subordinate terminal to perform the DSC transmission parameter setting process. The lower-limit level is preferably decided based on a strength of interference. A decision procedure is the same as that of Equation 15 in the seventh embodiment.

(Changing Parameter Decision Process)

This process is basically the same as that of the fifth embodiment, but at least transmission power is assumed to be included as a changing parameter in the embodiment.

(Notification Process)

Figure 27:
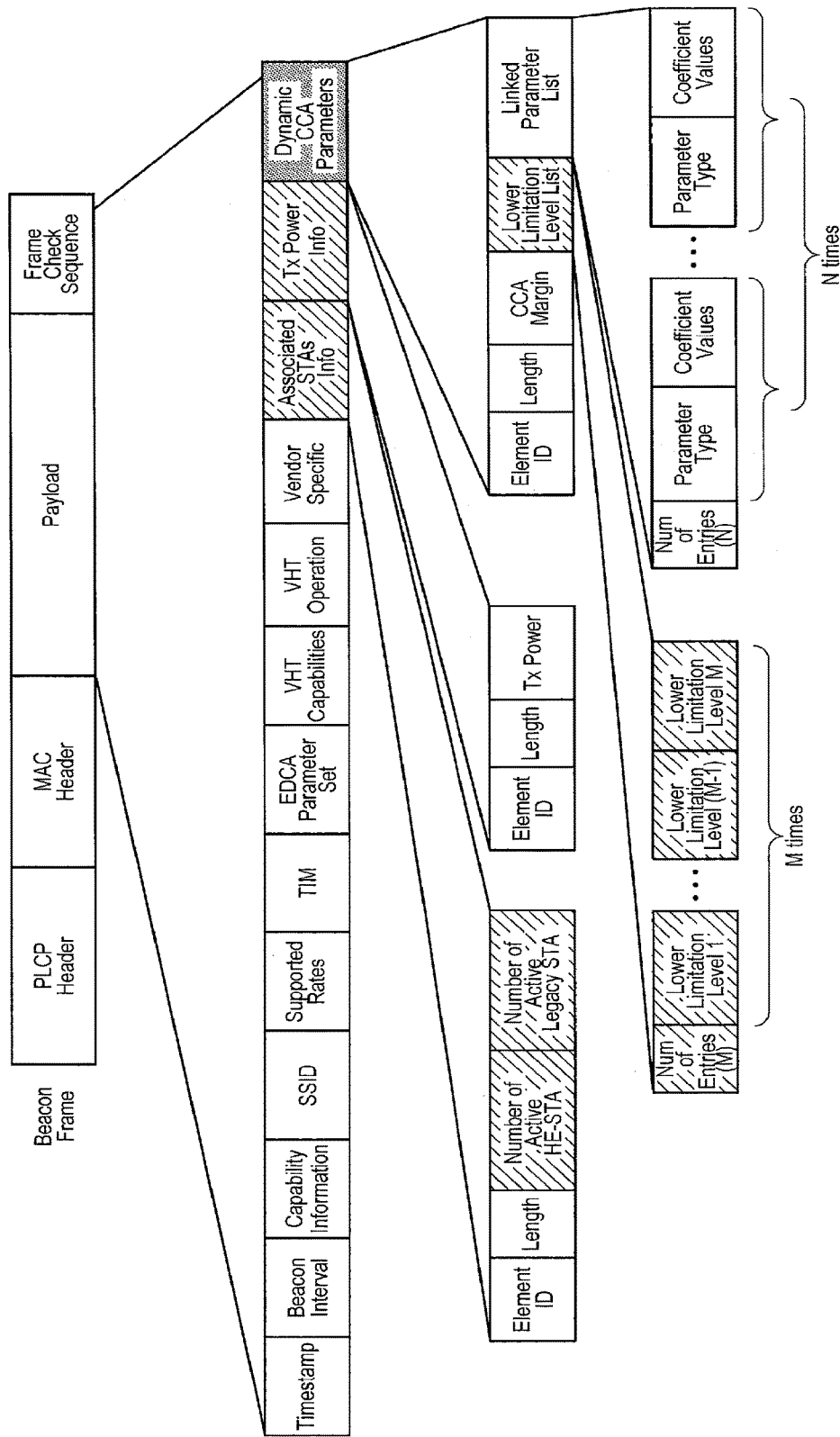
FIG. 27 is an explanatory diagram showing an example of the format of a beacon frame according to an eighth embodiment.

The format of a beacon frame when the margin value and the changing parameter are assumed to be stored in a beacon frame as in the sixth embodiment is shown in FIG. 27. As shown in FIG. 27, in addition to the content in the fifth embodiment, the "TX Power Info" element used in the sixth embodiment and the "Associated STAs Info" element used in the seventh embodiment are added to the format of the beacon frame according to the embodiment, and a "Lower Limitation Level List" field is added to the "Dynamic CCA Parameters" element. A method of generating each piece of information and a method of storing each piece of information are the same as those of the sixth and seventh embodiments.

(DSC Threshold Setting Process)

In the embodiment, the HE terminal 200 calculates $CCASD_{capable}$ in the same procedure as Equation 1 in the fifth embodiment and adds calculation to further provide an upper limit. $CCASD_{capable}$ is an upper limit of the setting of $CCASD_{updated}$, but this calculation is performed to designate an upper limit of the value of $CCASD_{capable}$.

The HE terminal 200 obtains the upper limit by performing back-calculation from a change in the transmission power set in the DSC transmission parameter setting process. A procedure of the calculation will be described below.

First, the HE terminal 200 obtains TXPOWER$_{capable}$ in the same procedure as that of Equation 8 in the sixth embodiment. Next, the HE terminal 200 performs lower-limit processing on TXPOWER$_{capable}$ in the same procedure as that of Equation 16 in the seventh embodiment. Here, the HE terminal 200 may add a predetermined offset shared in advance with the base station 100 to LL(m), and then may decide R$_{LL}$. Then, the HE terminal 200 decides TXPOWER$_{updated}$ within a range which is not below (that is, not less than) the lower limit TXPOWER$_{capable}$.

Thereafter, the HE terminal 200 calculates the upper limit of CCASD, CCASD$_{UL}$, as follows using the value of TXPOWER$_{updated}$ and values α and β related to the transmission power among the changing parameters which the base station 100 notifies of.

$$CCASD_{UL}=\alpha(P_{default}-TXPOWER_{updated}+\beta)+CCASD_{default} \quad \text{(Equation 17)}$$

Equation 17 is a modification for back-calculation of D$_{CCASD}$ by providing TXPOWER$_{updated}$ to P$_{updated}$ in Equations 2 and 3 and is basically identical.

The HE terminal 200 updates CCASD$_{capable}$ as follows using CCASD$_{UL}$.

$$CCASD_{capable}=\min(CCASD_{capable},CCASD_{UL}) \quad \text{(Equation 18)}$$

The HE terminal 200 decides CCASD$_{updated}$ within a range with CCASD$_{default}$ by applying CCASD$_{capable}$ and the calculation of D$_{CCASD}$ is the same as that of the fifth embodiment.

Here, the HE terminal 200 may further add information regarding "Associated STAs Info" received from the connected base station 100 and decide CCASD$_{updated}$. Specifically, for example, the HE terminal 200 decides high CCASD$_{updated}$ when a ratio of the legacy terminals to the total number of terminals is high, and decides low CCASD$_{updated}$ when a ratio of the legacy terminals to the total number of terminals is low.

(DSC Transmission Parameter Setting Process)

This process is basically the same as that of the fifth embodiment. The HE terminal 200 decides the DSC transmission parameter based on the value of D$_{CCASD}$. For a changed value of the transmission power, the HE terminal 200 applies TXPOWER$_{updated}$ which has already been calculated during the foregoing DSC threshold setting process.

(Transmission Process)
(Transmission Power Control Process)

The subsequent processes are the same as those of the fifth embodiment, and the detailed description thereof will be omitted herein.

The eighth embodiment has been described. By extending the fifth embodiment, it is possible to prevent a situation in which the transmission power is interlocked to be considerably lowered when the value of CCASD is simply increased, and thus efficiency of the entire system deteriorates. Since an increase in CCASD and treating of the transmission power can be simultaneously maintained, equality is maintained.

The embodiment also provides two extension elements, the lower limit structure of TXPOWER$_{capable}$ and the correction in which the information regarding the numbers of HE terminals 200 and legacy terminals 300 is added, as described above. It is not necessary to combine and use the extension elements, but any one extension element may be independently applied.

10. APPLICATION EXAMPLES

The technology according to the present disclosure can be applied to various products. For example, the HE terminal 200 may be realized as mobile terminals such as smartphones, tablet personal computers (PCs), notebook PCs, portable game terminals, or digital cameras, fixed-type terminals such as television receivers, printers, digital scanners, or network storages, or car-mounted terminals such as car navigation apparatuses. Further, the HE terminal 200 may be realized as terminals (also referred to as machine type communication (MTC) terminals) which perform machine to machine (M2M) communication, such as smart meters, vending machine, remote monitoring apparatuses and point of sale (POS) terminals. Furthermore, the HE terminal 200 may be wireless communication modules mounted in such terminals (for example, integrated circuit modules configured in one die).

For example, the base station 100 may be realized as a wireless LAN access point (which is also referred to as a wireless base station) that has no router function or has a router function. The base station 100 may be realized as a mobile wireless LAN router. Furthermore, the base station 100 may be wireless communication modules mounted in such devices (for example, integrated circuit modules configured in one die).

10-1. First Application Example

Figure 28:
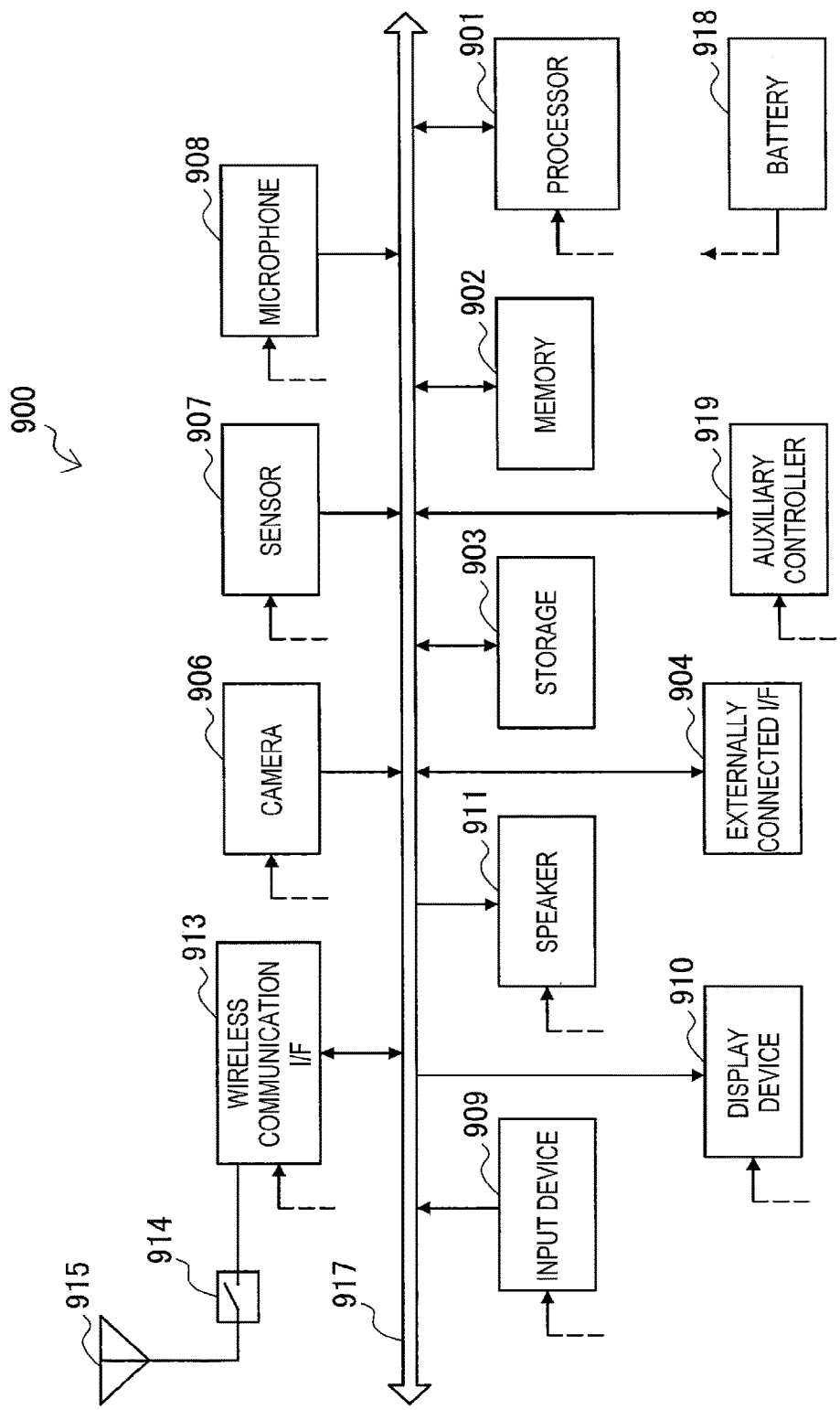
FIG. 28 is a block diagram showing an example of a schematic configuration of a smartphone.

FIG. 28 is a block diagram showing an example of a schematic configuration of a smartphone 900 to which the technology of the present disclosure can be applied. The smartphone 900 includes a processor 901, a memory 902, a storage 903, an externally connected interface 904, a camera 906, a sensor 907, a microphone 908, a input device 909, a display device 910, a speaker 911, a wireless communication interface 913, an antenna switch 914, an antenna 915, a bus 917, a battery 918, and an auxiliary controller 919.

The processor 901 may be, for example, a central processing unit (CPU) or a system on chip (SoC), and controls functions of an application layer and other layers of the smartphone 900. The memory 902 includes a random access memory (RAM) and a read only memory (ROM), and stores programs executed by the processor 901 and data. The storage 903 can include a storage medium such as a semiconductor memory or a hard disk. The externally connected interface 904 is an interface for connecting an externally attached device such as a memory card or a universal serial bus (USB) device to the smartphone 900.

The camera 906 has an image sensor, for example, a charge coupled device (CCD) or a complementary metal oxide semiconductor (CMOS) to generate captured images. The sensor 907 can include a sensor group including, for example, a positioning sensor, a gyro sensor, a geomagnetic sensor, an acceleration sensor, and the like. The microphone 908 converts sounds input to the smartphone 900 into audio signals. The input device 909 includes, for example, a touch sensor that detects touches on a screen of the display device 910, a key pad, a keyboard, buttons, switches, and the like to receive manipulations or information inputs from a user. The display device 910 has a screen such as a liquid crystal display (LCD), or an organic light emitting diode (OLED) display to display output images of the smartphone 900. The speaker 911 converts audio signals output from the smartphone 900 into sounds.

The wireless communication interface 913 supports one or more wireless LAN standards of IEEE 802.11a, 11b, 11g, 11n, 11ac, and 11ad to execute wireless LAN communication. The wireless communication interface 913 can communicate with another apparatus via a wireless LAN access point in the infrastructure mode. In addition, the wireless communication interface 913 can directly communicate with another apparatus in a direct communication mode, such as an ad hoc mode, Wi-Fi Direct (registered trademark), or the like. In Wi-Fi Direct, one of two terminals operates as an access point unlike in an ad hoc mode, but communication is performed directly between the terminals. The wireless communication interface 913 can typically have a baseband processor, an radio frequency (RF) circuit, a power amplifier, and the like. The wireless communication interface 913 may be a single-chip module on which a memory that stores a communication control program, a processor that executes the program, and a relevant circuit are integrated. The wireless communication interface 913 may support another kind of wireless communication scheme such as a short-range wireless communication scheme, a proximity wireless communication scheme, or the cellular communication scheme in addition to the wireless LAN scheme. The antenna switch 914 switches a connection destination of the antenna 915 for a plurality of circuits (for example, a circuit for another wireless communication scheme) included in the wireless communication interface 913. The antenna 915 has a single or a plurality of antenna elements (for example, a plurality of antenna elements included in a MIMO antenna) and is used for transmission and reception of wireless signals from the wireless communication interface 913.

Note that the smartphone 900 may include a plurality of antennas (for example, antennas for a wireless LAN or antennas for a proximity wireless communication scheme, or the like), without being limited to the example of FIG. 28. In this case, the antenna switch 914 may be omitted from the configuration of the smartphone 900.

The bus 917 connects the processor 901, the memory 902, the storage 903, the externally connected interface 904, the camera 906, the sensor 907, the microphone 908, the input device 909, the display device 910, the speaker 911, the wireless communication interface 913, and the auxiliary controller 919 to one another. The battery 918 supplies electric power to each of the blocks of the smartphone 900 shown in FIG. 28 via power supply lines partially indicated by dashed lines in the drawing. The auxiliary controller 919 causes, for example, required minimum functions of the smartphone 900 to be operated in a sleep mode.

The wireless communication unit 210, the storage unit 220, and the control unit 230 (the acquisition unit 231, the decision unit 233, and the setting unit 235) described with reference to FIG. 4 in the smartphone 900 shown in FIG. 28 may be mounted on the wireless communication interface 913. At least some of the functions may be mounted on the processor 901 or the auxiliary controller 919.

The smartphone 900 may operate as a wireless access point (software AP) when the processor 901 performs an access point function at an application level. The wireless communication interface 913 may have the wireless access point function.

10-2. Second Application Example

Figure 29:
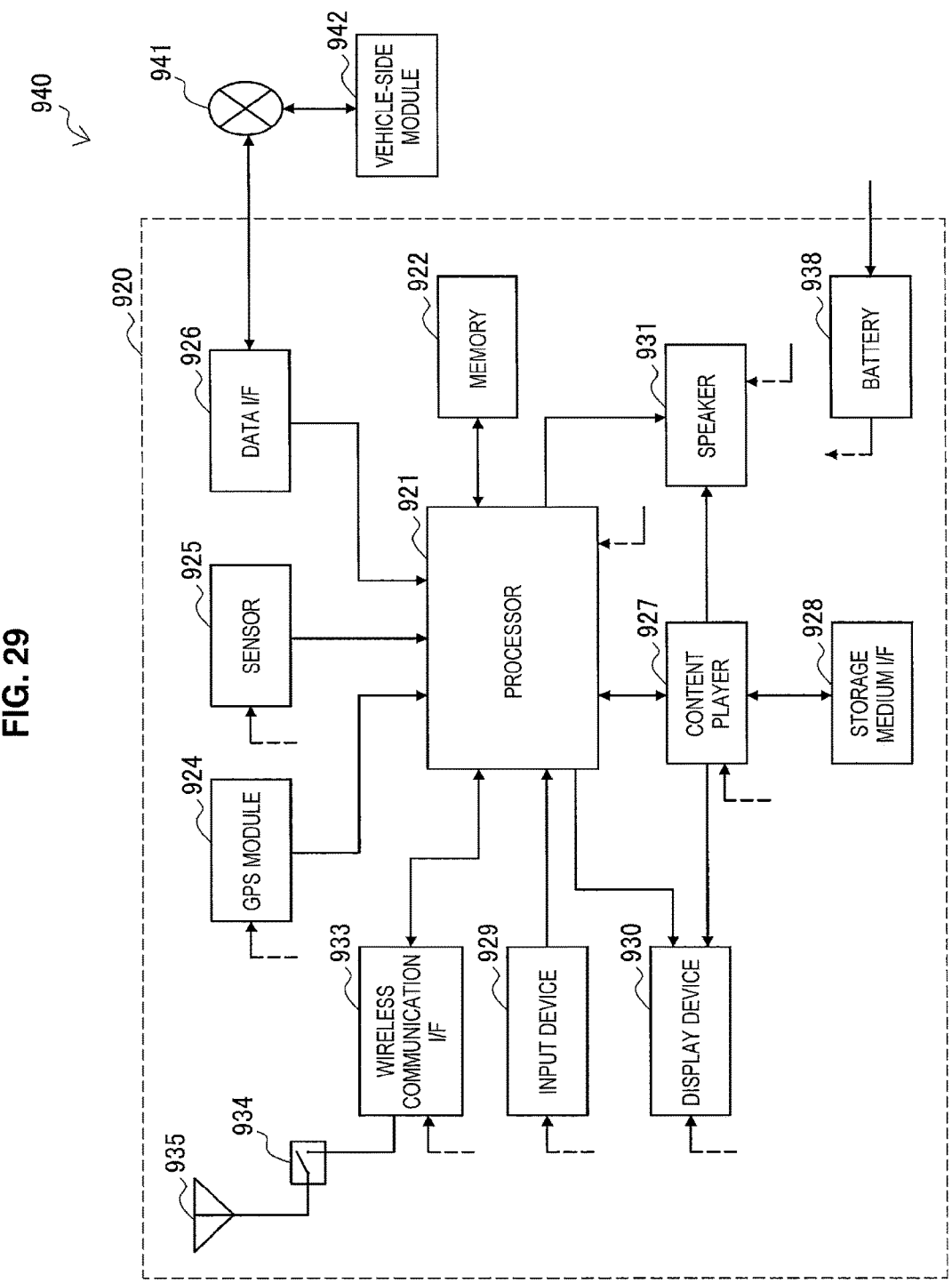
FIG. 29 is a block diagram showing an example of a schematic configuration of a car navigation apparatus.

FIG. 29 is a block diagram showing an example of a schematic configuration of a car navigation apparatus 920 to which the technology of the present disclosure can be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, an antenna switch 934, an antenna 935, and a battery 938.

The processor 921 may be, for example, a CPU or an SoC controlling a navigation function and other functions of the car navigation apparatus 920. The memory 922 includes a RAM and a ROM storing programs executed by the processor 921 and data.

The GPS module 924 measures a position of the car navigation apparatus 920 (for example, latitude, longitude, and altitude) using GPS signals received from a GPS satellite. The sensor 925 can include a sensor group including, for example, a gyro sensor, a geomagnetic sensor, a barometric sensor, and the like. The data interface 926 is connected to an in-vehicle network 941 via, for example, a terminal that is not illustrated to acquire data generated on the vehicle side such as car speed data.

The content player 927 reproduces content stored in a storage medium (for example, a CD or a DVD) inserted into the storage medium interface 928. The input device 929 includes, for example, a touch sensor that detects touches on a screen of the display device 930, buttons, switches, and the like to receive manipulations or information inputs from a user. The display device 930 has a screen such as an LCD or an OLED display to display images of the navigation function or reproduced content. The speaker 931 outputs sounds of the navigation function or reproduced content.

The wireless communication interface 933 supports one or more wireless LAN standards of IEEE 802.11a, 11b, 11g, 11n, 11ac, and 11ad to execute wireless LAN communication. The wireless communication interface 933 can communicate with another apparatus via a wireless LAN access point in the infrastructure mode. In addition, the wireless communication interface 933 can directly communicate with another apparatus in a direct communication mode, such as an ad hoc mode, Wi-Fi Direct, or the like. The wireless communication interface 933 can typically have a baseband processor, an RF circuit, a power amplifier, and the like. The wireless communication interface 933 may be a single-chip module on which a memory that stores a communication control program, a processor that executes the program, and a relevant circuit are integrated. The wireless communication interface 933 may support another kind of wireless communication scheme such as a short-range wireless communication scheme, a proximity wireless communication scheme, or the cellular communication scheme in addition to the wireless LAN scheme. The antenna switch 934 switches a connection destination of the antenna 935 for a plurality of circuits included in the wireless communication interface 933. The antenna 935 has a single or a plurality of antenna elements and is used for transmission and reception of wireless signals from the wireless communication interface 933.

Note that the car navigation apparatus 920 may include a plurality of antennas, without being limited to the example of FIG. 29. In this case, the antenna switch 934 may be omitted from the configuration of the car navigation apparatus 920.

The battery 938 supplies electric power to each of the blocks of the car navigation apparatus 920 shown in FIG. 28 via power supply lines partially indicated by dashed lines in the drawing. In addition, the battery 938 accumulates electric power supplied from the vehicle.

The wireless communication unit 210, the storage unit 220, and the control unit 230 (the acquisition unit 231, the decision unit 233, and the setting unit 235) described with reference to FIG. 4 in the car navigation apparatus 920 shown in FIG. 29 may be mounted on the wireless communication interface 933. At least some of the functions may be mounted on the processor 921.

The wireless communication interface 933 may operate as the above-described base station 100 or may provide wireless connection to a terminal carried by a user getting in a vehicle.

The technology of the present disclosure may be realized as an in-vehicle system (or a vehicle) 940 including one or more blocks of the above-described car navigation apparatus 920, the in-vehicle network 941, and a vehicle-side module 942. The vehicle-side module 942 generates vehicle-side data such as a vehicle speed, the number of engine rotations, or failure information and outputs the generated data to the in-vehicle network 941.

10-3. Third Application Example

Figure 30:
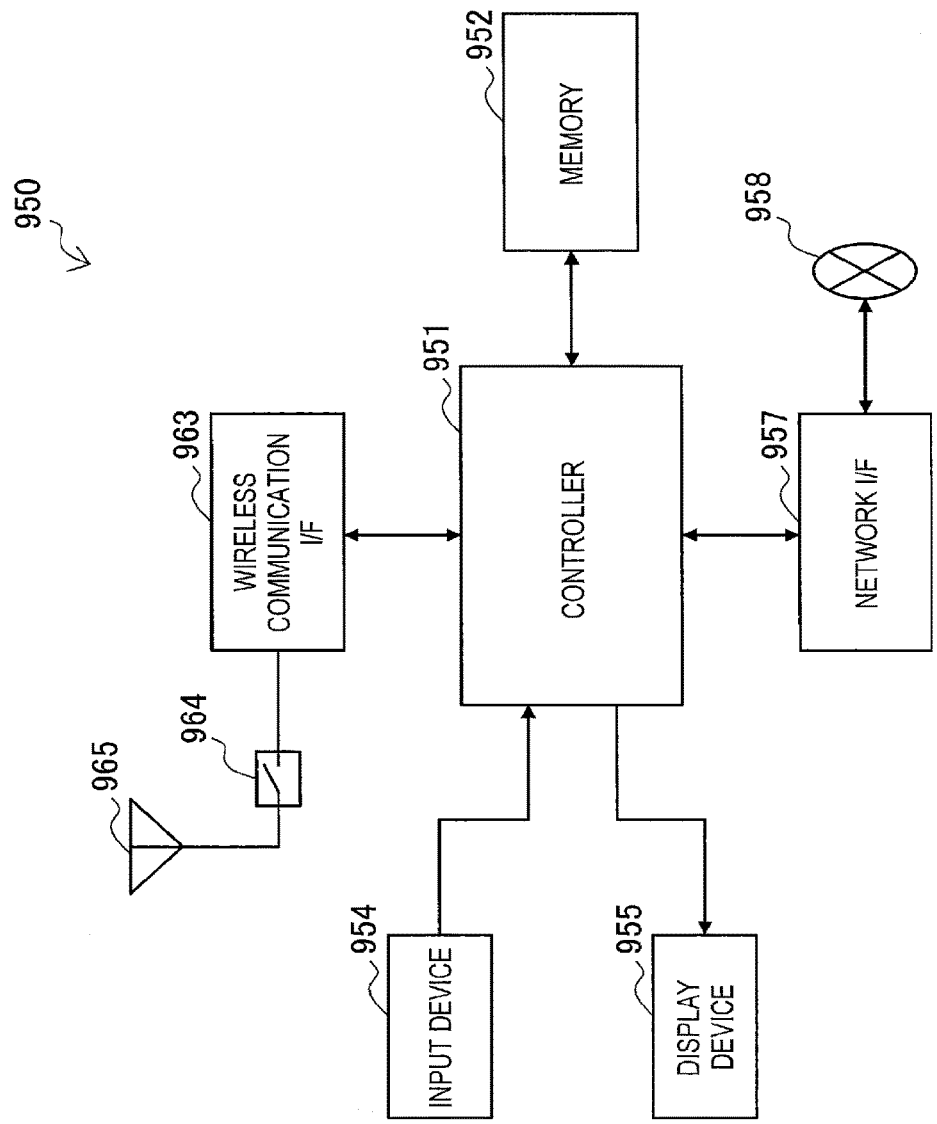
FIG. 30 is a block diagram showing an example of a schematic configuration of a wireless access point.

FIG. 30 is a block diagram showing an example of a schematic configuration of a wireless access point 950 to which the technology of the present disclosure can be applied. The wireless access point 950 includes a controller 951, a memory 952, an input device 954, a display device 955, a network interface 957, a wireless communication interface 963, an antenna switch 964, and an antenna 965.

The controller 951 may be, for example, a CPU or a digital signal processor (DSP) and operates various functions (for example, access restriction, routing, encryption, firewall, and log management) of the Internet Protocol (IP) layer and higher layers of the wireless access point 950. The memory 952 includes a RAM and a ROM and stores a program to be executed by the controller 951 and various kinds of control data (for example, a terminal list, a routing table, an encryption key, security setting, and a log).

The input device 954 includes, for example, buttons or switches and receives manipulations from a user. The display device 955 includes an LED lamp or the like and displays operation status of the wireless access point 950.

The network interface 957 is a wired communication interface that connects the wireless access point 950 to a wired communication network 958. The network interface 957 may include a plurality of connection terminals. The wired communication network 958 may be a LAN such as Ethernet (registered trademark) or a wide area network (WAN).

The wireless communication interface 963 supports one or more wireless LAN standards of IEEE 802.11a, 11b, 11g, 11n, 11ac, and 11ad to provide a wireless connection to a terminal located nearby as an access point. The wireless communication interface 963 can typically have a baseband processor, an RF circuit, a power amplifier, and the like. The wireless communication interface 963 may be a single-chip module on which a memory that stores a communication control program, a processor that executes the program, and a relevant circuit are integrated. The antenna switch 964 switches a connection destination of the antenna 965 for a plurality of circuits included in the wireless communication interface 963. The antenna 965 has a single antenna element or a plurality of antenna elements and is used for transmission and reception of wireless signals from the wireless communication interface 963.

In the wireless access point 950 shown in FIG. 30, the wireless communication unit 110, the storage unit 120, and the control unit 130 (the DSC control unit 131 and the parameter control unit 133) described with reference to FIG. 3 may be mounted on the wireless communication interface 963. At least some of the functions may be implemented in the controller 951.

11. CONCLUSION

The embodiments of the present disclosure have been described in detail above with reference to FIGS. 1 to 30. As described above, the HE terminal 200 controls the parameters used to transmit data based on a comparison result between the DSC threshold and the default threshold when the HE terminal 200 performs wireless communication with another device using the DSC threshold. Here, the HE terminal 200 controls the transmission parameter such that the increase or decrease in the opposite direction of the increase or decrease in the transmission opportunities by DSC is applied. Thus, the HE terminal 200 can reduce an inequality of the transmission opportunities occurring between the HE terminal 200 and the legacy terminal 300 when the HE terminal 200 uses DSC.

As described above, the base station 100 according to each embodiment controls the parameters used by the HE terminal 200 to transmit data through wireless communication based on a comparison result between the DSC threshold and the default threshold set by the HE terminal 200. Here, the base station 100 controls the transmission parameter of the HE terminal 200 such that the increase or decrease in the opposite direction of the increase or decrease in the transmission opportunities by DSC is applied. Thus, the base station 100 can reduce an inequality of the transmission opportunities occurring between the HE terminal 200 and the legacy terminal 300 when the HE terminal 200 uses DSC.

The preferred embodiments of the present disclosure have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, the examples in which the communication system is a system that conforms to a wireless LAN or a communication standard equivalent to the wireless LAN have been described above, but the present technology is not limited to such examples. For example, the communication system may be a system that conforms to other communication standards.

The examples in which an entity controlling the DSC threshold and the DSC transmission parameter is the base station 100 have been described above, but the present technology is not limited to such examples. For example, another wireless terminal such as a smartphone may be an entity that controls the DSC threshold and the DSC transmission parameter. The communication system 1 may adopt not only a communication form in which the base station 100 is a center of wireless communication but also, for example, a peer-to-peer (P2P) type communication form. In this case, the DSC threshold and the DSC transmission parameter can be controlled by a wireless terminal which is a data communication partner.

Further, the HE terminal 200 may have the functions of the base station 100. That is, the HE terminal 200 may monitor a connection situation between the base station 100, another HE terminal 200, and the legacy terminal 300, control whether operation is performed in the DSC mode of the HE terminal 200, and control the DSC threshold and the DSC transmission parameter.

The examples in which the DSC threshold and the DSC transmission parameter are control targets have been described above, but the present technology is not limited to the examples. For example, one of the DSC threshold and the DSC transmission parameter may be a fixed value and the other of the DSC threshold and the DSC transmission parameter may be a variable value (control target).

The series of control processes carried out by each apparatus described in the present specification may be realized by software, hardware, or a combination of software and hardware. Programs that compose such software may be stored in advance for example on a storage medium (non-transitory medium) provided inside or outside each of the apparatus. As one example, during execution, such programs are written into RAM (Random Access Memory) and executed by a processor such as a CPU.

Note that it is not necessary for the processing described in this specification with reference to the flowchart to be executed in the order shown in the flowchart. Some processing steps may be performed in parallel. Further, some of additional steps can be adopted, or some processing steps can be omitted.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below.

(1)

A wireless communication device including:

a wireless communication unit configured to perform wireless communication with another device; and a control unit configured to set a first carrier sense level and control a parameter used by the wireless communication unit to transmit data based on a comparison result between the set first carrier sense level and a second carrier sense level which is a default.

(2)

The wireless communication device according to (1), wherein the control unit controls the parameter in a manner that transmission opportunities are decreased more than at the time of use of the parameter which is a default when the first carrier sense level is higher than the second carrier sense level, and the transmission opportunities are increased more than at the time of use of the parameter which is the default when the first carrier sense level is lower than the second carrier sense level.

(3)

The wireless communication device according to (1) or (2), wherein the parameter includes a fixed length portion in a waiting time before the data transmission.

(4)

The wireless communication device according to any one of (1) to (3), wherein the parameter includes a parameter of a distribution of an acquirable value of a time length selected at random in a waiting time before the data transmission.

(5)

The wireless communication device according to any one of (1) to (4), wherein the parameter includes a maximum value of an amount of transmittable data.

(6)

The wireless communication device according to any one of (1) to (5), wherein the parameter includes a maximum value of a transmittable time duration.

(7)

The wireless communication device according to any one of (1) to (6), wherein the parameter includes a maximum number of retransmissions.

(8)

The wireless communication device according to any one of (1) to (7), wherein the parameter includes a maximum value of the number of unit channels usable in a bundle.

(9)

The wireless communication device according to any one of (1) to (8), wherein the parameter includes a usable channel.

(10)

The wireless communication device according to any one of (1) to (11), wherein the control unit determines whether to perform execution of change of the second carrier sense level to the first carrier sense level and to perform execution of data transmission using the parameter.

(11)

The wireless communication device according to (10), wherein the control unit determines whether to perform the execution based on whether a transmission time is included in a period scheduled as a transmittable time slot.

(12)

The wireless communication device according to (10) or (11), wherein the control unit determines whether to perform the execution based on a type of a frame to be transmitted.

(13)

The wireless communication device according to any one of (1) to (12), further including:

an acquisition unit configured to acquire information indicating the first carrier sense level and information indicating the parameter.

(14)

The wireless communication device according to any one of (1) to (13), wherein the control unit controls the parameter according to a difference between the first carrier sense level and the second carrier sense level.

(15)

The wireless communication device according to (14), wherein the parameter includes transmission power.

(16)

The wireless communication device according to (15), wherein the control unit notifies the other device of information indicating the set transmission power.

(17)

The wireless communication device according to any one of (14) to (16), wherein the control unit sets the first carrier sense level based on a reception strength and a margin value of a reference frame.

(18)

The wireless communication device according to (17), wherein the control unit sets the first carrier sense level in a range not greater than a value obtained by subtracting the margin value from the reception strength of the reference frame.

(19)

The wireless communication device according to (17) or (18), wherein the control unit sets the parameter using a second parameter corresponding to the margin value.

(20)

The wireless communication device according to (19), wherein the other device notifies of information indicating a combination of the margin value and the second parameter.

(21)

A wireless communication device including:

a wireless communication unit configured to perform wireless communication with other devices; and a control unit configured to generate information for setting a parameter that is used by the other devices to transmit data and that is set based on a comparison result between a second carrier sense level which is a default and a first carrier sense level set in the other devices which are capable of changing a carrier sense level, wherein the wireless communication unit transmits the information for setting the parameter used by the other devices to transmit the data to the other devices.

(22)

The wireless communication device according to (21), wherein the control unit decides the first carrier sense level and the parameter based on number information regarding the other devices connected to the wireless communication unit, and the number information includes at least one piece of information indicating the number of other devices not having a function of changing the carrier sense level, the number of other devices having the function of changing the carrier sense level, the number of frames transmitted by the other devices not having the function of changing the carrier sense level, and the number of frames transmitted by the other devices having the function of changing the carrier sense level.

(23)

The wireless communication device according to (21) or (22), wherein the control unit decides the first carrier sense level and the parameter for each frequency used by the other devices to transmit the data.

(24)

The wireless communication device according to any one of (21) to (23), wherein the control unit selects a combination of a second parameter and margin values used in the other devices in order to set the first carrier sense level and the parameter.

(25)

The wireless communication device according to (24),
The wireless communication device according to (24), wherein the control unit selects the combination based on an average strength of interference.

(26)

The wireless communication device according to (24) or (25), wherein the combination is common to another wireless communication device.

(27)

The wireless communication device according to any one of (24) to (26), wherein the second parameter uniquely corresponds to the margin value.

(28)

The wireless communication device according to any one of (24) to (27), wherein the control unit sets transmission power of a frame to be transmitted to the other device based on information indicating transmission power set in the other device.

(29)

The wireless communication device according to (28), wherein the control unit maintains transmission power of a reference frame at a predetermined value.

(30)

A wireless communication device including:

a wireless communication unit configured to perform wireless communication with another device; and a control unit configured to set first transmission power and control a parameter used by the wireless communication unit to transmit data based on a comparison result between the set first transmission power and second transmission power serving as a standard.

(31)

The wireless communication device according to (30), wherein the control unit controls the parameter according to a difference between the first transmission power and the second transmission power.

(32)

The wireless communication device according to (30) or (31), wherein the parameter includes a carrier sense level.

(33)

The wireless communication device according to any one of (30) to (32), wherein the control unit notifies the other device of information indicating set transmission power.

(34)

The wireless communication device according to any one of (30) to (33), wherein the control unit sets the first transmission power based on a reception strength and a margin value of a reference frame.

(35)

The wireless communication device according to (34), wherein the control unit sets the first transmission power in a range which is not below a value obtained by adding the margin value and a default carrier sense level of the other device to a value obtained by subtracting a reception strength from transmission power of the reference frame.

(36)

The wireless communication device according to (34) or (35), wherein the control unit sets the parameter using a third parameter corresponding to the margin value.

(37)

The wireless communication device according to (36), wherein the other device notifies of information indicating a combination of the margin value and the third parameter.

(38)

A wireless communication device including:

a wireless communication unit configured to perform wireless communication with another device; and a control unit configured to control, through the wireless communication unit, information for setting a parameter used by the other device to transmit data and set based on a comparison result between first transmission power to be set and second transmission power serving as a standard in data transmission by the other device which is capable of changing transmission power.

(39)
The wireless communication device according to (38), wherein the control unit selects a combination of a margin value and a third parameter used in the other device in order to set the first transmission power and the parameter.

(40)
The wireless communication device according to (39), wherein the control unit selects the combination based on an average strength of interference.

(41)
The wireless communication device according to (39) or (40), wherein the combination is common to another wireless communication device.

(42)
The wireless communication device according to any one of (39) to (41), wherein the third parameter uniquely corresponds to the margin value.

(43)
The wireless communication device according to any one of (38) to (42), wherein the control unit sets transmission power of a frame to be transmitted to the other device based on information indicating transmission power set in the other device.

(44)
The wireless communication device according to (43), wherein the control unit maintains transmission power of a reference frame at a predetermined value.

(45)
A wireless communication method in a wireless communication device performing wireless communication with another device, the method including:
setting a first carrier sense level and controlling a parameter used to transmit data based on a comparison result between the set first carrier sense level and a second carrier sense level which is a default.

(46)
A wireless communication method in a wireless communication device performing wireless communication with another device, the method including:
generating information for setting a parameter that is used by the other device to transmit data and that is set based on a comparison result between a second carrier sense level which is a default and a first carrier sense level set in the other device which is capable of changing a carrier sense level; and
transmitting the information for setting the parameter used by the other device to transmit the data to the other device.

(47)
A wireless communication method in a wireless communication device performing wireless communication with another device, the method including:
setting first transmission power and controlling a parameter used to transmit data based on a comparison result between the set first transmission power and second transmission power serving as a standard.

(48)
A wireless communication method in a wireless communication device performing wireless communication with another device, the method including:
controlling, through wireless communication, information for setting a parameter used by the other device to transmit data and set based on a comparison result between first transmission power to be set and second transmission power serving as a standard in data transmission by the other device which is capable of changing transmission power.

(49)
A program causing a computer to function as:
a wireless communication unit configured to perform wireless communication with another device; and
a control unit configured to set a first carrier sense level and control a parameter used by the wireless communication unit to transmit data based on a comparison result between the set first carrier sense level and a second carrier sense level which is a default.

(50)
A program causing a computer to function as:
a wireless communication unit configured to perform wireless communication with another device; and
a control unit configured to generate information for setting a parameter that is used by the other device to transmit data and that is set based on a comparison result between a second carrier sense level which is a default and a first carrier sense level set in the other device which is capable of changing a carrier sense level,
wherein the wireless communication unit transmits the information for setting the parameter used by the other device to transmit the data to the other device.

(51)
A program causing a computer to function as:
a wireless communication unit configured to perform wireless communication with another device; and
a control unit configured to set first transmission power and control a parameter used by the wireless communication unit to transmit data based on a comparison result between the set first transmission power and second transmission power serving as a standard.

(52)
A program causing a computer to function as:
a wireless communication unit configured to perform wireless communication with another device; and
a control unit configured to control, through the wireless communication unit, information for setting a parameter used by the other device to transmit data and set based on a comparison result between first transmission power to be set and second transmission power serving as a standard in data transmission by the other device which is capable of changing transmission power.

REFERENCE SIGNS LIST

100 base station
110 wireless communication unit
120 storage unit
130 control unit
131 DSC control unit
133 parameter control unit
200 HE terminal
210 wireless communication unit
220 storage unit
230 control unit
231 acquisition unit
233 decision unit
235 setting unit
300 legacy terminal

The invention claimed is:
1. A wireless communication device comprising:
circuitry configured to:
perform wireless communication with another device;
compare a first carrier sense level with a second carrier sense level, wherein the first carrier sense level is associated with a first set of communication devices that are configured to dynamically change the first carrier sense level, wherein the second carrier sense level is associated with a second set of communication devices where the second carrier sense level is fixed as a default level, and wherein each one of the first carrier sense level and the second carrier sense level indicates a respective threshold for measured reception power; and control a parameter associated with the wireless communication to transmit data based on the comparison result between the first carrier sense level and the second carrier sense level.

2. The wireless communication device according to claim 1, wherein the circuitry is further configured to control parameter such that transmission opportunities are decreased when the first carrier sense level is higher than the second carrier sense level, and the transmission opportunities are increased when the first carrier sense level is lower than the second carrier sense level.

3. The wireless communication device according to claim 1,
wherein the parameter includes a fixed length portion in a waiting time before the data transmission.

4. The wireless communication device according to claim 1,
wherein the parameter includes a parameter of a distribution of an acquirable value of a time length selected at random in a waiting time before the data transmission.

5. The wireless communication device according to claim 1,
wherein the parameter includes a maximum value of an amount of transmittable data.

6. The wireless communication device according to claim 1,
wherein the parameter includes a maximum value of a transmittable time duration.

7. The wireless communication device according to claim 1,
wherein the parameter includes a maximum number of retransmissions.

8. The wireless communication device according to claim 1,
wherein the parameter includes a maximum value of a number of unit channels usable in a bundle.

9. The wireless communication device according to claim 1,
wherein the parameter includes a usable channel.

10. The wireless communication device according to claim 1, wherein the circuitry is further configured to determine whether to perform execution of change of the second carrier sense level to the first carrier sense level and to perform execution of the data transmission using the parameter.

11. The wireless communication device according to claim 10,
wherein the circuitry is further configured to determine whether to perform the execution based on whether a transmission time is included in a period scheduled as a transmittable time slot.

12. The wireless communication device according to claim 10, wherein the circuitry is further configured to determine whether to perform the execution based on a type of a frame to be transmitted.

13. The wireless communication device according to claim 1, wherein the circuitry is further configured to acquire information indicating the first carrier sense level and information indicating the parameter.

14. The wireless communication device according to claim 1, wherein the circuitry is further configured to control the parameter according to a difference between the first carrier sense level and the second carrier sense level.

15. A wireless communication device comprising:
circuitry configured to:
perform wireless communication with other devices;
compare a first carrier sense level with a second carrier sense level, wherein the first carrier sense level is associated with a first set of communication devices that are configured to dynamically change the first carrier sense level, wherein the second carrier sense level is associated with a second set of communication devices where the second carrier sense level is fixed as a default level, and wherein each one of the first carrier sense level and the second carrier sense level indicates a respective threshold for measured reception power;
generate information for setting a parameter that is used by the other devices to transmit data and that is set based on the comparison result between the first carriers sense level and the second carrier sense level; and
transmit, to the other devices, the information for setting the parameter used by the other devices to transmit the data.

16. The wireless communication device according to claim 15, wherein the circuitry is further configured to determine the first carrier sense level and the parameter based on number information regarding the other devices, wherein the number information includes at least one piece of information indicating a number of devices in the second set of communication devices, a number of devices in the first set of communication devices, a number of frames transmitted by the devices in the second set of communication devices, and a number of frames transmitted by the devices in the first set of communication devices.

17. The wireless communication device according to claim 15, wherein the circuitry is further configured to determine the first carrier sense level and the parameter for each frequency used by the other devices to transmit the data.

18. The wireless communication device according to claim 15, wherein the circuitry is further configured to select a combination of a second parameter and margin values used in the other devices in order to set the first carrier sense level and the parameter.

19. A wireless communication method in a wireless communication device, the method comprising:
performing wireless communication with another device;
comparing a first carrier sense level with a second carrier sense level, wherein the first carrier sense level is associated with a first set of communication devices that are configured to dynamically change the first carrier sense level, wherein the second carrier sense level is associated with a second set of communication devices where the second carrier sense level is fixed as a default level, and wherein each one of the first carrier sense level and the second carrier sense level indicates a respective threshold for measured reception power; and
controlling a parameter associated with the wireless communication to transmit data based on the comparison result between the first carrier sense level and the second carrier sense level.

20. A wireless communication method in a wireless communication device, the method comprising:
- performing wireless communication with another device;
- comparing a first carrier sense level with a second carrier sense level, wherein the first carrier sense level is associated with a first set of communication devices that are configured to dynamically change the first carrier sense level, wherein the second carrier sense level is associated with a second set of communication devices where the second carrier sense level is fixed as a default level, and wherein each one of the first carrier sense level and the second carrier sense level indicates a respective threshold for measured reception power;
- generating information for setting a parameter that is used by the other device to transmit data and that is set based on the comparison result between the first carrier sense level and the second carrier sense level; and
- transmitting, to the other device, the information for setting the parameter used by the other device to transmit the data.

* * * * *